United States Patent [19]
Suzuki et al.

[11] Patent Number: 5,818,875
[45] Date of Patent: Oct. 6, 1998

[54] MODULATION AND DEMODULATION METHOD, MODULATOR AND DEMODULATOR

[75] Inventors: Yoshifumi Suzuki, Kanagawa; Tadashi Shirato, Tokyo, both of Japan

[73] Assignee: Nippon Telegraph and Telephone Corporation, Tokyo, Japan

[21] Appl. No.: 627,084

[22] Filed: Apr. 3, 1996

[30] Foreign Application Priority Data

Apr. 11, 1995 [JP] Japan .................................. 7-109179
Jul. 20, 1995 [JP] Japan .................................. 7-205138

[51] Int. Cl.$^6$ .............................. H04L 5/12; H04L 27/32
[52] U.S. Cl. ..................... 375/261; 375/283; 375/298; 375/308; 329/304; 332/103
[58] Field of Search ................................ 375/261, 308, 375/283, 271, 330, 331, 332, 329, 322, 280, 281, 259, 260, 279, 298, 302, 344, 326, 324, 340, 264, 286, 269, 327, 321; 329/304, 306, 345, 346, 308; 332/103, 145

[56] References Cited

U.S. PATENT DOCUMENTS 5,113,415  5/1992  Muto .......................................... 375/83
5,363,410  11/1994 Hayashi .................................... 375/67
5,394,110  2/1995  Mizoguchi .............................. 329/304

FOREIGN PATENT DOCUMENTS 0 459 823 A2  12/1991  European Pat. Off. .

OTHER PUBLICATIONS

"Modulation Methods for PCNs", WEBB, *IEEE Communications Magazine*, vol. 30, No.21, Dec. 1992, pp. 90–95.
"Bandwidth Efficient QAM Schemes for Rayleigh Fading Channels", WEBB et al, *IEE Proceedings–I Solid–State and Electron Devices*, vol. 138, No. 3, Jun. 1991, pp. 169–175.
"Differentially Amplitude and Phase Encoded QAM on Rayleigh Fading Channels", CHUNG, *Proceedings of the Military Communications Conference*, Nov. 6–8, 1995, pp. 1026–1030.
"Bandwidth Efficient QAM Schemes for Rayleigh Fading Channels", WEBB et al, *IEE Proceedings–1*, vol. 138. No. 3, Jun. 1991, pp. 169–175.

*Primary Examiner*—Chi H. Pham
*Assistant Examiner*—William Luther
*Attorney, Agent, or Firm*—Nikaido, Marmelstein, Murray & Oram LLP

[57] ABSTRACT

A modulation and demodulation method for communication between a transmitting side and a receiving side includes a step of at the transmitting side, producing a modulating signal, an amplitude ratio of a current instantaneous amplitude of the modulating signal and an instantaneous amplitude at n symbols previously in time (n is a natural number) of the modulating signal being set to correspond to a code to be transmitted, a step of at the transmitting side, modulating a carrier with a radio frequency or an intermediate frequency by the modulating signal to provide and transmit a modulated signal, a step of at the receiving side, receiving the transmitted modulated signal to provide a received signal, and a step of at the receiving side, deciding the transmitted code from an amplitude ratio of an instantaneous amplitude of a signal point in a signal space and an instantaneous amplitude of the signal point in the signal space n symbols previously in time with respect to the received signal. A first amplitude ratio value equal to or smaller than 1 and a second amplitude ratio value equal to or greater than 1 are prepared. The amplitude ratio is selected one of the first and second amplitude values so as to prevent the modulating signal from converging to zero and from diverging.

30 Claims, 44 Drawing Sheets

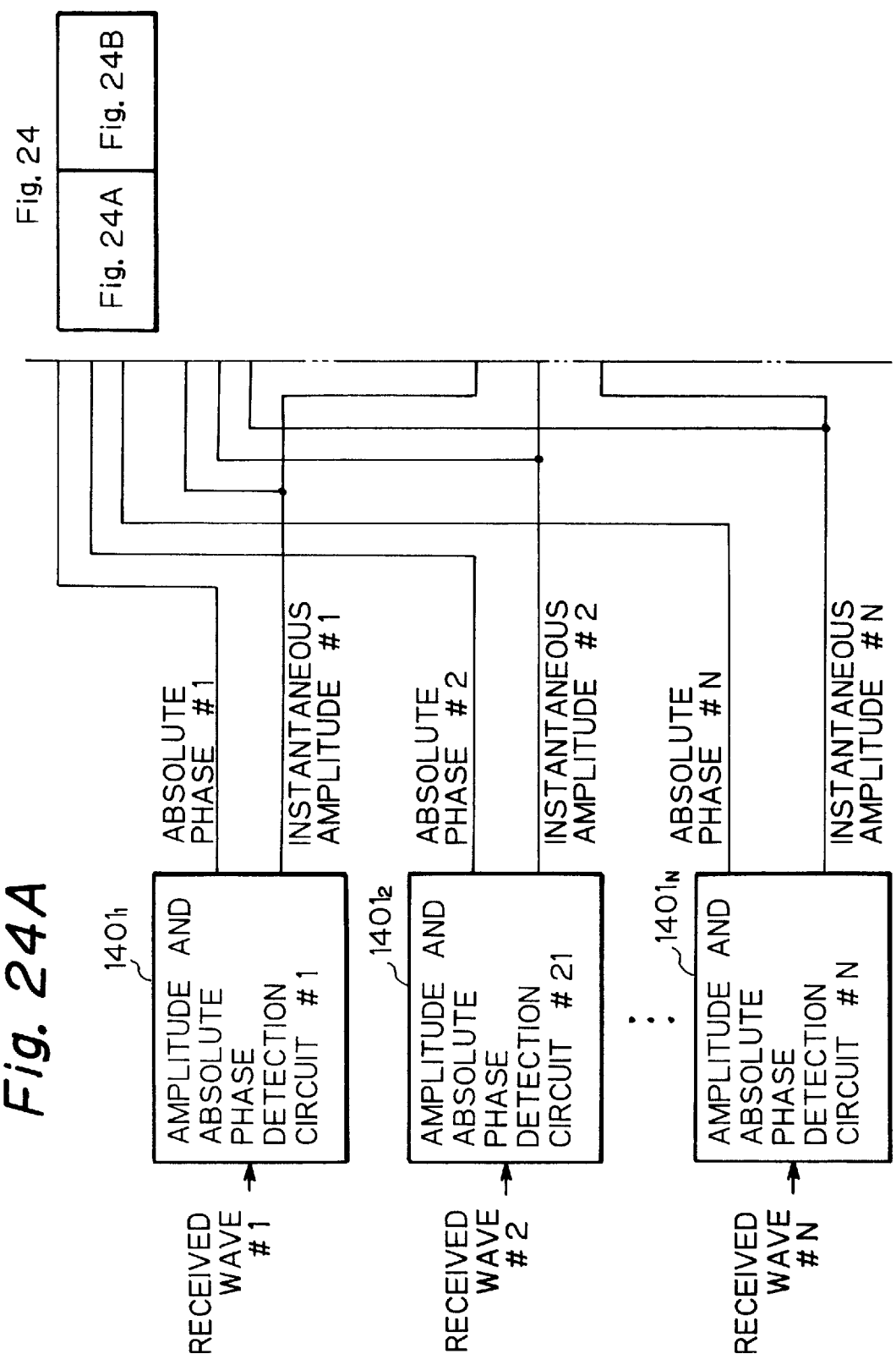

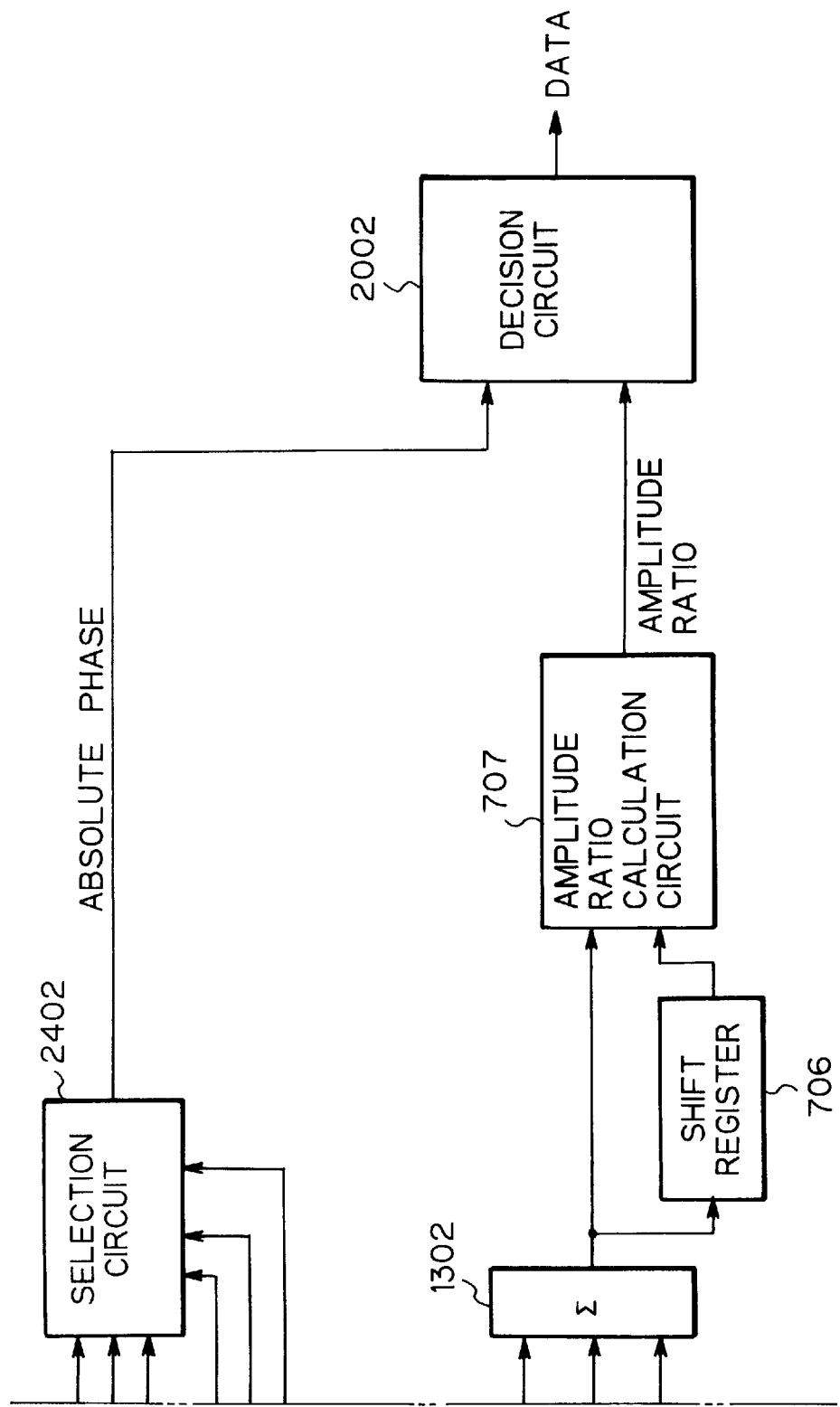

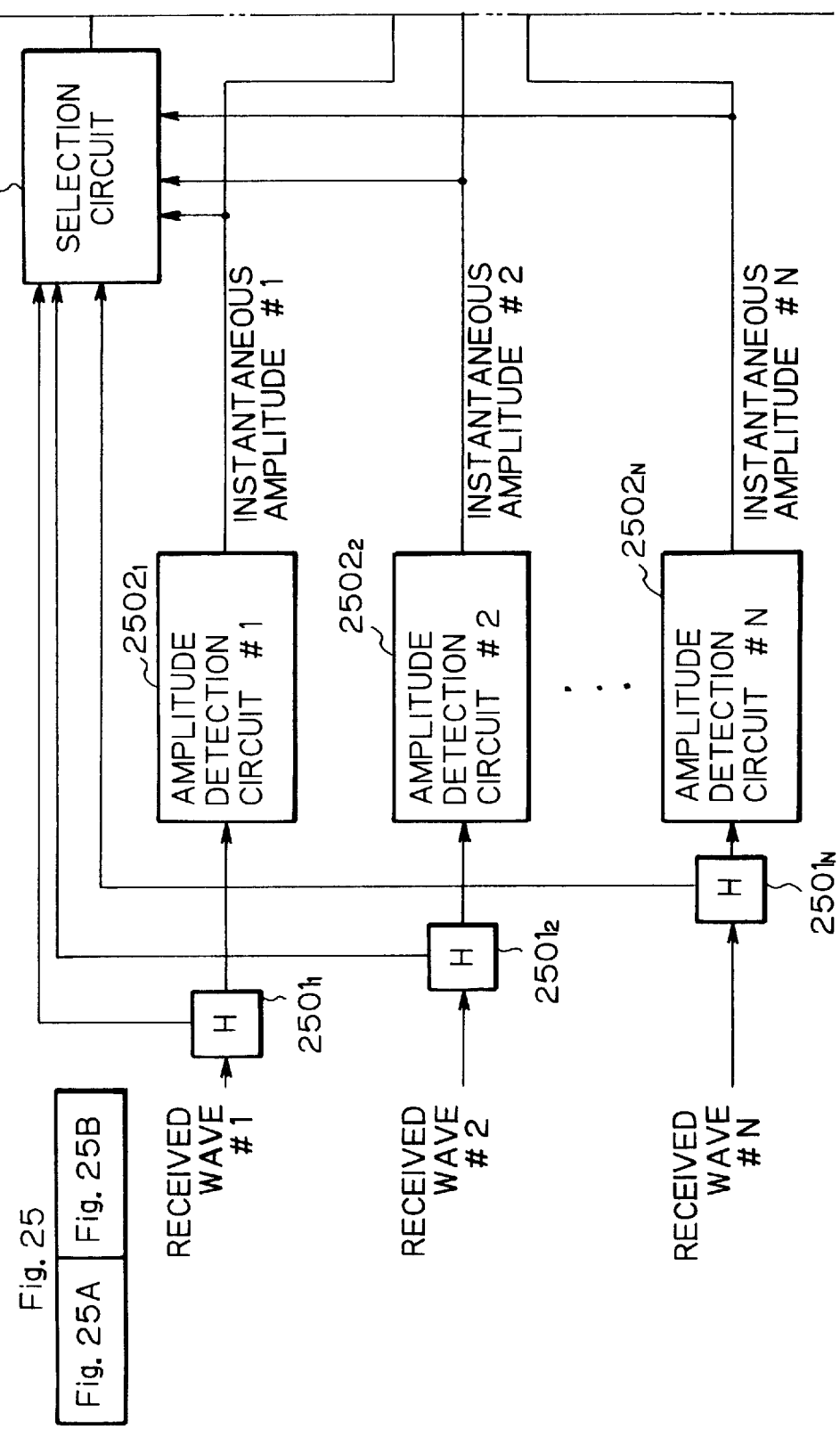

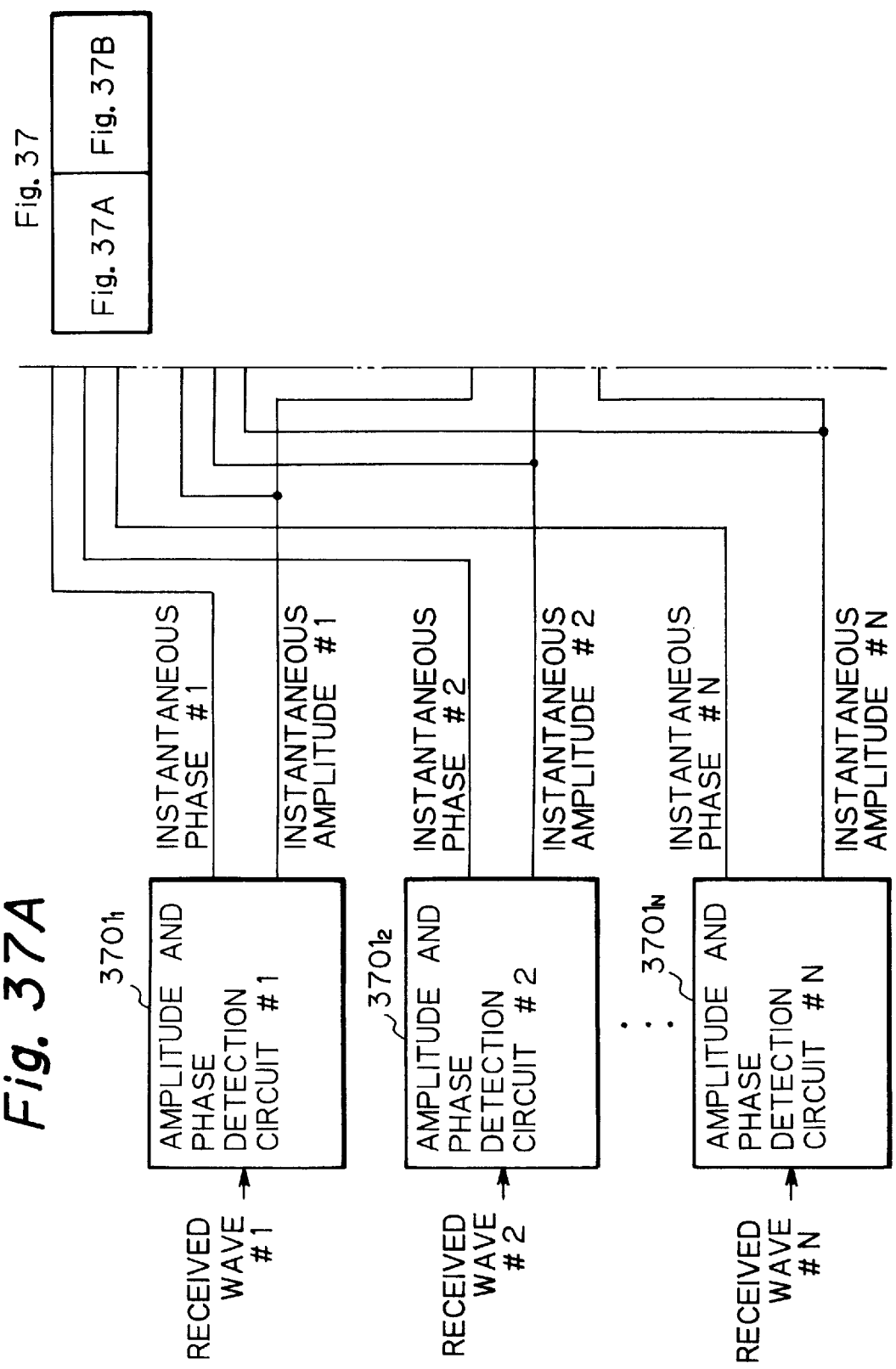

RECEIVING SIDE

TRANSMITTING SIDE

RECEIVING SIDE

TRANSMITTING SIDE

MODULATION AND DEMODULATION METHOD, MODULATOR AND DEMODULATOR

FIELD OF THE INVENTION

The present invention relates to a modulation and demodulation method, a modulator and a demodulator, used for digital communication.

DESCRIPTION OF THE RELATED ART

Recently, demand on fast and large capacity radio transmission techniques for realizing a PHS (Personal Handy phone System), a mobile phone system, a multi-media transmission system or a motion picture real-time transmission system via radio LAN or radio ATM has been increased. In order to satisfy this demand, it is necessary to increase band-width efficiency of these transmission systems.

As one technique for increasing the band-width efficiency, utilization of a multi-level modulation method such as a multi-level FSK (Frequency Shift Keying) method, a multi-phase PSK (Phase Shift Keying) method or a multi-level QAM (Quadrature Amplitude Modulation) method is effective. Particularly, utilization of the multi-level QAM is advantageous for increasing frequency utilization efficiency and transmission power efficiency.

FIG. 1a shows an example of a signal space diagram of a conventional square multi-level QAM (16 QAM) method.

As is known, signal points of modulating signals in the square multi-level QAM are arranged in parallel with the orthogonal I and Q axes at regular intervals. In this method, a QAM signal can be obtained by a quadrature modulation wherein a carrier is modulated by baseband modulating signals of the in-phase channel (I channel) and the quadrature channel (Q channel). At a receiving side, demodulation is performed by detecting the distances $I_n$ and $Q_n$ between the signal points and the origin along the I axis and the Q axis, respectively, and by deciding the original signal in accordance with the detected distances. Thus, in the square multi-level QAM method, it is necessary at the receiving side to detect the absolute phase by establishing phase synchronization of the carrier so that the phase angle and the amplitude always correspond to the signal points, and to keep the level of input signal applied to a demodulator at constant.

For establishing the signal points, it is necessary to detect an absolute phase plane. In order to detect the absolute phase plane, reproduction of the carrier frequency is needed. Frequency stability and phase noise of the carrier in general have a great influence on error ratio characteristics. Higher value of multi-levels will result poor frequency stability and lower acceptable error amount due to phase noise. Therefore, reproduction of the carrier frequency with high stability and low phase noise is required.

FIG. 1b shows an example of a signal space diagram of a conventional star multi-level QAM (16 QAM) method.

In this star multi-level QAM method, each of codes is mapped to a phase difference between the preceding and current codes $\phi_n$ and an amplitude $r_n$. At a receiving side, demodulation is performed by detecting the phase difference and comparing the amplitudes, and then by deciding the original signal in accordance with the detected and compared results. Thus, in this star QAM method, it is not necessary at the receiving side to detect the absolute phase nor to keep the level of input signal applied to a demodulator at constant because decision of the original signal with respect to amplitude is performed by comparing the amplitudes. Also, the star QAM method withstands relatively high phase noise.

However, in case where multi-levels more than two levels are mapped to amplitudes, an initial value or a reference value with respect to the amplitude values has to be established, and thus relationships between the signal points and the amplitude values have to be established by using such as a training signal. Also, if there occurs incorrect decision of an amplitude ratio with the initial or reference value due to worse transmission condition after establishment of the amplitude ratio, the initial establishment of the amplitude ratio with the initial or reference value has to be done again. Furthermore, according to the conventional star multi-level QAM, it is necessary to compare the detected amplitude ratio with the preceding detected amplitude ratio. This provides extremely complicated decision if the value of multi-levels increases.

As described herein before, the square multi-level QAM needs at the receiving side to keep the level of input signal applied to a demodulator at constant so that the amplitudes always correspond to the signal points. Thus, in case that there are abrupt level changes due to movement of the transmitter or the receiver, or to fading, it needs to provide with an AGC (Automatic Gain Control) amplifier having very quick response characteristics. This is quite difficult for realizing. Furthermore, since the carrier frequency tends to rise up to several tens GHz and the phase noise will increase if the carrier frequency rises, it is extremely difficult to realize the square multi-level QAM which requires a very precise carrier frequency. Contrary to this, the conventional star multi-level QAM can be proof against the level changes and the phase noise but has to introduce very complicated algorithm for the decision as above-described.

SUMMARY OF THE INVENTION

It is therefore an object of the present invention to provide a modulation and demodulation method, a modulator and a demodulator, whereby a fast and large capacity radio transmission can be attained without detecting an absolute amplitude of a modulating signal, namely without performing complicated controls and processes even under a condition of abrupt level changes such as under fading.

According to the present invention, a modulation and demodulation method for communication between a transmitting side and a receiving side includes a step of at the transmitting side, producing a modulating signal, an amplitude ratio of a current instantaneous amplitude of the modulating signal and an instantaneous amplitude at n symbols previously in time (n is a natural number) of the modulating signal being set to correspond to a code to be transmitted, a step of at the transmitting side, modulating a carrier with a radio frequency or an intermediate frequency by the modulating signal to provide and transmit a modulated signal, a step of at the receiving side, receiving the transmitted modulated signal to provide a received signal, and a step of at the receiving side, deciding the transmitted code from an amplitude ratio of an instantaneous amplitude of a signal point in a signal space and an instantaneous amplitude of the signal point in the signal space n symbols previously in time with respect to the received signal. A first amplitude ratio value equal to or smaller than 1 and a second amplitude ratio value equal to or greater than 1 are prepared. The amplitude ratio is selected one of the first and second amplitude values so as to prevent the modulating signal from converging to zero and from diverging.

By mapping a code to an amplitude ratio between instantaneous amplitudes separated by n symbols in time, the code can be decided independence of a received signal level. Thus, good demodulation characteristics can be expected even under a bad transmission condition of abrupt level changes. Furthermore, according to the present invention, since the amplitude ratio is selected to a first amplitude ratio value equal to or smaller than 1 or to a second amplitude ratio value equal to or greater than 1 so as to prevent the modulating signal from converging to zero and from diverging, the code can be mapped without convergence to zero and divergence of the instantaneous amplitude of the modulating signal.

Since information exist in the amplitude ratio between the symbols according to the present invention, multi-leveling of signal points can be easily realized and also decision thereof will become easy. Furthermore, since it is not an essential condition to detect the absolute amplitude, quick synchronization of burst signals can be realized causing transmission efficiency of a time division multiple access (TDMA) system and an asynchronous transmission system to extremely improve.

If the amplitude ratio modulation system according to the present invention is combined with a conventional phase or frequency modulation system, transmission capacity can be easily increased without changing the structure of the conventional phase or frequency modulation system.

Namely, according to the present invention, a fast and large capacity radio transmission can be easily attained without preparing a precise AGC amplifier and without performing complicated controls and processes for providing such as a training signal even under a condition of abrupt level changes such as under fading.

According to the present invention, a modulator includes a code mapping unit for mapping a plurality of data to be transmitted to a code corresponding to a signal point in a signal space, an amplitude ratio setting unit for providing an amplitude ratio corresponding to the mapped code, a n-symbol delay unit for providing an instantaneous amplitude at n symbols previously in time (n is a natural number), an instantaneous amplitude production unit for producing a current instantaneous amplitude based upon a product of the amplitude ratio and the instantaneous amplitude at n symbols previously, an amplitude ratio control unit for controlling the amplitude ratio to be one of a first amplitude ratio value equal to or smaller than 1 and a second amplitude ratio value equal to or greater than 1 so as to prevent the current instantaneous amplitude from converging to zero and from diverging, and an amplitude modulation unit for modulating a carrier with a radio frequency or an intermediate frequency by the current instantaneous amplitude.

It is preferred that the amplitude ratio setting unit provides one of the first amplitude ratio value and the second amplitude ratio value, and that the amplitude ratio control unit controls the amplitude ratio setting unit so as to provide the first amplitude ratio value when the instantaneous amplitude at n symbols previously is greater than a threshold value and so as to provide the second amplitude ratio value when the instantaneous amplitude at n symbols previously is equal to or smaller than the threshold value.

It is also preferred that the amplitude ratio setting unit provides both the first amplitude ratio value and the second amplitude ratio value, and that the amplitude ratio control unit includes a first multiplying unit for providing a first product of the first amplitude ratio value and the instantaneous amplitude at n symbols previously, a second multiplying unit for providing a second product of the second amplitude ratio value and the instantaneous amplitude at n symbols previously, a selection unit for selecting, in accordance with a selection signal, one of the first product and the second product as the current instantaneous amplitude, and a comparing unit for providing the selection signal to the selection unit so that the selection unit selects the first product when the instantaneous amplitude at n symbols previously is greater than a threshold value and that the selection unit selects the second product when the instantaneous amplitude at n symbols previously is equal to or smaller than the threshold value.

It is preferred that the amplitude ratio setting unit provides both the first amplitude ratio value and the second amplitude ratio value, and that the amplitude ratio control unit includes a first multiplying unit for providing a first product of the first amplitude ratio value and the instantaneous amplitude at n symbols previously, a second multiplying unit for providing a second product of the second amplitude ratio value and the instantaneous amplitude at n symbols previously, a selection unit for selecting, in accordance with a selection signal, one of the first product and the second product as the current instantaneous amplitude, and a comparing unit for providing the selection signal to the selection unit so that the selection unit selects the first product when the second product is greater than a threshold value and that the selection unit selects the second product when the second product is equal to or smaller than the threshold value.

According to the present invention, also, a demodulator includes an amplitude detection unit for detecting an instantaneous envelope level of a received signal, a n-symbol delay unit for providing an instantaneous envelope level of the received signal at n symbols previously in time (n is a natural number), an amplitude ratio calculation unit for calculating an amplitude ratio of an instantaneous amplitude in a signal space and an instantaneous amplitude in the signal space n symbols previously in time from the instantaneous envelope level and the instantaneous envelope level at n symbols previously, and a decision unit for deciding a code transmitted in accordance with the calculated amplitude ratio.

It is preferred that the amplitude detection unit has a multiplying unit for providing a product of the received signal and a carrier, and a low pass filtering unit for eliminating higher harmonic component in the product to provide square of the instantaneous envelope level.

It is also preferred that the amplitude detection unit includes unit for branching the received signal, a multiplying unit for providing a product of the branched signals, a low pass filtering unit for eliminating higher harmonic component in the product to provide square of the instantaneous envelope level, and a square root calculation unit for calculating a square root of the square of the instantaneous envelope level to provide the instantaneous amplitude in the signal space.

Preferably, the amplitude detection unit has a plurality of amplitude detection circuits for detecting a plurality of instantaneous envelope levels of a plurality of received signals, and the demodulator further includes a summing unit for summing the plurality of the detected envelope levels to provide the instantaneous amplitude. Thus, diversity combining with the maximum gain is possible only by summing the detected amplitudes of the branches.

It is preferred that a demodulator includes, a logarithmic amplifying unit for amplifying a received signal, an amplitude detection unit for detecting an instantaneous envelope level of the logarithmically amplified received signal, a n-symbol delay unit for providing an instantaneous envelope level of the logarithmically amplified received signal at n symbols previously in time (n is a natural number), an amplitude ratio calculation unit for calculating an amplitude ratio of an instantaneous amplitude in a signal space and an instantaneous amplitude in the signal space n symbols previously in time from the instantaneous envelope level and the instantaneous envelope level at n symbols previously, and a decision unit for deciding a code transmitted in accordance with the calculated amplitude ratio.

According to the present invention, a modulation and demodulation method for communication between a transmitting side and a receiving side includes a step of at the transmitting side, producing a modulating signal, an absolute phase in a signal space of the modulating signal and also an amplitude ratio of a current instantaneous amplitude of the modulating signal and an instantaneous amplitude at n symbols previously in time (n is a natural number) of the modulating signal being set to correspond to a code to be transmitted, a step of at the transmitting side, modulating a carrier with a radio frequency or an intermediate frequency by the modulating signal to provide and transmit a modulated signal, a step of at the receiving side, receiving the transmitted modulated signal to provide a received signal, and a step of at the receiving side, deciding the transmitted code from an absolute phase of the received signal in a signal space and from an amplitude ratio of an instantaneous amplitude of a signal point in the signal space and an instantaneous amplitude of the signal point in the signal space n symbols previously in time with respect to the received signal. A a first amplitude ratio value equal to or smaller than 1 and a second amplitude ratio value equal to or greater than 1 are prepared. The amplitude ratio is selected one of the first and second amplitude values so as to prevent the modulating signal from converging to zero and from diverging.

By mapping a code to an amplitude ratio between instantaneous amplitudes separated by n symbols in time, the code can be decided independence of a received signal level. Thus, good demodulation characteristics can be expected even under a bad transmission condition of abrupt level changes. Furthermore, according to the present invention, since the amplitude ratio is selected to a first amplitude ratio value equal to or smaller than 1 or to a second amplitude ratio value equal to or greater than 1 so as to prevent the modulating signal from converging to zero and from diverging, the code can be mapped without convergence to zero and divergence of the instantaneous amplitude of the modulating signal.

Since information exist in the amplitude ratio between the symbols according to the present invention, multi-leveling of signal points can be easily realized and also decision thereof will become easy. Furthermore, since it is not an essential condition to detect the absolute amplitude, quick synchronization of burst signals can be realized causing transmission efficiency of a time division multiple access (TDMA) system and an asynchronous transmission system to extremely improve.

If the amplitude ratio modulation system according to the present invention is combined with a conventional phase or frequency modulation system, transmission capacity can be easily increased without changing the structure of the conventional phase or frequency modulation system.

According to the present invention, also, a modulator includes a code mapping unit for mapping a plurality of data to be transmitted to a code corresponding to a signal point in a signal space, a phase setting unit for providing an absolute phase corresponding to the mapped code, an amplitude ratio setting unit for providing an amplitude ratio corresponding to the mapped code, a n-symbol delay unit for providing an instantaneous amplitude at n symbols previously in time (n is a natural number), an instantaneous amplitude production unit for producing a current instantaneous amplitude based upon a product of the amplitude ratio and the instantaneous amplitude at n symbols previously, an amplitude ratio control unit for controlling the amplitude ratio to be one of a first amplitude ratio value equal to or smaller than 1 and a second amplitude ratio value equal to or greater than 1 so as to prevent the current instantaneous amplitude from converging to zero and from diverging, and an amplitude and phase modulation unit for modulating a carrier with a radio frequency or an intermediate frequency by the absolute phase and the current instantaneous amplitude.

It is preferred that the amplitude ratio setting unit provides one of the first amplitude ratio value and the second amplitude ratio value, and that the amplitude ratio control unit controls the amplitude ratio setting unit so as to provide the first amplitude ratio value when the instantaneous amplitude at n symbols previously is greater than a threshold value and so as to provide the second amplitude ratio value when the instantaneous amplitude at n symbols previously is equal to or smaller than the threshold value.

It is preferred that the amplitude ratio setting unit provides both the first amplitude ratio value and the second amplitude ratio value, and that the amplitude ratio control unit includes a first multiplying unit for providing a first product of the first amplitude ratio value and the instantaneous amplitude at n symbols previously, a second multiplying unit for providing a second product of the second amplitude ratio value and the instantaneous amplitude at n symbols previously, a selection unit for selecting, in accordance with a selection signal, one of the first product and the second product as the current instantaneous amplitude, and a comparing unit for providing the selection signal to the selection unit so that the selection unit selects the first product when the instantaneous amplitude at n symbols previously is greater than a threshold value and that the selection unit selects the second product when the instantaneous amplitude at n symbols previously is equal to or smaller than the threshold value.

It is also preferred that the amplitude ratio setting unit provides both the first amplitude ratio value and the second amplitude ratio value, and that the amplitude ratio control unit includes a first multiplying unit for providing a first product of the first amplitude ratio value and the instantaneous amplitude at n symbols previously, a second multiplying unit for providing a second product of the second amplitude ratio value and the instantaneous amplitude at n symbols previously, a selection unit for selecting, in accordance with a selection signal, one of the first product and the second product as the current instantaneous amplitude, and a comparing unit for providing the selection signal to the selection unit so that the selection unit selects the first product when the second product is greater than a threshold value and that the selection unit selects the second product when the second product is equal to or smaller than the threshold value.

According to the present invention, furthermore, a demodulator includes an amplitude and absolute phase detection unit for detecting an instantaneous envelope level in a signal space and an absolute phase in the signal space of a received signal, a n-symbol delay unit for providing an instantaneous envelope level of the received signal at n symbols previously in time (n is a natural number), an amplitude ratio calculation unit for calculating an amplitude ratio of an instantaneous amplitude in a signal space and an instantaneous amplitude in the signal space n symbols previously in time from the instantaneous envelope level and the instantaneous envelope level at n symbols previously, and a decision unit for deciding a code transmitted in accordance with the absolute phase and the calculated amplitude ratio.

It is preferred that the amplitude and absolute phase detection unit includes a plurality of amplitude and absolute phase detection circuits for detecting a plurality of absolute phases and a plurality of instantaneous envelope levels of a plurality of received signals, and that the demodulator further includes a summing unit for summing the plurality of the detected envelope levels to provide the instantaneous amplitude, and a selection unit for selecting one of the plurality of the detected absolute phases depending upon the plurality of the detected envelope levels so as to provide an improved absolute phase. Thus, diversity combining with the maximum gain is possible only by summing the detected amplitudes of the branches.

It is preferred that the amplitude and absolute phase detection unit includes a plurality of unit for branching a plurality of received signals, a plurality of amplitude detection circuits for detecting a plurality of instantaneous envelope levels of the branched received signals and a synchronous phase detection unit, and that the demodulator further includes a summing unit for summing the plurality of the detected envelope levels to provide the instantaneous amplitude, and a selection unit for selecting one of the plurality of the branched received signals depending upon the plurality of the detected envelope levels so as to provide an improved received signal to the synchronous phase detection unit.

It is also preferred that a demodulator includes a logarithmic amplifying unit for amplifying a received signal, an amplitude and absolute phase detection unit for detecting an instantaneous envelope level and an absolute phase in a signal space of the logarithmically amplified received signal, a n-symbol delay unit for providing an instantaneous envelope level of the logarithmically amplified received signal at n symbols previously in time (n is a natural number), an amplitude ratio calculation unit for calculating an amplitude ratio of an instantaneous amplitude in a signal space and an instantaneous amplitude in the signal space n symbols previously in time from the instantaneous envelope level and the instantaneous envelope level at n symbols previously, and a decision unit for deciding a code transmitted in accordance with the absolute phase and the calculated amplitude ratio.

According to the present invention, furthermore, a modulation and demodulation method for communication between a transmitting side and a receiving side includes a step of at the transmitting side, producing a modulating signal, a phase difference between a current instantaneous phase of the modulating signal in a signal space and an instantaneous phase at n symbols previously in time (n is a natural number) of the modulating signal in the signal space and also an amplitude ratio of a current instantaneous amplitude of the modulating signal and an instantaneous amplitude at n symbols previously in time of the modulating signal being set to correspond to a code to be transmitted, a step of at the transmitting side, modulating a carrier with a radio frequency or an intermediate frequency by the modulating signal to provide and transmit a modulated signal, a step of at the receiving side, receiving the transmitted modulated signal to provide a received signal, and a step of at the receiving side, deciding the transmitted code from a phase difference between a current instantaneous phase of a signal point in the signal space and an instantaneous phase of the signal point in the signal space n symbols previously with respect to the received signal and from an amplitude ratio of an instantaneous amplitude of the signal point in the signal space and an instantaneous amplitude of the signal point in the signal space n symbols previously in time with respect to the received signal. A first amplitude ratio value equal to or smaller than 1 and a second amplitude ratio value equal to or greater than 1 are prepared. The amplitude ratio is selected one of the first and second amplitude values so as to prevent the modulating signal from converging to zero and from diverging.

By mapping a code to a phase difference and to an amplitude ratio between instantaneous amplitudes separated by n symbols in time, the code can be decided independence of a received signal level. Thus, good demodulation characteristics can be expected even under a bad transmission condition of abrupt level changes. Furthermore, according to the present invention, since the amplitude ratio is selected to a first amplitude ratio value equal to or smaller than 1 or to a second amplitude ratio value equal to or greater than 1 so as to prevent the modulating signal from converging to zero and from diverging, the code can be mapped without convergence to zero and divergence of the instantaneous amplitude of the modulating signal.

Since information exist in the amplitude ratio between the symbols according to the present invention, multi-leveling of signal points can be easily realized and also decision thereof will become easy. Furthermore, since it is not an essential condition to detect the absolute amplitude, quick synchronization of burst signals can be realized causing transmission efficiency of a time division multiple access (TDMA) system and an asynchronous transmission system to extremely improve.

If the amplitude ratio modulation system according to the present invention is combined with a conventional phase or frequency modulation system, transmission capacity can be easily increased without changing the structure of the conventional phase or frequency modulation system.

According to the present invention, also, a modulator includes a code mapping unit for mapping a plurality of data to be transmitted to a code corresponding to a signal point in a signal space, a phase difference setting unit for providing a phase difference corresponding to the mapped code, a first n-symbol delay unit for providing an instantaneous phase at n symbols previously in time (n is a natural number), an instantaneous phase production unit for producing a current instantaneous phase based upon a sum of the phase difference and the instantaneous phase at n symbols previously, an amplitude ratio setting unit for providing an amplitude ratio corresponding to the mapped code, a second n-symbol delay unit for providing an instantaneous amplitude at n symbols previously in time, an instantaneous amplitude production unit for producing a current instantaneous amplitude based upon a product of the amplitude ratio and the instantaneous amplitude at n symbols previously, an amplitude ratio control unit for controlling the amplitude ratio to be one of a first amplitude ratio value equal to or smaller than 1 and a second amplitude ratio value equal to or greater than 1 so as to prevent the current instantaneous amplitude from converging to zero and from diverging, and an amplitude and phase modulation unit for modulating a carrier with a radio frequency or an intermediate frequency by the current instantaneous phase and the current instantaneous amplitude.

It is preferred that the amplitude ratio setting unit provides one of the first amplitude ratio value and the second amplitude ratio value, and that the amplitude ratio control unit controls the amplitude ratio setting unit so as to provide the first amplitude ratio value when the instantaneous amplitude at n symbols previously is greater than a threshold value and so as to provide the second amplitude ratio value when the instantaneous amplitude at n symbols previously is equal to or smaller than the threshold value.

It is also preferred that the amplitude ratio setting unit provides both the first amplitude ratio value and the second amplitude ratio value, and that the amplitude ratio control unit includes a first multiplying unit for providing a first product of the first amplitude ratio value and the instantaneous amplitude at n symbols previously, a second multiplying unit for providing a second product of the second amplitude ratio value and the instantaneous amplitude at n symbols previously, a selection unit for selecting, in accordance with a selection signal, one of the first product and the second product as the current instantaneous amplitude, and a comparing unit for providing the selection signal to the selection unit so that the selection unit selects the first product when the instantaneous amplitude at n symbols previously is greater than a threshold value and that the selection unit selects the second product when the instantaneous amplitude at n symbols previously is equal to or smaller than the threshold value.

It is preferred that the amplitude ratio setting unit provides both the first amplitude ratio value and the second amplitude ratio value, and that the amplitude ratio control unit includes a first multiplying unit for providing a first product of the first amplitude ratio value and the instantaneous amplitude at n symbols previously, a second multiplying unit for providing a second product of the second amplitude ratio value and the instantaneous amplitude at n symbols previously, a selection unit for selecting, in accordance with a selection signal, one of the first product and the second product as the current instantaneous amplitude, and a comparing unit for providing the selection signal to the selection unit so that the selection unit selects the first product when the second product is greater than a threshold value and that the selection unit selects the second product when the second product is equal to or smaller than the threshold value.

According to the present invention, furthermore, a demodulator includes an amplitude and phase detection unit for detecting an instantaneous envelope level in a signal space and an instantaneous phase in the signal space of a received signal, a first n-symbol delay unit for providing an instantaneous phase at n symbols previously in time (n is a natural number), a phase difference calculation unit for calculating a phase difference between the detected instantaneous phase and the provided instantaneous phase n symbols previously, a second n-symbol delay unit for providing an instantaneous envelope level of the received signal at n symbols previously in time, an amplitude ratio calculation unit for calculating an amplitude ratio of an instantaneous amplitude in a signal space and an instantaneous amplitude in the signal space n symbols previously in time from the instantaneous envelope level and the instantaneous envelope level at n symbols previously, and a decision unit for deciding a code transmitted in accordance with the calculated phase difference and the calculated amplitude ratio.

It is preferred that the amplitude and phase detection unit includes a plurality of amplitude and phase detection circuits for detecting a plurality of instantaneous phases and a plurality of instantaneous envelope levels of a plurality of received signals, and that the demodulator further includes a summing unit for summing the plurality of the detected envelope levels to provide the instantaneous amplitude, and a selection unit for selecting one of the plurality of the detected instantaneous phases depending upon the plurality of the detected envelope levels so as to provide an improved instantaneous phase. Thus, diversity combining with the maximum gain is possible only by summing the detected amplitudes of the branches.

It is also preferred that the amplitude and phase detection unit includes a plurality of unit for branching a plurality of received signals, a plurality of amplitude detection circuits for detecting a plurality of instantaneous envelope levels of the branched received signals and a differential detection unit, and that the demodulator further includes a summing unit for summing the plurality of the detected envelope levels to provide the instantaneous amplitude, and a selection unit for selecting one of the plurality of the branched received signals depending upon the plurality of the detected envelope levels so as to provide an improved received signal to the differential detection unit.

Preferably, a demodulator includes a logarithmic amplifying unit for amplifying a received signal, an amplitude and phase detection unit for detecting an instantaneous envelope level and an instantaneous phase in a signal space of the logarithmically amplified received signal, a first n-symbol delay unit for providing an instantaneous phase of the logarithmically amplified received signal at n symbols previously in time (n is a natural number), a phase difference calculation unit for calculating a phase difference between the detected instantaneous phase and the provided instantaneous phase n symbols previously, a second n-symbol delay unit for providing an instantaneous envelope level of the logarithmically amplified received signal at n symbols previously in time, an amplitude ratio calculation unit for calculating an amplitude ratio of an instantaneous amplitude in a signal space and an instantaneous amplitude in the signal space n symbols previously in time from the instantaneous envelope level and the instantaneous envelope level at n symbols previously, and a decision unit for deciding a code transmitted in accordance with the calculated phase difference and the calculated amplitude ratio.

It is preferred that a demodulator includes a branch unit for branching a received signal, a differential detection unit for detecting a phase difference between an instantaneous phase and an instantaneous phase n symbols previously (n is a natural number) in a signal space of the branched received signal, an amplitude detection unit for detecting an instantaneous envelope level in the signal space of the branched received signal, a n-symbol delay unit for providing an instantaneous envelope level of the branched received signal at n symbols previously in time, an amplitude ratio calculation unit for calculating an amplitude ratio of an instantaneous amplitude in the signal space and an instantaneous amplitude in the signal space n symbols previously in time from the instantaneous envelope level and the instantaneous envelope level at n symbols previously, and a decision unit for deciding a code transmitted in accordance with the detected phase difference and the calculated amplitude ratio.

It is also preferred that a demodulator includes a branch unit for branching a received signal, a differential detection unit for detecting a phase difference between an instantaneous phase and an instantaneous phase n symbols previously (n is a natural number) in a signal space of the branched received signal, a logarithmic amplifying unit for amplifying the branched received signal, an amplitude detection unit for detecting an instantaneous envelope level and an instantaneous phase in the signal space of the logarithmically amplified received signal, a n-symbol delay unit for providing an instantaneous envelope level of the branched received signal at n symbols previously in time, an amplitude ratio calculation unit for calculating an amplitude ratio of an instantaneous amplitude in the signal space and an instantaneous amplitude in the signal space n symbols previously in time from the instantaneous envelope level and the instantaneous envelope level at n symbols previously, and a decision unit for deciding a code transmitted in accordance with the detected phase difference and the calculated amplitude ratio.

Further objects and advantages of the present invention will be apparent from the following description of the preferred embodiments of the invention as illustrated in the accompanying drawings.

BRIEF DESCRIPTION OF THE DRAWINGS

FIG. 24 formed by combining FIGS. 24A and 24B shows a block diagram illustrating a third concrete constitution of the demodulator in the second embodiment according to the present invention;

FIG. 25 formed by combining FIGS. 25A and 25B shows a block diagram illustrating a fourth concrete constitution of the demodulator in the second embodiment according to the present invention;

FIG. 37 formed by combining FIGS. 37A and 37B shows a block diagram illustrating a fifth concrete constitution of the demodulator in the third embodiment according to the present invention;

FIG. 38 formed by combining

DESCRIPTION OF THE PREFERRED EMBODIMENTS

Figure 1B:
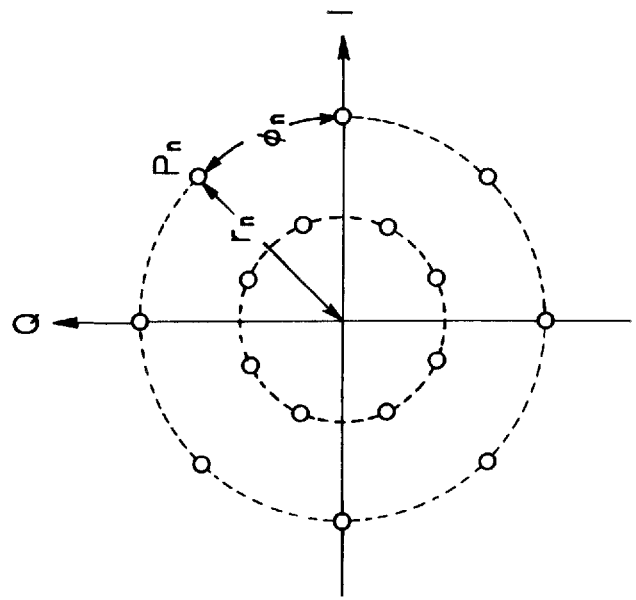
FIGS. 1a and 1b show the signal space diagrams of the conventional multi-level QAM methods already described.
Figure 1A:
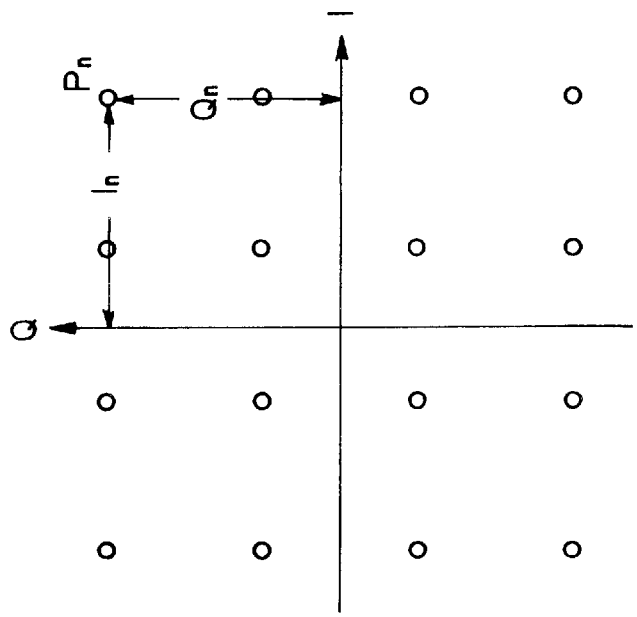
Figure 2:
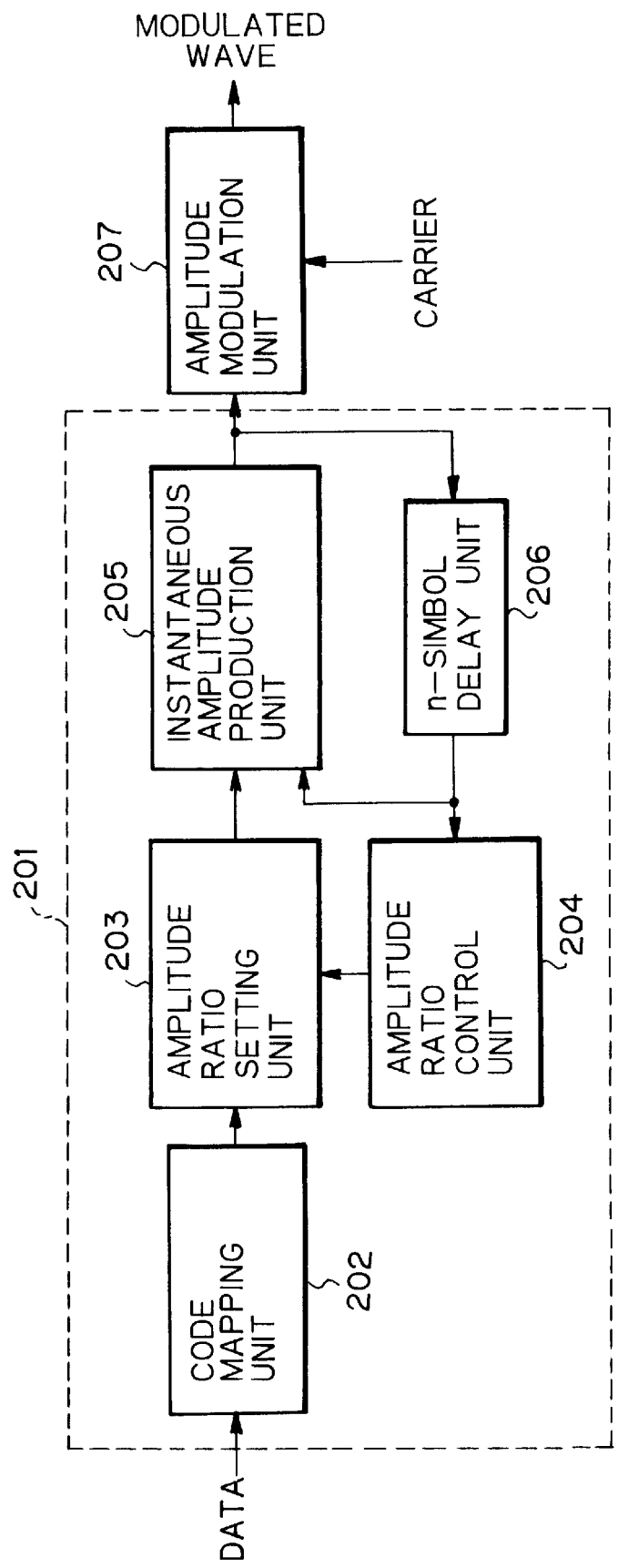
FIG. 2 shows a block diagram illustrating a substantial constitution of a modulating part in a transmitting side in a first embodiment according to the present invention.

In a first embodiment according to the present invention, a modulating part in a transmitting side is substantially constituted by a baseband processing unit 201 and an amplitude modulation unit 207 followed to this baseband processing unit 201 as shown in FIG. 2. The baseband processing unit 201 is provided with a code mapping unit 202, an amplitude ratio setting unit 203, an amplitude ratio control unit 204, an instantaneous amplitude production unit 205 and a n-symbol delay unit 206.

Data to be transmitted are inputted into the baseband processing unit 201. In the processing unit 201, a plurality of inputted data are mapped to a single code at the code mapping unit 202. An amplitude ratio value corresponding to this mapped code is set at the amplitude ratio setting unit 203, and then the product of the set amplitude ratio value and an instantaneous amplitude at n symbols previously in time (n is a natural number) outputted from the n-symbol delay unit 206 is produced at the instantaneous amplitude production unit 205 as a current instantaneous amplitude.

If only one amplitude ratio value is given for each of the mapped codes, the instantaneous amplitude from the production unit 205 may be gradually increased to diverge when codes corresponding to an amplitude ratio value greater than 1 are successively provided or the instantaneous amplitude from the production unit 205 may be gradually decreased to converge to 0 when codes corresponding to an amplitude ratio value smaller than 1 are successively provided. Thus, according to the present invention, two amplitude ratio values, a first amplitude ratio value equal to or smaller than 1 and a second amplitude ratio value equal to or greater than 1, are prepared for a single mapped code, and a threshold value of the amplitude ratio values is predetermined. In the amplitude ratio control unit 204, an instantaneous amplitude at n symbols previously is compared with the threshold value so that the first amplitude ratio equal to or smaller than 1 is outputted from the amplitude ratio setting unit 203 when the instantaneous amplitude at n symbols previously is greater than the threshold value and that the second amplitude ratio equal to or greater than 1 is outputted from the setting unit 203 when the instantaneous amplitude at n symbols previously is equal to or smaller than the threshold value. Thus decided amplitude ratio is applied to the instantaneous amplitude production unit 205 and the product of the decided amplitude ratio and an instantaneous amplitude at n symbols previously is produced therein.

For example, an instantaneous amplitude at a time t $A_t$ can be obtained from a following equation (1a), where $A_{t-n}$ is an instantaneous amplitude at n symbols previously from the time t, $r_j$ is a first amplitude ratio equal to or smaller than 1 corresponding to the mapped code j, $R_j$ is a second amplitude ratio equal to or greater than 1 corresponding to the mapped code j, and s is a threshold value of the instantaneous amplitude.

$$A_t = \begin{cases} r_j \cdot A_{t-n} & (\text{if } A_{t-n} > s) \\ R_j \cdot A_{t-n} & (\text{if } A_{t-n} \leq s) \end{cases} \quad (1a)$$

In this case, the instantaneous amplitude $A_t$ is within a range of $r_{min} \cdot s < A_t \leq R_{max} \cdot s$ without diverging or converging to 0, where $r_{min}$ is the minimum value of $r_j$ and $R_{max}$ is the maximum value of $R_j$.

The instantaneous amplitude $A_t$ can be also obtained from a following equation (1b) instead of the equation (1a).

$$A_t = \begin{cases} r_j \cdot A_{t-n} & (\text{if } A_{t-n} \geq s) \\ R_j \cdot A_{t-n} & (\text{if } A_{t-n} < s) \end{cases} \quad (1b)$$

In this case, the instantaneous amplitude $A_t$ is within a range of $r_{min} \cdot s \leq A_t < R_{max} \cdot s$ without diverging or converging to 0.

The instantaneous amplitude $A_t$ can be obtained by comparing $R_j \cdot A_{t-n}$ with the threshold value s from a following equation (2a).

$$A_t = \begin{cases} r_j \cdot A_{t-n} & (\text{if } R_j \cdot A_{t-n} > s) \\ R_j \cdot A_{t-n} & (\text{if } R_j \cdot A_{t-n} \leq s) \end{cases} \quad (2a)$$

In this case, the instantaneous amplitude $A_t$ is within a range of $r_{min}^2 \cdot s < A_t < s$ without diverging or converging to 0.

The instantaneous amplitude $A_t$ can be also obtained from a following equation (2b) instead of the equation (2a).

$$A_t = \begin{cases} r_j \cdot A_{t-n} & (\text{if } R_j \cdot A_{t-n} \geq s) \\ R_j \cdot A_{t-n} & (\text{if } R_j \cdot A_{t-n} < s) \end{cases} \quad (2b)$$

In this case, the instantaneous amplitude $A_t$ is within a range of $r_{min}^2 \cdot s \leq A_t < s$ without diverging or converging to 0.

The intermediate frequency carrier or radio frequency carrier is amodulated by thus obtained instantaneous amplitude $A_t$ at the amplitude modulation unit 207 to output an intermediate frequency (IF) wave or radio frequency (RF) wave.

In the first embodiment according to the present invention, a demodulating part in a receiving side is substantially constituted by an amplitude detection unit 301, a n-symbol delay unit 302, an amplitude ratio calculation unit 303 and a decision unit 304.

Received wave is inputted into the amplitude detection unit 301 and an instantaneous envelope level which is an amplitude component in the signal space is detected. Then, a ratio of the instantaneous envelope level at the current time and the instantaneous envelope level at n symbols previously provided from the n-symbol delay unit 302 is calculated at the amplitude ratio calculation unit 303.

For example, the output from the calculation unit 303 will become as shown in a following equation (3a) and thus $r_j$ or $R_j$ corresponding to the mapped code can be obtained in case the modulated wave with an instantaneous amplitude produced by using the equation (1a) is demodulated.

$$A_t/A_{t-n} = \begin{cases} r_j & (\text{if } A_t < A_{t-n}) \\ R_j & (\text{if } A_t \geq A_{t-n}) \end{cases} \quad (3a)$$

In case the modulated wave with an instantaneous amplitude produced by using the equation (1b) is demodulated, the output from the calculation unit 303 will become as shown in a following equation (3b) and thus $r_j$ or $R_j$ corresponding to the mapped code can be obtained.

$$A_t/A_{t-n} = \begin{cases} r_j \text{ (if } A_t \leq A_{t-n}) \\ R_j \text{ (if } A_t > A_{t-n}) \end{cases} \quad (3b)$$

Thus, the amplitude ratio $r_j$ or $R_j$ corresponding to the mapped code can be obtained. Then, demodulated data can be provided from the decision unit 304 by deciding the code in accordance with the obtained amplitude ratio $r_j$ or $R_j$.

Hereinafter, it will be described with respect to constitutions of modulators in the first embodiment according to the present invention.

Figure 4:
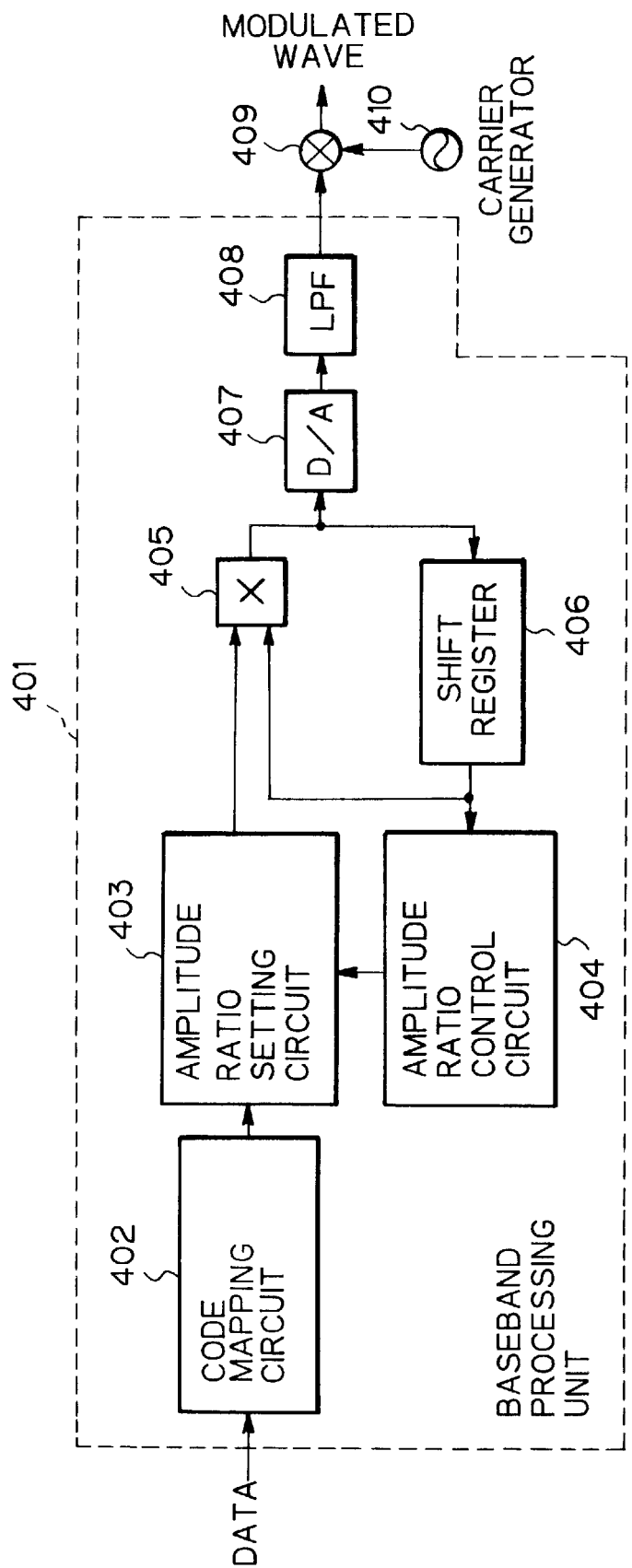
FIG. 4 shows a block diagram illustrating a first concrete constitution of a modulator in the first embodiment according to the present invention.

FIG. 4 illustrates a first concrete constitution of a modulator in the first embodiment according to the present invention. In this example, the modulator substantially consists of a baseband processing circuit 401, a mixer 409 followed to this baseband processing circuit 401 and a carrier generator 410. The baseband processing circuit 401 is provided with a code mapping circuit 402, an amplitude ratio setting circuit 403, an amplitude ratio control circuit 404, a multiplier 405, a shift register 406, an D/A converter 407 and a LPF (Low Pass Filter) 408.

Data to be transmitted are inputted into the baseband processing circuit 401. In the processing circuit 401, a plurality of inputted data are mapped to a single code at the code mapping circuit 402. An amplitude ratio value corresponding to this mapped code is set at the amplitude ratio setting circuit 403, and then the product of the set amplitude ratio value and an instantaneous amplitude at n symbols previously $A_{t-n}$ outputted from the shift register 406 is produced at the multiplier 405 as a current instantaneous amplitude $A_t$.

In the amplitude ratio setting circuit 403, two amplitude ratio values, a first amplitude ratio value $r_j$ equal to or smaller than 1 and a second amplitude ratio value $R_j$ equal to or greater than 1, are prepared for a single mapped code.

In the amplitude ratio control circuit 404, an instantaneous amplitude at n symbols previously is compared with a predetermined threshold value so that the first amplitude ratio $r_j$ equal to or smaller than 1 is outputted from the amplitude ratio setting circuit 403 when the instantaneous amplitude at n symbols previously is greater than (equal to or greater than) the threshold value and that the second amplitude ratio $R_j$ equal to or greater than 1 is outputted from the setting circuit 403 when the instantaneous amplitude at n symbols previously is equal to or smaller than (smaller than) the threshold value.

For example, an instantaneous amplitude at a time t: $A_t$ can be obtained from a following equation (4a) or (4b), where $A_{t-n}$ is an instantaneous amplitude at n symbols previously from the time t, $r_j$ is a first amplitude ratio ($\leq 1$) corresponding to the mapped code j, $R_j$ is a second amplitude ratio (>1) corresponding to the mapped code j, and a threshold value of the instantaneous amplitude is 1.

$$A_t = \begin{cases} r_j \cdot A_{t-n} \text{ (if } A_{t-n} > 1) \\ R_j \cdot A_{t-n} \text{ (if } A_{t-n} \leq 1) \end{cases} \quad (4a)$$

$$A_t = \begin{cases} r_j \cdot A_{t-n} \text{ (if } A_{t-n} \geq 1) \\ R_j \cdot A_{t-n} \text{ (if } A_{t-n} < 1) \end{cases} \quad (4b)$$

The first and second amplitude ratios $r_j$ and $R_j$ are determined within one of four ranges of (A) $r_j \leq 1$ and $R_j \geq 1$, (B) $r_j \leq 1$ and $R_j > 1$, (C) $r_j < 1$ and $R_j \geq 1$, and (D) $r_j < 1$ and $R_j > 1$.

These amplitude ratios $r_j$ and $R_j$ may be set by an equation (8) described later. If it is supposed that codes are "00", "01", "10" and "11", these amplitude ratios $r_j$ and $R_j$ can be set, as an example, as follows.

| | | | | |
|---|---|---|---|---|
| (A) $r_j < 1$ and $R_j > 1$ | | | | |
| code | 00 | 01 | 10 | 11 |
| amplitude ratio $r_j$ | 1.0 | 0.9 | 0.8 | 0.7 |
| amplitude ratio $R_j$ | 1.0 | 1.1 | 1.2 | 1.3 |
| (B) $r_j < 1$ and $R_j > 1$ | | | | |
| code | 00 | 01 | 10 | 11 |
| amplitude ratio $r_j$ | 1.0 | 0.9 | 0.8 | 0.7 |
| amplitude ratio $R_j$ | 1.1 | 1.2 | 1.3 | 1.4 |
| (C) $r_j < 1$ and $R_j > 1$ | | | | |
| code | 00 | 01 | 10 | 11 |
| amplitude ratio $r_j$ | 0.9 | 0.8 | 0.7 | 0.6 |
| amplitude ratio $R_j$ | 1.0 | 1.1 | 1.2 | 1.3 |
| (D) $r_j < 1$ and $R_j > 1$ | | | | |
| code | 00 | 01 | 10 | 11 |
| amplitude ratio $r_j$ | 0.9 | 0.8 | 0.7 | 0.6 |
| amplitude ratio $R_j$ | 1.1 | 1.2 | 1.3 | 1.4 |

Thus obtained instantaneous amplitude $A_t$ is converted into an analog signal at the D/A converter 407. The converted analog signal is smoothed and Nyquist pulse shaped at the LPF 408 and then outputted from the baseband processing circuit 401. A carrier signal with a frequency of $f_c$ from the carrier generator 410 is mixed with the output signal from the baseband processing circuit 401 at the mixer 409 so as to be amplitude-modulated. The modulated wave $A_t \cdot \cos(2\pi \cdot f_c \cdot t)$ is thus outputted.

The code mapping circuit 402 and the amplitude ratio setting circuit 403 can be easily constituted by ROMs (Read Only Memories) and logic circuits, respectively. Similarly to this, the amplitude ratio control circuit 404 also can be easily constituted by a ROM and a logic circuit such as a comparator.

Figure 5:
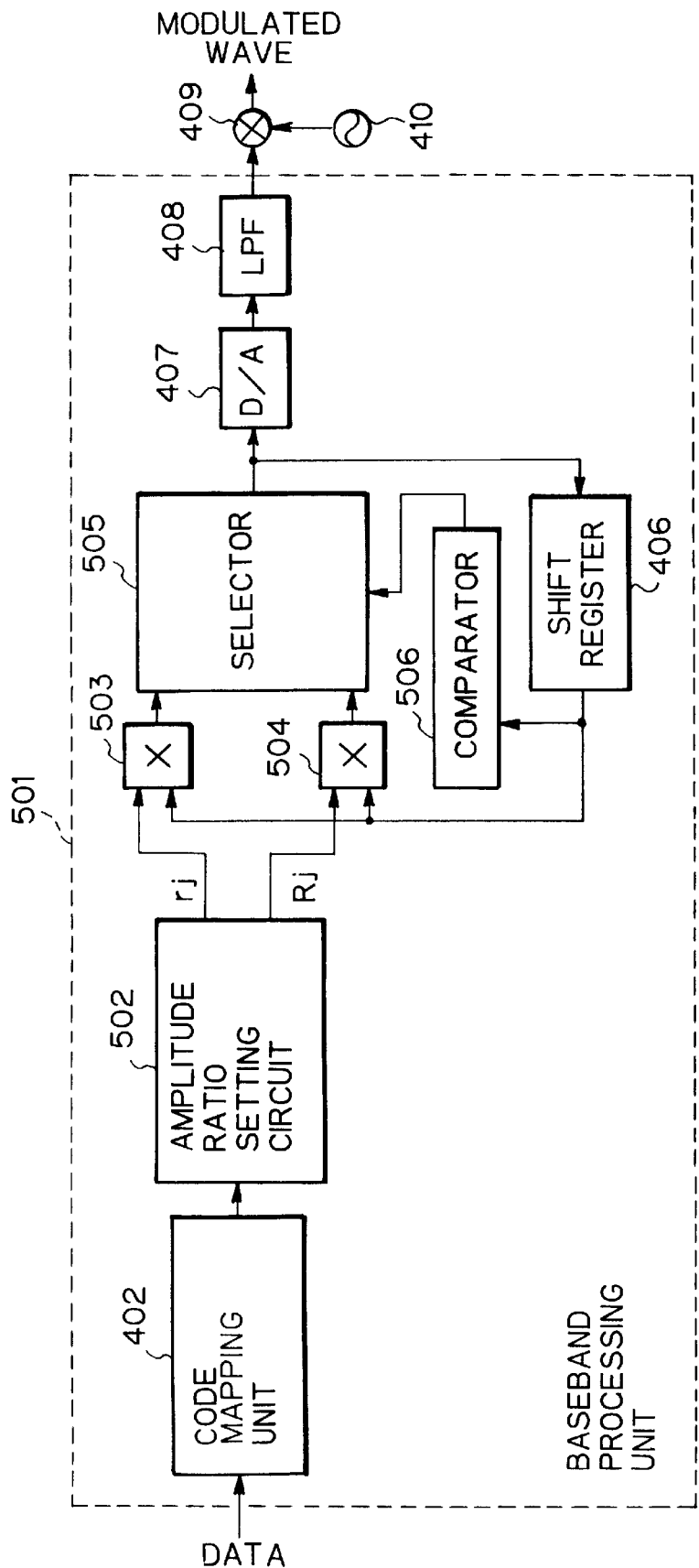
FIG. 5 shows a block diagram illustrating a second concrete constitution of the modulator in the first embodiment according to the present invention.

FIG. 5 illustrates a second concrete constitution of a modulator in the first embodiment according to the present invention. In this example, the modulator substantially consists of a baseband processing circuit 501, the mixer 409 followed to this baseband processing circuit 501 and the carrier generator 410. The similar components in this modulator as these in the modulator shown in FIG. 4 are illustrated by using the same reference numerals, respectively. The baseband processing circuit 501 is provided with the code mapping circuit 402, an amplitude ratio setting circuit 502, multipliers 503 and 504, a selector 505, a comparator 506, the shift register 406, the D/A converter 407 and the LPF 408.

Data to be transmitted are inputted into the baseband processing circuit 501. In the processing circuit 501, a plurality of inputted data are mapped to a single code at the code mapping circuit 402. Two amplitude ratio values corresponding to this mapped code, a first amplitude ratio value $r_j$ equal to or smaller than 1 and a second amplitude ratio value $R_j$ equal to or greater than 1, are set at the amplitude ratio setting circuit 502. The product $r_j \cdot A_{t-n}$ of the set first amplitude ratio $r_j$ and an instantaneous amplitude at n symbols previously $A_{t-n}$ outputted from the shift register 406 is produced at the multiplier 503. Also the product $R_j \cdot A_{t-n}$ of the set second amplitude ratio $R_j$ and the instantaneous amplitude at n symbols previously $A_{t-n}$ outputted from the shift register 406 is produced at the multiplier 504. These two products are inputted into the selector 505. The comparator 506 compares the instantaneous amplitude at n symbols previously $A_{t-n}$ with a threshold value to produce a selection signal. This selection signal is applied to the selector 505 so that the selector 505 outputs the product $r_j \cdot A_{t-n}$ when the instantaneous amplitude at n symbols previously is greater than (equal to or greater than) the threshold value and outputs the product $R_j \cdot A_{t-n}$ when the instantaneous amplitude at n symbols previously is equal to or smaller than (smaller than) the threshold value.

For example, an instantaneous amplitude at a time t: $A_t$ can be obtained from a following equation (5a) or (5b), where $A_{t-n}$ is the instantaneous amplitude at n symbols previously from the time t, $r_j$ is the first amplitude ratio ($\leq 1$) corresponding to the mapped code j, $R_j$ is the second amplitude ratio ($\geq 1$) corresponding to the mapped code j, and the threshold value of the instantaneous amplitude is 1.

$$A_t = \begin{cases} r_j \cdot A_{t-n} \text{ (if } A_{t-n} > 1) \\ R_j \cdot A_{t-n} \text{ (if } A_{t-n} \leq 1) \end{cases} \quad (5a)$$

$$A_t = \begin{cases} r_j \cdot A_{t-n} \text{ (if } A_{t-n} \geq 1) \\ R_j \cdot A_{t-n} \text{ (if } A_{t-n} < 1) \end{cases} \quad (5b)$$

The operation after that and another constitution of this modulator are the same as these in the modulator shown in FIG. 4.

Figure 6:
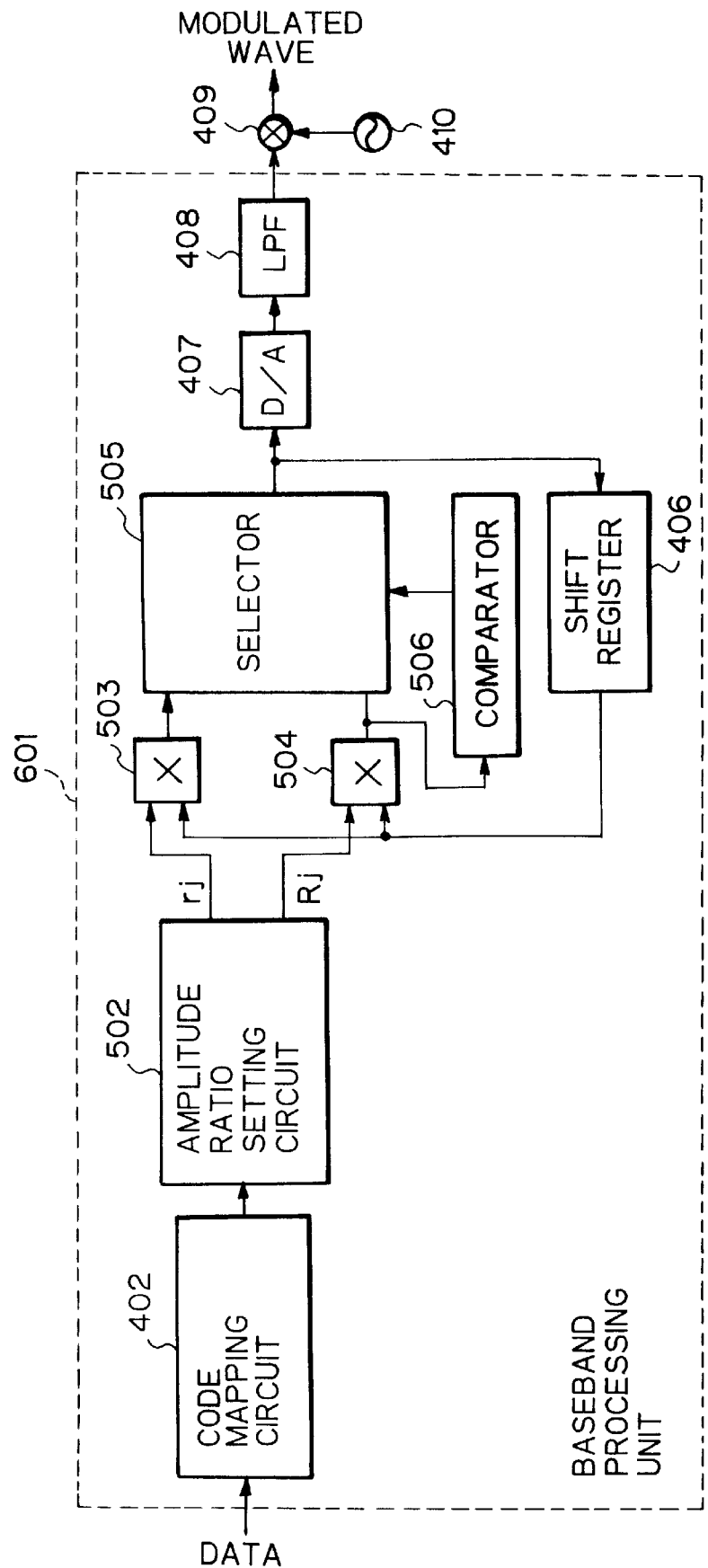
FIG. 6 shows a block diagram illustrating a third concrete constitution of the modulator in the first embodiment according to the present invention.

FIG. 6 illustrates a third concrete constitution of a modulator in the first embodiment according to the present invention. In this example, the modulator substantially consists of a baseband processing circuit 601, the mixer 409 followed to this baseband processing circuit 501 and the carrier generator 410. The similar components in this modulator as these in the modulators shown in FIGS. 4 and 5 are illustrated by using the same reference numerals, respectively. The baseband processing circuit 601 is provided with the code mapping circuit 402, the amplitude ratio setting circuit 502, the multipliers 503 and 504, the selector 505, the comparator 506, the shift register 406, the D/A converter 407 and the LPF 408.

Data to be transmitted are inputted into the baseband processing circuit 601. In the processing circuit 601, a plurality of inputted data are mapped to a single code at the code mapping circuit 402. Two amplitude ratio values corresponding to this mapped code, a first amplitude ratio value $r_j$ equal to or smaller than 1 and a second amplitude ratio value $R_j$ equal to or greater than 1, are set at the amplitude ratio setting circuit 502. The product $r_j \cdot A_{t-n}$ of the set first amplitude ratio $r_j$ and an instantaneous amplitude at n symbols previously $A_{t-n}$ outputted from the shift register 406 is produced at the multiplier 503. Also the product $R_j \cdot A_{t-n}$ of the set second amplitude ratio $R_j$ and the instantaneous amplitude at n symbols previously $A_{t-n}$ outputted from the shift register 406 is produced at the multiplier 504. These two products are inputted into the selector 505. The comparator 506 compares the product $R_j \cdot A_{t-n}$ with a threshold value to produce a selection signal. This selection signal is applied to the selector 505 so that the selector 505 outputs the product $r_j \cdot A_{t-n}$ when the product $R_j \cdot A_{t-n}$ is greater than (equal to or greater than) the threshold value and outputs the product $R_j \cdot A_{t-n}$ when the product $R_j \cdot A_{t-n}$ is equal to or smaller than (smaller than) the threshold value.

For example, a n instantaneous amplitude at a time t: At can be obtained from a following equation (6a) or (6b), where $A_{t-n}$ is the instantaneous amplitude at n symbols previously from the time t, $r_j$ is the first amplitude ratio ($\leq 1$) corresponding to the mapped code j, $R_j$ is the second amplitude ratio ($\geq 1$) corresponding to the mapped code j, and the threshold value of the instantaneous amplitude is 1.

$$A_t = \begin{cases} r_j \cdot A_{t-n} \text{ (if } R_j \cdot A_{t-n} > 1) \\ R_j \cdot A_{t-n} \text{ (if } R_j \cdot A_{t-n} \leq 1) \end{cases} \quad (6a)$$

$$A_t = \begin{cases} r_j \cdot A_{t-n} \text{ (if } R_j \cdot A_{t-n} \geq 1) \\ R_j \cdot A_{t-n} \text{ (if } R_j \cdot A_{t-n} < 1) \end{cases} \quad (6b)$$

The operation after that and another constitution of this modulator are the same as these in the modulator shown in FIG. 5.

Hereinafter, it will be described with respect to constitutions of demodulators in the first embodiment according to the present invention.

Figure 7:
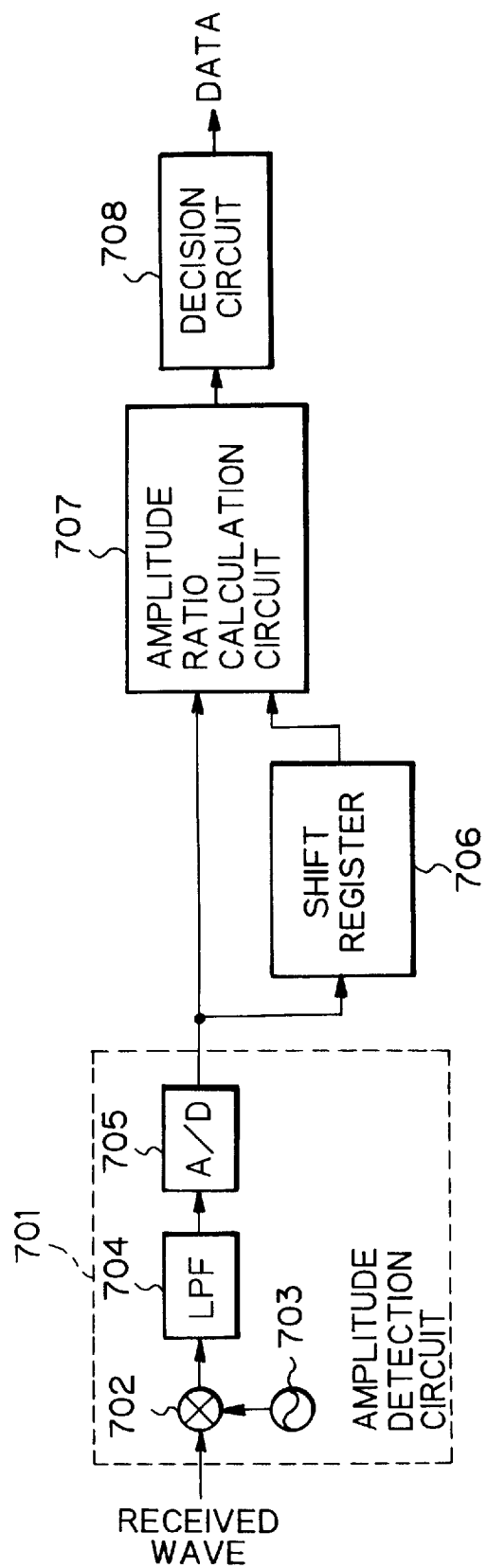
FIG. 7 shows a block diagram illustrating a first concrete constitution of a demodulator in the first embodiment according to the present invention.

FIG. 7 illustrates a first concrete constitution of a demodulator in the first embodiment according to the present invention. In this example, the demodulator substantially consists of an amplitude detection circuit 701, a shift register 706 and an amplitude ratio calculation circuit 707 followed to the amplitude detection circuit 701 and a decision circuit 708. The amplitude detection circuit 701 is provided with a mixer 702, a carrier generator 703, a LPF (Low Pass Filter) 704 and an A/D converter 705.

Received wave $A_t \cdot \cos(2\pi \cdot f_c \cdot t)$ is inputted into the amplitude detection circuit 701. In the amplitude detection circuit 701, the inputted wave is first mixed at the mixer 702 with a carrier signal $\cos(2\pi \cdot f_c \cdot t)$ having a frequency of $f_c$ provided from the carrier generator 703 which will be constituted by a frequency synthesizer or an oscillator. Then, higher harmonic component of the output signal from the mixer 702 is eliminated at the LPF 704 to obtain an instantaneous envelope level which is an amplitude component in the signal space. The obtained instantaneous envelope level is then converted into a digital signal at the A/D converter 705 and the converted digital instantaneous envelope level is applied to the shift register 706 and to the amplitude ratio calculation circuit 707. In this calculation circuit 707, a ratio $A_t/A_{t-n}$ of the instantaneous envelope level at the current time $A_t$ and the instantaneous envelope level at n symbols previously $A_{t-n}$ provided from the shift register 706 is calculated by a following equation (7a) or (7b).

$$A_t/A_{t-n} = \begin{cases} r_j \text{ (if } A_t < A_{t-n}) \\ R_j \text{ (if } A_t \geq A_{t-n}) \end{cases} \quad (7a)$$

$$A_t/A_{t-n} = \begin{cases} r_j \text{ (if } A_t \leq A_{t-n}) \\ R_j \text{ (if } A_t > A_{t-n}) \end{cases} \quad (7b)$$

Thus, the amplitude ratio $r_j$ or $R_j$ corresponding to the mapped code can be obtained. Then, demodulated data can be provided from the decision circuit 708 by deciding the code in accordance with the obtained amplitude ratio $r_j$ or $R_j$.

For example, if the first amplitude ratio $r_j$ and the second amplitude ratio $R_j$ are predetermined as:

$$r_j = 1 - k_1 \cdot j/(j_m - 1),$$

$$R_j = 1 + k_2 \cdot j/(j_m - 1) \quad (8)$$

where $k_1$ and $k_2$ are positive constants, and $j_m$ is a multi-level value of an mapped code j corresponding to the amplitude ratio, this mapped code j can be decided from the following relationship (9) between the code j and the amplitude ratio $r_j$ or $R_j$ provided as a calculation result from the amplitude ratio calculation circuit 707.

$$j=(1-r_j)\cdot(j_m-1)/k_1, \text{ or}$$

$$j=(R_j-1)\cdot(j_m-1)/k_2 \tag{9}$$

The amplitude ratio calculation circuit 707 and the decision circuit 708 can be easily constituted by ROMs (Read Only Memories) and logic circuits, respectively.

Figure 8:
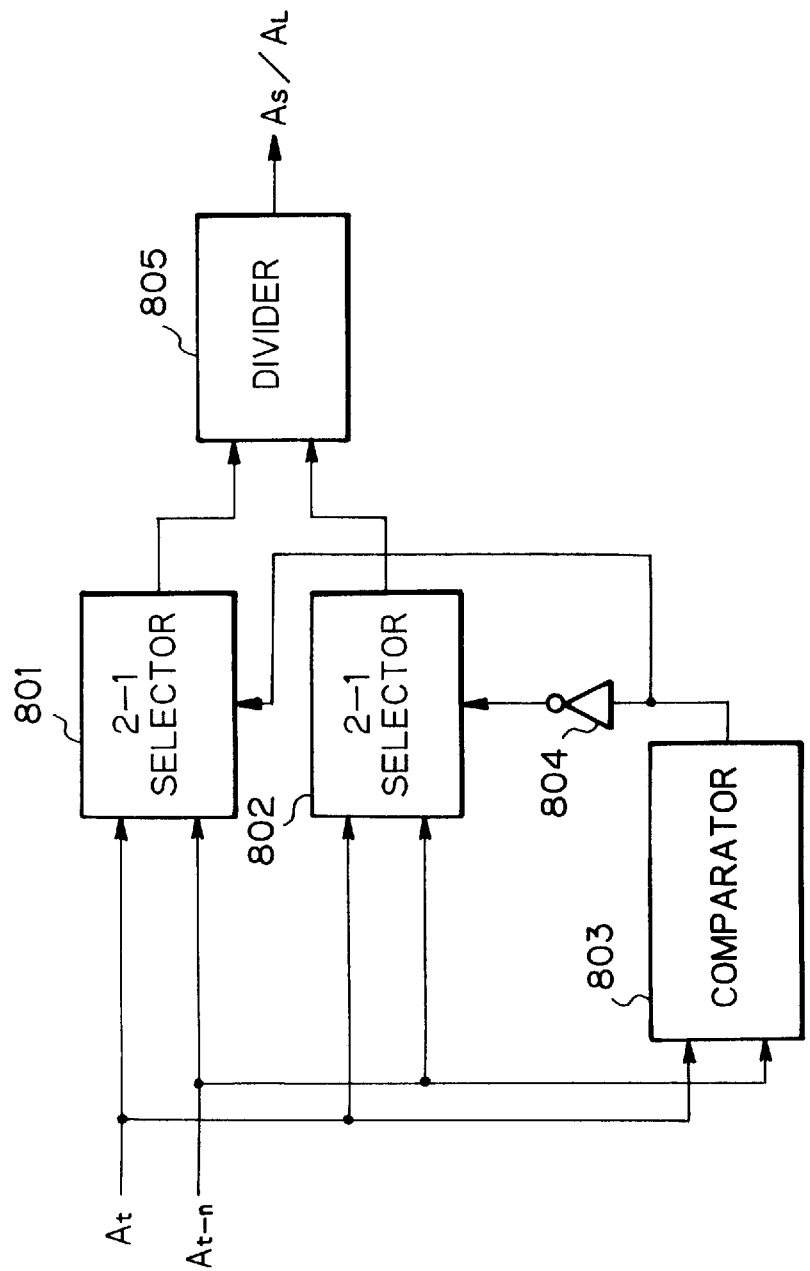
FIG. 8 shows a block diagram illustrating an example of an amplitude ratio calculation circuit in the demodulator shown in FIG. 7.

FIG. 8 illustrates an example of the amplitude ratio calculation circuit 707 in the demodulator shown in FIG. 7.

As will be apparent from the figure, this calculation circuit consists of two 2–1 selectors 801 and 802, a comparator 803, an inverter 804 and a divider 805.

The comparator 803 compares the current instantaneous amplitude $A_t$ with the instantaneous amplitude n symbols previously $A_{t-n}$. Depending upon the comparison result, the selector 801 selects a smaller one ($A_S$) of the amplitudes $A_t$ and $A_{t-n}$ and the selector 802 selects a larger one ($A_L$) of the amplitudes $A_t$ and $A_{t-n}$. If $A_t$ is equal to $A_{t-n}$, these selectors 801 and 802 will output the same amplitude $A_t=A_{t-n}$ as the selected values. These selected values $A_S$ and $A_L$ are inputted into the divider 805 and a ratio $A_S/A_L$ is obtained. It should be noted this ratio (amplitude ratio of $A_t$ and $A_{t-n}$) is always equal to or less than 1.

Figure 9:
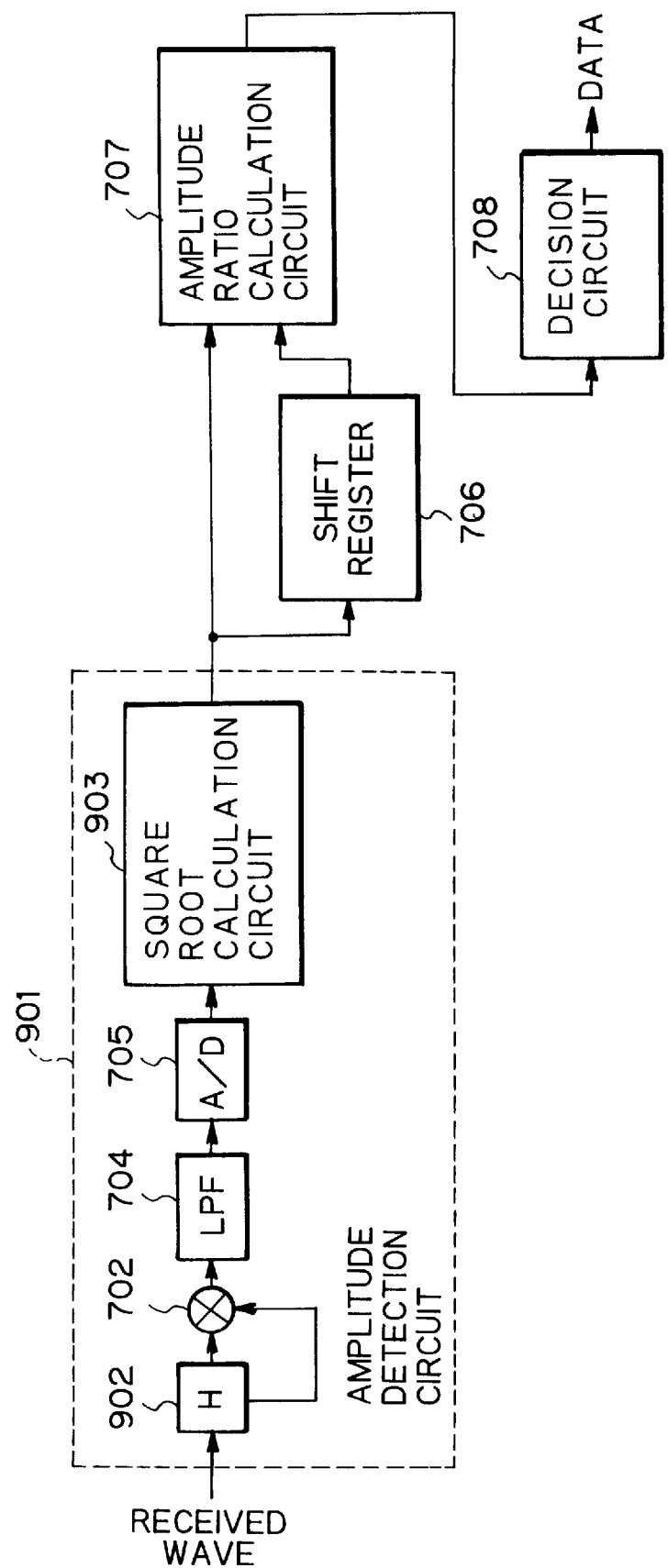
FIG. 9 shows a block diagram illustrating a second concrete constitution of the demodulator in the first embodiment according to the present invention.

FIG. 9 illustrates a second concrete constitution of a demodulator in the first embodiment according to the present invention. In this example, the demodulator substantially consists of an amplitude detection circuit 901, the shift register 706 and the amplitude ratio calculation circuit 707 followed to the amplitude detection circuit 901 and the decision circuit 708. The similar components in this demodulator as these in the demodulator shown in FIG. 7 are illustrated by using the same reference numerals, respectively. The amplitude detection circuit 901 is provided with a hybrid 902, the mixer 702, the LPF 704, the A/D converter 705 and a square root calculation circuit 903.

Received wave $A_t \cdot \cos(2\pi \cdot f_c \cdot t)$ is inputted into the amplitude detection circuit 901. In the amplitude detection circuit 901, the inputted wave is branched at the hybrid 902 and the branched waves are mixed at the mixer 702 with each other. Then, higher harmonic component of the output signal from the mixer 702 is eliminated at the LPF 704 to obtain a square value of instantaneous envelope level in the signal space (square-law detection). The obtained square value is converted into a digital signal at the A/D converter 705. Then, a square root of the converted digital square value is calculated at the square root calculation circuit 903. The calculated value which corresponds to an instantaneous amplitude component in the signal space diagram is then applied to the shift register 706 and to the amplitude ratio calculation circuit 707. In this calculation circuit 707, a ratio $A_t/A_{t-n}$ of the instantaneous amplitude at the current time $A_t$ and the instantaneous amplitude at n symbols previously $A_{t-n}$ provided from the shift register 706.

The operation after that and another constitution of this demodulator are the same as these in the demodulator shown in FIG. 7.

Figure 10:
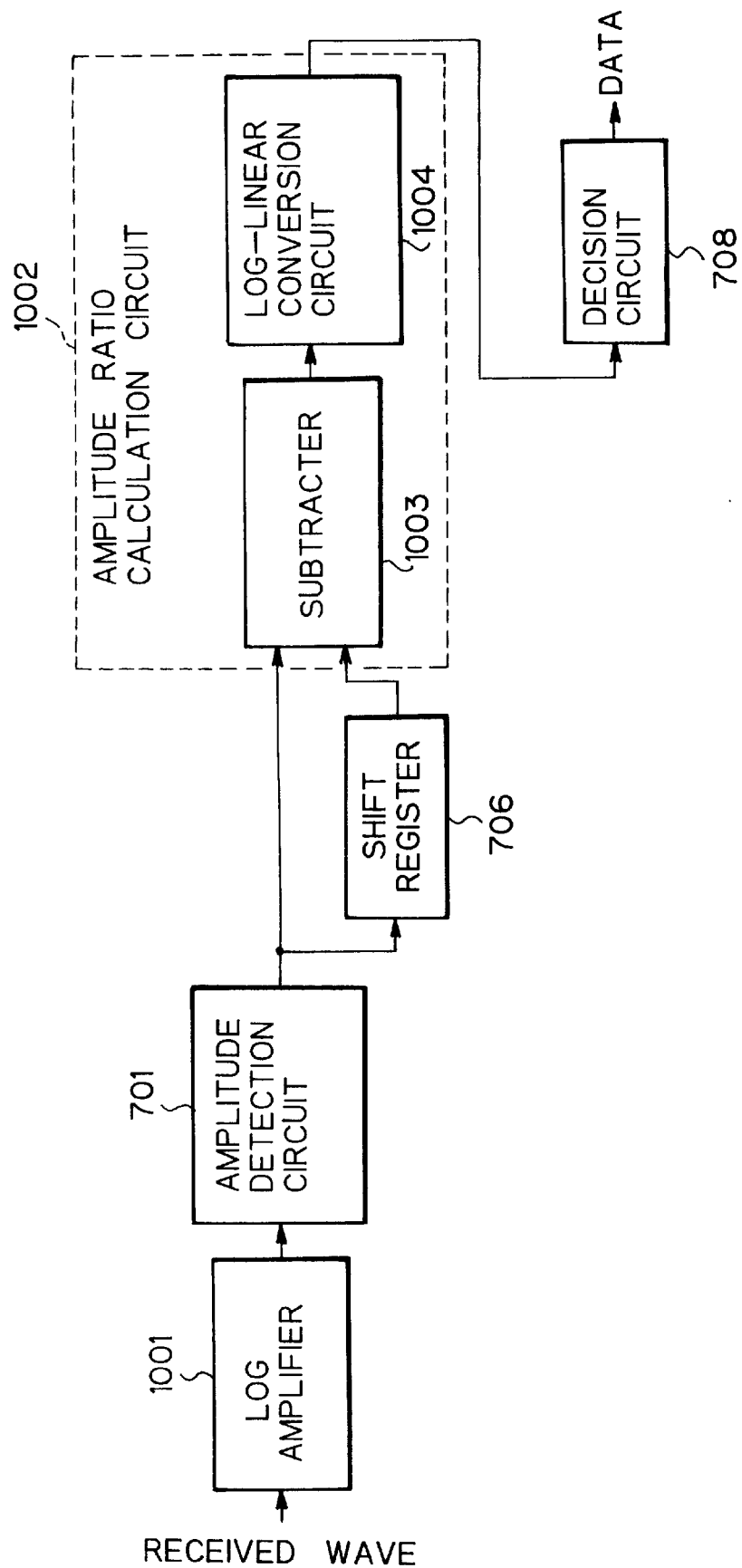
FIG. 10 shows a block diagram illustrating a third concrete constitution of the demodulator in the first embodiment according to the present invention.

FIG. 10 illustrates a third concrete constitution of a demodulator in the first embodiment according to the present invention. In this example, the demodulator substantially consists of a LOG (logarithmic) amplifier 1001, the amplitude detection circuit 701, the shift register 706 and an amplitude ratio calculation circuit 1002 followed to the amplitude detection circuit 701 and the decision circuit 708. The similar components in this demodulator as these in the demodulator shown in FIG. 7 are illustrated by using the same reference numerals, respectively. The amplitude ratio calculation circuit 1002 is provided with a subtracter 1003 and a LOG-linear conversion circuit 1004.

Received wave $A_t \cdot \cos(2\pi \cdot f_c \cdot t)$ is inputted into the LOG amplifier 1001 to be logarithmically amplified as:

$$\log\{G \cdot A_t \cos(2\pi \cdot f_c \cdot t)\} \tag{10}$$

where G is a constant. Then, in the amplitude detection circuit 701, a logarithmically amplified value of an instantaneous envelope level $\log(G \cdot A_t)$ in the signal space is detected. The obtained logarithmically amplified value is then applied to the shift register 706 and to the amplitude ratio calculation circuit 1002. In this calculation circuit 1002, difference between the logarithmically amplified value of an instantaneous envelope level $\log(G \cdot A_t)$ at the current time and a logarithmically amplified value of an instantaneous envelope level at n symbols previously $\log(G \cdot A_{t-n})$ provided from the shift register 706 is calculated at the subtracter 1003 by a following equation.

$$\log(A_t/A_{t-n}) = \log(G \cdot A_t) - \log(G \cdot A_{t-n}) \tag{11}$$

The calculated difference is inversely logarithmically converted at the LOG-linear conversion circuit 1004 so that a ratio $A_t/A_{t-n}$ of the instantaneous envelope level at the current time $A_t$ and the instantaneous envelope level at n symbols previously $A_{t-n}$ is obtained by a following equation (12a) or (12b).

$$A_t/A_{t-n} = \begin{cases} r_j & (\text{if } A_t < A_{t-n}) \\ R_j & (\text{if } A_t \geq A_{t-n}) \end{cases} \tag{12a}$$

$$A_t/A_{t-n} = \begin{cases} r_j & (\text{if } A_t \leq A_{t-n}) \\ R_j & (\text{if } A_t > A_{t-n}) \end{cases} \tag{12b}$$

The operation after that and another constitution of this demodulator are the same as these in the demodulator shown in FIG. 7.

Although, the amplitude of the received wave is detected after the logarithmic amplification in this demodulator shown in FIG. 10, the amplitude can be detected before the logarithmic amplification.

It should be noted that the digital signal processing area and the analog signal processing area can be optionally determined by locations at which the D/A converters and the A/D converters are inserted, and are not limited to these in the above-mentioned examples.

According to the first embodiment, since it is not necessary to detect an absolute amplitude, good demodulation characteristics can be expected even under a bad transmission condition of abrupt level changes.

Composite modulation and demodulation systems can be constituted by combining the aforementioned modulators and demodulators according to the present invention with modulators and demodulators of another modulation methods, respectively.

Figure 11:
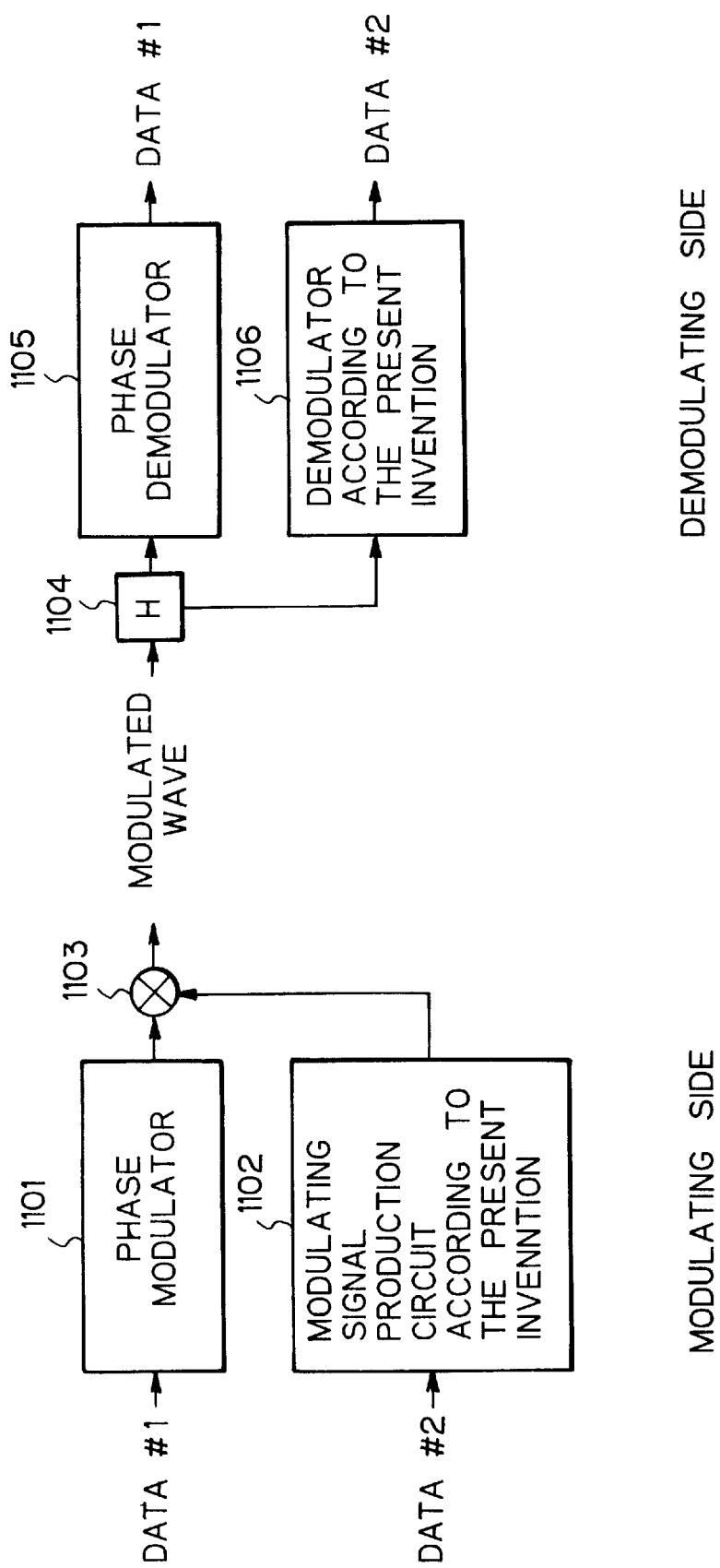
FIG. 11 shows a block diagram illustrating a constitution of a composite modulation system of a phase modulation system and the modulation system in the first embodiment according to the present invention.

FIG. 11 illustrates a constitution of a composite modulation system constituted by combining a phase modulation system and the amplitude ratio modulation system in the first embodiment according to the present invention.

At a modulating part in a transmitting side, a phase-modulated wave from a phase modulator 1101 is mixed at a mixer 1103 with an instantaneous amplitude ratio provided from a modulating signal production circuit 1102 according to the present invention. Thus, the phase modulated signal is further modulated by the instantaneous amplitude ratio. At a demodulating part in a receiving side, a received modulated wave is branched by a hybrid 1104. The branched waves are applied to a phase demodulator 1105 so as to provide a phase demodulated signal and to a demodulator 1106 according to the present invention so as to provide an amplitude ratio demodulated signal.

Figure 12:
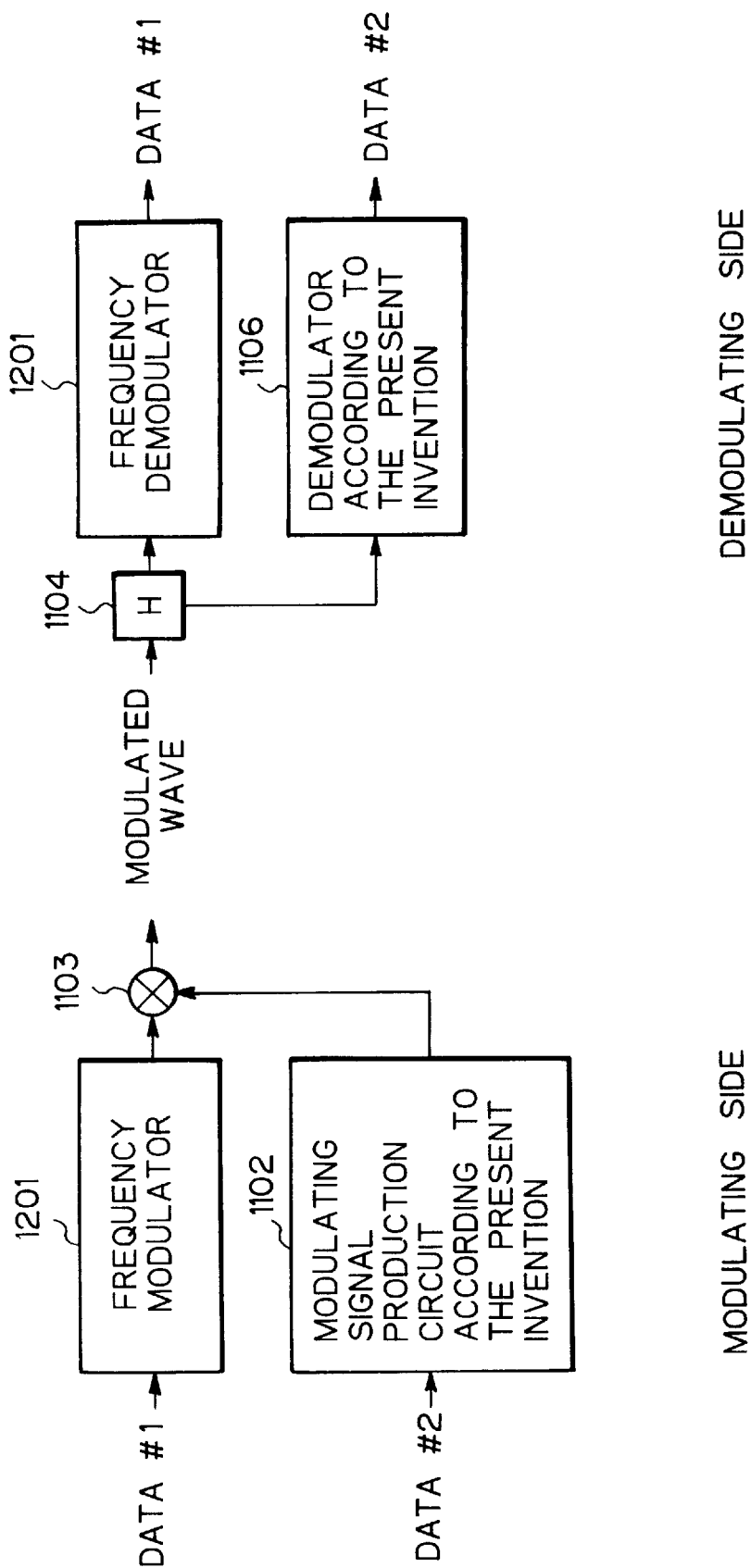
FIG. 12 shows a block diagram illustrating a constitution of a composite modulation system of a frequency modulation system and the modulation system in the first embodiment according to the present invention.

FIG. 12 illustrates a constitution of a composite modulation system constituted by combining a frequency modulation system and the amplitude ratio modulation system in the first embodiment according to the present invention.

At a modulating part in a transmitting side, a frequency-modulated wave from a frequency modulator 1201 is mixed at the mixer 1103 with an instantaneous amplitude ratio provided from the modulating signal production circuit 1102 according to the present invention. Thus, the frequency modulated signal is further modulated by the instantaneous amplitude ratio. At a demodulating part in a receiving side, a received modulated wave is branched by the hybrid 1104. The branched waves are applied to a frequency demodulator 1202 so as to provide a frequency demodulated signal and to the demodulator 1106 according to the present invention so as to provide an amplitude ratio demodulated signal.

According to these composite modulation systems, transmission capacity can be easily increased without changing the structure of the conventional phase or frequency modulation system only by combining the conventional phase or frequency modulation system with the amplitude ratio modulation system according to the present invention.

Figure 13:
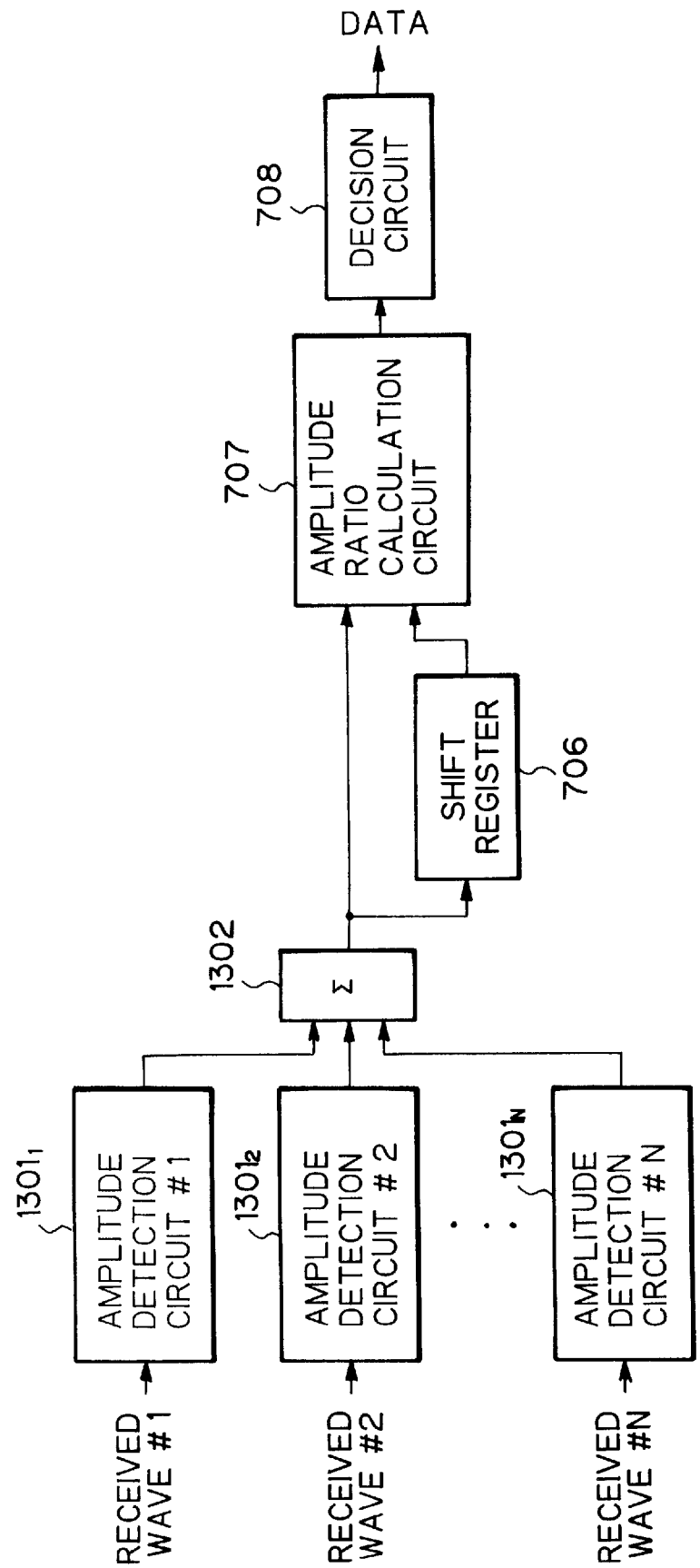
FIG. 13 shows a block diagram illustrating a fourth concrete constitution of the demodulator in the first embodiment according to the present invention.

FIG. 13 illustrates a fourth concrete constitution of a demodulator for diversity combining in the first embodiment according to the present invention. In this example, the demodulator substantially consists of amplitude detection circuits $1301_1$–$1301_N$, a summing circuit 1302, the shift register 706 and the amplitude ratio calculation circuit 707 followed to the summing circuit 1302 and the decision circuit 708. The similar components in this demodulator as these in the demodulator shown in FIG. 7 are illustrated by using the same reference numerals, respectively.

Received waves at the branches #1–#N are inputted into the amplitude detection circuits $1301_1$–$1301_N$. In the amplitude detection circuits $1301_1$–$1301_N$, instantaneous envelope levels of the respective branches are obtained. The obtained instantaneous envelope levels of the respective branches are summed at the summing circuit 1302 to provide an instantaneous amplitude signal. After that, the same operations as that in the demodulator of FIG. 7 are performed to obtain a ratio $A_t/A_{t-n}$ of the instantaneous amplitude at the current time $A_t$ and the instantaneous amplitude at n symbols previously $A_{t-n}$. Then, the demodulated data can be obtained.

Another constitution of this demodulator are the same as these in the demodulator of FIG. 7. Since information exist in the amplitude ratio between the symbols not in the absolute amplitude according to the first embodiment of the present invention, diversity combining with the maximum gain is possible only by summing the detected amplitudes of the branches.

Figure 14:
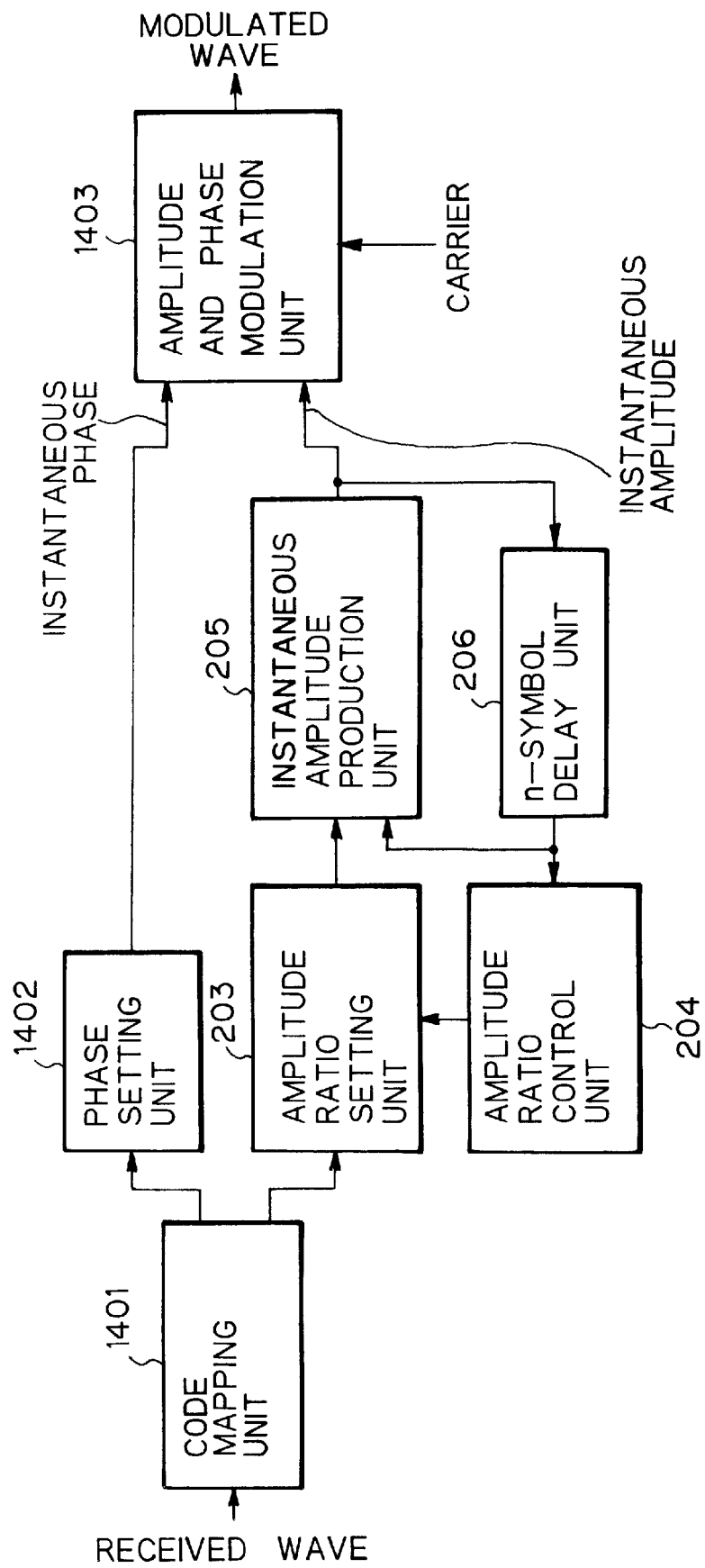
FIG. 14 shows a block diagram illustrating a substantial constitution of a modulating part in a transmitting side in a second embodiment according to the present invention.

As shown in FIG. 14, in a second embodiment according to the present invention, a modulating part in a transmitting side is substantially constituted by a code mapping unit 1401, an amplitude ratio processing part consisting of the amplitude ratio setting unit 203, the amplitude ratio control unit 204, the instantaneous amplitude production unit 205 and the n-symbol delay unit 206, a phase setting unit 1402, and an amplitude and phase modulation unit 1403. The similar components in this modulating side as these in the modulating side shown in FIG. 2 are illustrated by using the same reference numerals, respectively.

Data to be transmitted are inputted into the code mapping unit 1401 wherein a plurality of the inputted data are mapped to a single code. An absolute phase $\phi_t$ in the signal space corresponding to this mapped code is set as an instantaneous phase $\theta_t$ at the phase setting unit 1402. Also, an amplitude ratio value corresponding to this mapped code is set at the amplitude ratio setting unit 203, and then the product of the set amplitude ratio value and an instantaneous amplitude at n symbols previously in time (n is a natural number) outputted from the n-symbol delay unit 206 is produced at the instantaneous amplitude production unit 205 as a current instantaneous amplitude $A_t$.

If only one amplitude ratio value is given for each of the mapped codes, the instantaneous amplitude from the production unit 205 may be gradually increased to diverge when codes corresponding to an amplitude ratio value greater than 1 are successively provided or the instantaneous amplitude from the production unit 205 may be gradually decreased to converge to 0 when codes corresponding to an amplitude ratio value smaller than 1 are successively provided. Thus, in this second embodiment also, two amplitude ratio values, a first amplitude ratio value equal to or smaller than 1 and a second amplitude ratio value equal to or greater than 1, are prepared for a single mapped code, and a threshold value of the amplitude ratio values is predetermined. In the amplitude ratio control unit 204, an instantaneous amplitude at n symbols previously is compared with the threshold value so that the first amplitude ratio equal to or smaller than 1 is outputted from the amplitude ratio setting unit 203 when the instantaneous amplitude at n symbols previously is greater than the threshold value and that the second amplitude ratio equal to or greater than 1 is outputted from the setting unit 203 when the instantaneous amplitude at n symbols previously is equal to or smaller than the threshold value. Thus decided amplitude ratio is applied to the instantaneous amplitude production unit 205 and the product of the decided amplitude ratio and an instantaneous amplitude at n symbols previously is produced therein. As a result, the instantaneous amplitude can be prevented from diverging or from converging to 0. Operations in the amplitude ratio processing part consisting of the amplitude ratio setting unit 203, the amplitude ratio control unit 204, the instantaneous amplitude production unit 205 and the n-symbol delay unit 206 are the same as these in the modulating side in the first embodiment shown in FIG. 2.

The intermediate frequency carrier or radio frequency carrier is modulated by thus obtained instantaneous phase $\theta_t$ and instantaneous amplitude $A_t$ at the amplitude and phase modulation unit 1403 to output an amplitude and phase modulated intermediate frequency (IF) wave or radio frequency (RF) wave.

Figure 3:
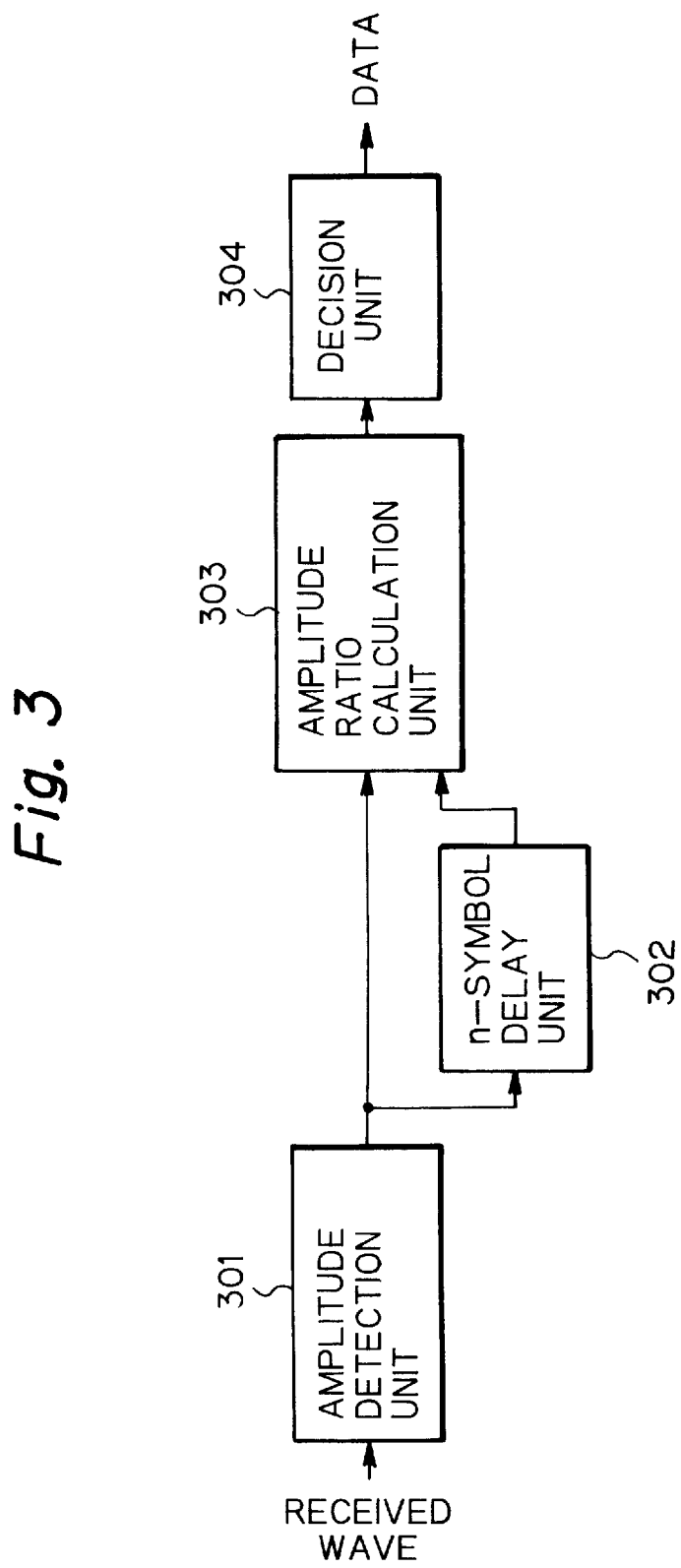
FIG. 3 shows a block diagram illustrating a substantial constitution of a demodulating part in a receiving side in the first embodiment according to the present invention.
Figure 15:
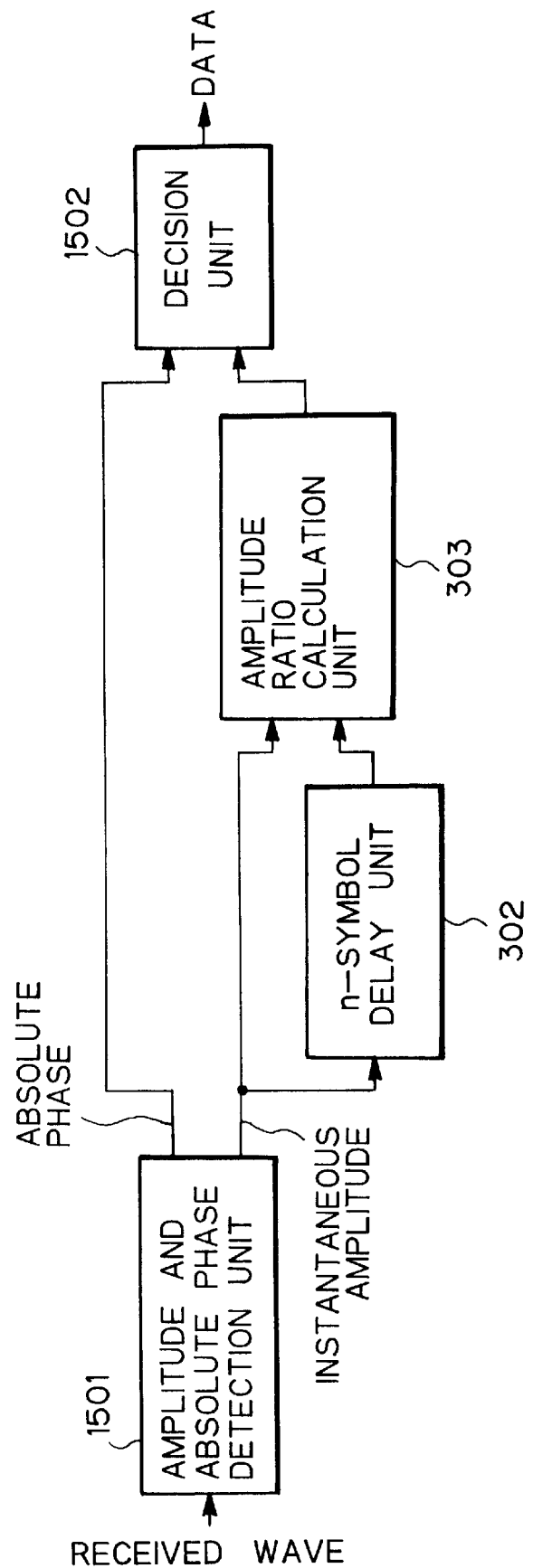
FIG. 15 shows a block diagram illustrating a substantial constitution of a demodulating part in a receiving side in the second embodiment according to the present invention.

As shown in FIG. 15, in the second embodiment according to the present invention, a demodulating part in a receiving side is substantially constituted by an amplitude and absolute phase detection unit 1501, the n-symbol delay unit 302, the amplitude ratio calculation unit 303 and a decision unit 1502. The similar components in this demodulating side as these in the demodulating side shown in FIG. 3 are illustrated by using the same reference numerals, respectively.

Received wave is inputted into the amplitude and absolute phase detection unit 1501, and thus an absolute phase and an instantaneous envelope level in the signal space are detected. The absolute phase is detected by recovering a carrier in the received wave. As well as done in the first embodiment, a ratio of the instantaneous envelope level at the current time and the instantaneous envelope level at n symbols previously provided from the n-symbol delay unit 302 is calculated at the amplitude ratio calculation unit 303. Then, the demodulated data are provided from the decision unit 1502 by deciding the mapped code in accordance with the obtained absolute phase and amplitude ratio.

Hereinafter, constitutions of modulators in the second embodiment according to the present invention are described.

Figure 16:
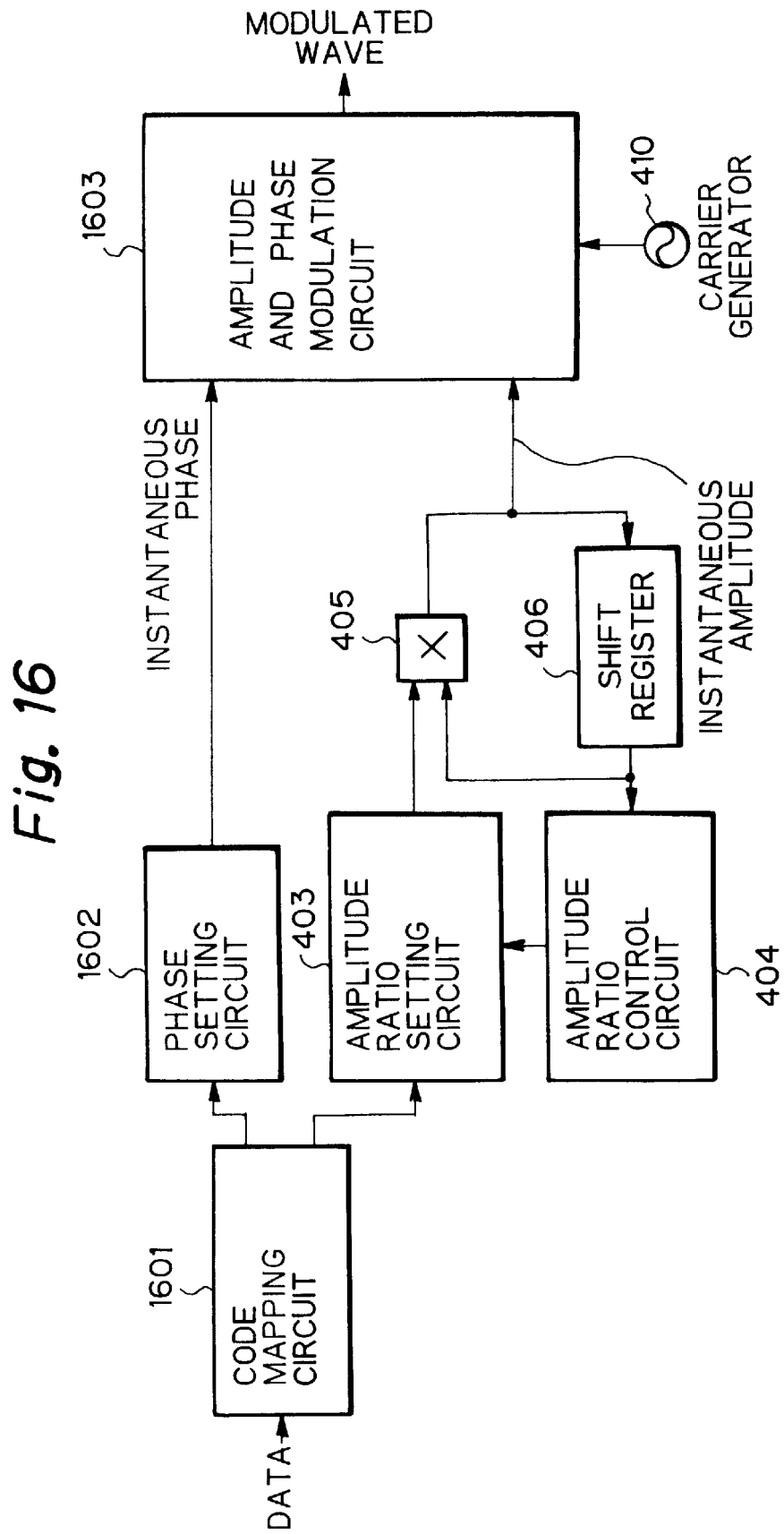
FIG. 16 shows a block diagram illustrating a first concrete constitution of a modulator in the second embodiment according to the present invention.

FIG. 16 illustrates a first concrete constitution of a modulator in the second embodiment according to the present invention. In this example, the modulator substantially consists of a code mapping circuit 1601, a phase setting circuit 1602, the amplitude ratio setting circuit 403, the amplitude ratio control circuit 404, the multiplier 405, the shift register 406, an amplitude and phase modulation circuit 1603 and the carrier generator 410. The similar components in this modulator as these in the modulator shown in FIG. 4 are illustrated by using the same reference numerals, respectively.

Data to be transmitted are inputted into the code mapping circuit 1601. In the circuit 1601, a plurality of inputted data are mapped to a single code. An absolute phase $\phi_i$ in the signal space corresponding to this mapped code is set as an instantaneous phase $\theta_t$ at the phase setting circuit 1602. Also, an amplitude ratio value corresponding to this mapped code is set at the amplitude ratio setting circuit 403, and then the product of the set amplitude ratio value and an instantaneous amplitude at n symbols previously $A_{t-n}$ outputted from the shift register 406 is produced at the multiplier 405 as a current instantaneous amplitude $A_t$.

As is the similar manner in the modulator of the first embodiment shown in FIG. 4, in the amplitude ratio setting circuit 403, two amplitude ratio values, a first amplitude ratio value $r_j$ equal to or smaller than 1 and a second amplitude ratio value $R_j$ equal to or greater than 1, are prepared for a single mapped code. In the amplitude ratio control circuit 404, an instantaneous amplitude at n symbols previously is compared with a predetermined threshold value so that the first amplitude ratio $r_j$ equal to or smaller than 1 is outputted from the amplitude ratio setting circuit 403 when the instantaneous amplitude at n symbols previously is greater than (equal to or greater than ) the threshold value and that the second amplitude ratio $R_j$ equal to or greater than 1 is outputted from the setting circuit 403 when the instantaneous amplitude at n symbols previously is equal to or smaller than (smaller than) the threshold value. Accordingly, a finite instantaneous amplitude without diverging and converging to 0 can be obtained as is in the modulator of FIG. 4.

The intermediate frequency carrier or radio frequency carrier is modulated by thus obtained instantaneous phase $\theta_t$ and instantaneous amplitude $A_t$ at the amplitude and phase modulation circuit 1603 to output an amplitude and phase modulated intermediate frequency (IF) wave or radio frequency (RF) wave.

The code mapping circuit 1601 and the amplitude ratio setting circuit 1602 can be easily constituted by ROMs (Read Only Memories) and logic circuits, respectively.

Figure 17:
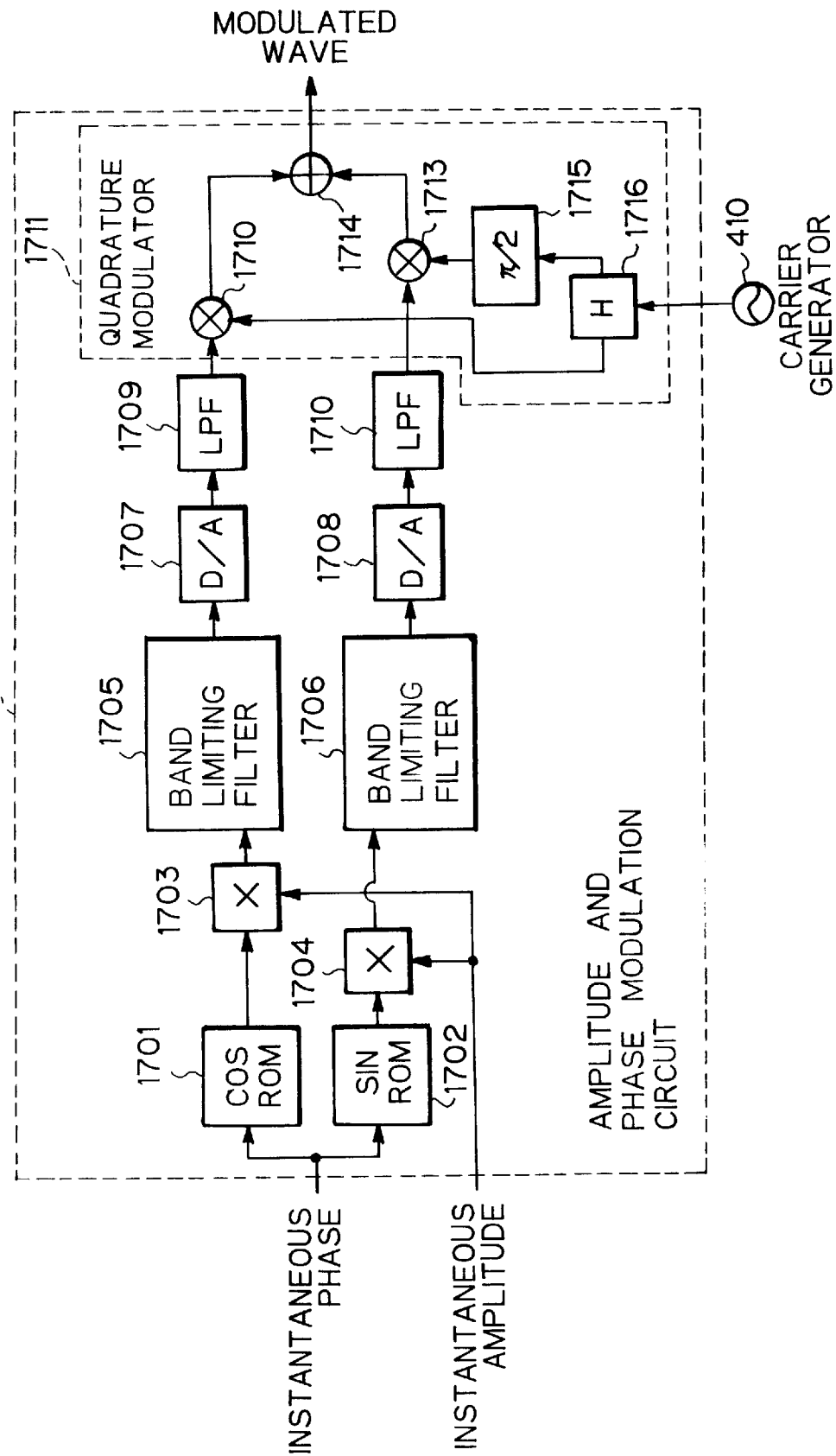
FIG. 17 shows a block diagram illustrating an example of an amplitude-phase modulation circuit in the modulator shown in FIG. 16.

FIG. 17 illustrates an example of the amplitude and phase modulation circuit 1603 in the modulator shown in FIG. 16.

As will be apparent from the figure, this modulation circuit consists of a cosine (COS) ROM 1701, a sine (SIN) ROM 1702, two multipliers 1703 and 1704, two band limiting filters 1705 and 1706, two D/A converters 1707 and 1708, two LPFs 1709 and 1710 and a quadrature modulator 1711. The quadrature modulator 1711 is provided with two mixers 1712 and 1713, an adder 1714, $\pi/2$ phase shifter 1715 and a hybrid 1716.

The instantaneous phase $\theta_t$ is inputted into the COS ROM 1701 and the SIN ROM 1702 to provide its cosine component value $\cos \theta_t$ and sine component value $\sin \theta_t$, respectively. The cosine component value is multiplied with the instantaneous amplitude $A_t$ at the multiplier 1703 and the sine component value is multiplied with the instantaneous amplitude $A_t$ at the multiplier 1704 to provide baseband signals of the rectangular coordinate system consisting of an amplitude in-phase component (I component) $A_{t \cdot \cos \theta_t}$ and an amplitude quadrature component (Q component) $A_{t \cdot \sin \theta_t}$, respectively. The baseband signals are Nyquist pulse shaped at the band limiting filters 1705 and 1706, and then converted into analog signals at the D/A converters 1707 and 1708, respectively. These analog signals are then smoothed at the LPFs 1709 and 1710, respectively. At the quadrature modulator 1711, the smoothed analog signals quadrature modulate radio frequency or intermediate frequency carrier with a frequency of $f_c$, which is applied from the carrier generator 410, to provide a modulated wave $A_t \cdot \cos(\theta_t + 2\pi \cdot f_c \cdot t)$.

The amplitude and phase modulation circuit 1603 in the modulator shown in FIG. 16 can be constituted by any one of various known modulation circuits other than that shown in FIG. 17. Thus, the modulation circuit 1603 is not limited to that shown in FIG. 17.

Figure 18:
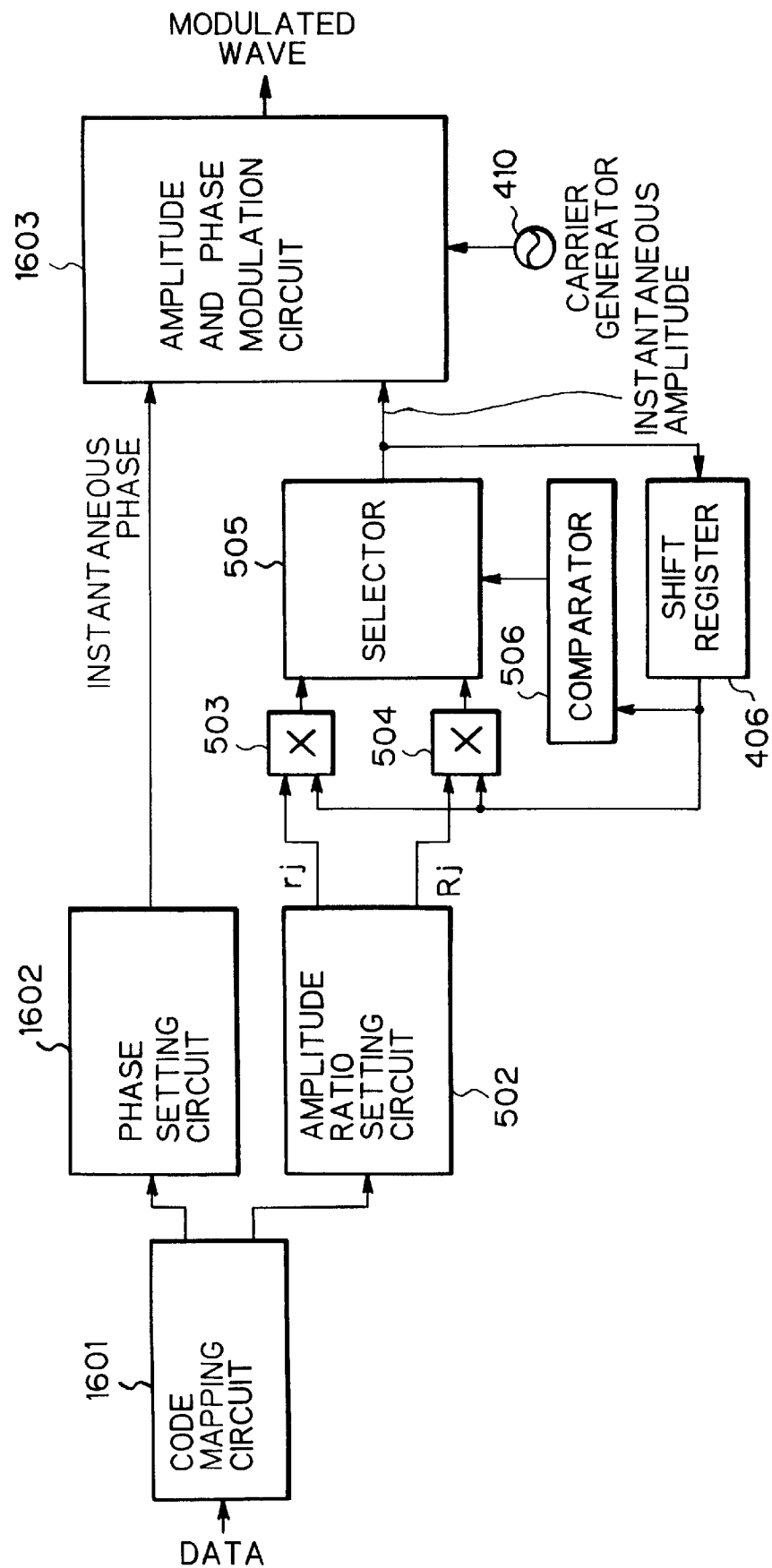
FIG. 18 shows a block diagram illustrating a second concrete constitution of the modulator in the second embodiment according to the present invention.

FIG. 18 illustrates a second concrete constitution of a modulator in the second embodiment according to the present invention. In this example, the modulator substantially consists of the code mapping circuit 1601, the phase setting circuit 1602, the amplitude ratio setting circuit 502, the multipliers 503 and 504, the selector 505, the comparator 506, the shift register 406, the amplitude and phase modulation circuit 1603 and the carrier generator 410. The similar components in this modulator as these in the modulator shown in FIG. 5 are illustrated by using the same reference numerals, respectively.

Data to be transmitted are inputted into the code mapping circuit 1601. In the circuit 1601, a plurality of inputted data are mapped to a single code. An absolute phase $\phi_i$ in the signal space corresponding to this mapped code is set as an instantaneous phase $\theta_t$ at the phase setting circuit 1602. Also, two amplitude ratio values corresponding to this mapped code, a first amplitude ratio value $r_j$ equal to or smaller than 1 and a second amplitude ratio value $R_j$ equal to or greater than 1, are set at the amplitude ratio setting circuit 502 as is in the modulator of FIG. 5. The product $r_j \cdot A_{t-n}$ of the set first amplitude ratio $r_j$ and an instantaneous amplitude at n symbols previously $A_{t-n}$ outputted from the shift register 406 is produced at the multiplier 503. Also the product $R_j \cdot A_{t-n}$ of the set second amplitude ratio $R_j$ and the instantaneous amplitude at n symbols previously $A_{t-n}$ outputted from the shift register 406 is produced at the multiplier 504. These two products are inputted into the selector 505. The comparator 506 compares the instantaneous amplitude at n symbols previously $A_{t-n}$ with a threshold value to produce a selection signal. This selection signal is applied to the selector 505 so that the selector 505 outputs the product $r_j \cdot A_{t-n}$ when the instantaneous amplitude at n symbols previously is greater than (equal to or greater than) the threshold value and outputs the product $R_j \cdot A_{t-n}$ when the instantaneous amplitude at n symbols previously is equal to or smaller than (smaller than) the threshold value. Accordingly, a finite instantaneous amplitude without diverging and converging to 0 can be obtained as is in the modulator of FIG. 5.

The intermediate frequency carrier or radio frequency carrier is modulated by thus obtained instantaneous phase $\theta_t$ and instantaneous amplitude $A_t$ at the amplitude and phase modulation circuit 1603 to output an amplitude and phase modulated intermediate frequency (IF) wave or radio frequency (RF) wave.

The operation after that and another constitution of this modulator are the same as these in the modulator shown in FIG. 16.

Figure 19:
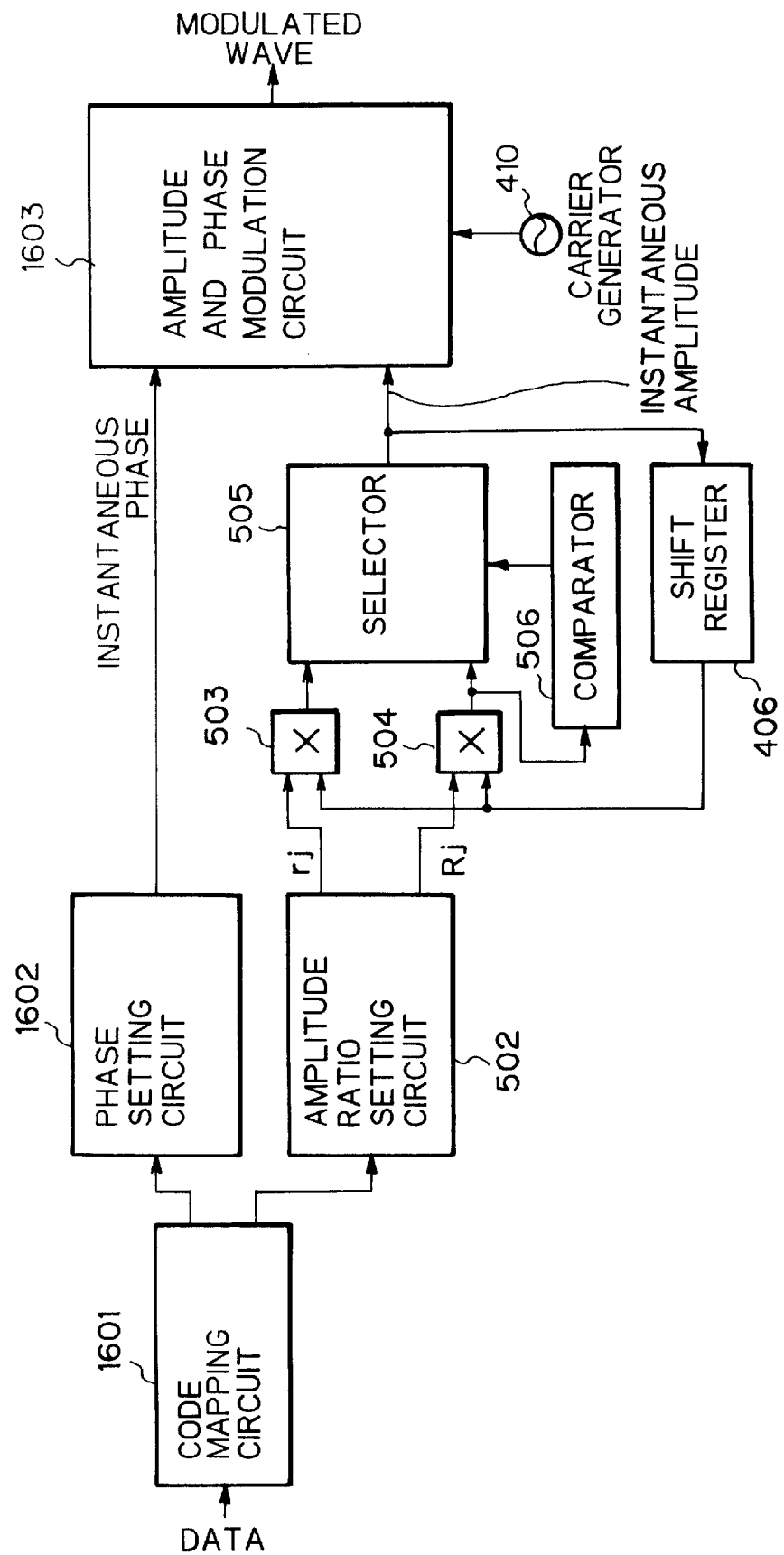
FIG. 19 shows a block diagram illustrating a third concrete constitution of the modulator in the second embodiment according to the present invention.

FIG. 19 illustrates a third concrete constitution of a modulator in the second embodiment according to the present invention. In this example, the modulator substantially consists of the code mapping circuit 1601, the phase setting circuit 1602, the amplitude ratio setting circuit 502, the multipliers 503 and 504, the selector 505, the comparator 506, the shift register 406, the amplitude and phase modulation circuit 1603 and the carrier generator 410. The similar components in this modulator as these in the modulator shown in FIGS. 5 and 6 are illustrated by using the same reference numerals, respectively.

Data to be transmitted are inputted into the code mapping circuit 1601. In the circuit 1601, a plurality of inputted data are mapped to a single code. An absolute phase $\phi_i$ in the signal space corresponding to this mapped code is set as an instantaneous phase $\theta_t$ at the phase setting circuit 1602. Also, two amplitude ratio values corresponding to this mapped code, a first amplitude ratio value $r_j$ equal to or smaller than 1 and a second amplitude ratio value $R_j$ equal to or greater than 1, are set at the amplitude ratio setting circuit 502 as is in the modulator of FIG. 5. The product $r_j \cdot A_{t-n}$ of the set first amplitude ratio $r_j$ and an instantaneous amplitude at n symbols previously $A_{t-n}$ outputted from the shift register 406 is produced at the multiplier 503. Also the product $R_j \cdot A_{t-n}$ of the set second amplitude ratio $R_j$ and the instantaneous amplitude at n symbols previously $A_{t-n}$ outputted from the shift register 406 is produced at the multiplier 504. These two products are inputted into the selector 505. The comparator 506 compares the product $R_j \cdot A_{t-n}$ with a threshold value to produce a selection signal. This selection signal is applied to the selector 505 so that the selector 505 outputs the product $r_j \cdot A_{t-n}$ when the product $R_j \cdot A_{t-n}$ is greater than (equal to or greater than) the threshold value and outputs the product $R_j \cdot A_{t-n}$ when the product $R_j \cdot A_{t-n}$ is equal to or smaller than (smaller than) the threshold value. Accordingly, a finite instantaneous amplitude without diverging and converging to 0 can be obtained as is in the modulator of FIG. 6.

The intermediate frequency carrier or radio frequency carrier is modulated by thus obtained instantaneous phase $\theta_t$ and instantaneous amplitude $A_t$ at the amplitude and phase modulation circuit 1603 to output an amplitude and phase modulated intermediate frequency (IF) wave or radio frequency (RF) wave.

The operation after that and another constitution of this modulator are the same as these in the modulator shown in FIG. 18.

Hereinafter, constitutions of demodulators in the second embodiment according to the present invention are described.

Figure 20:
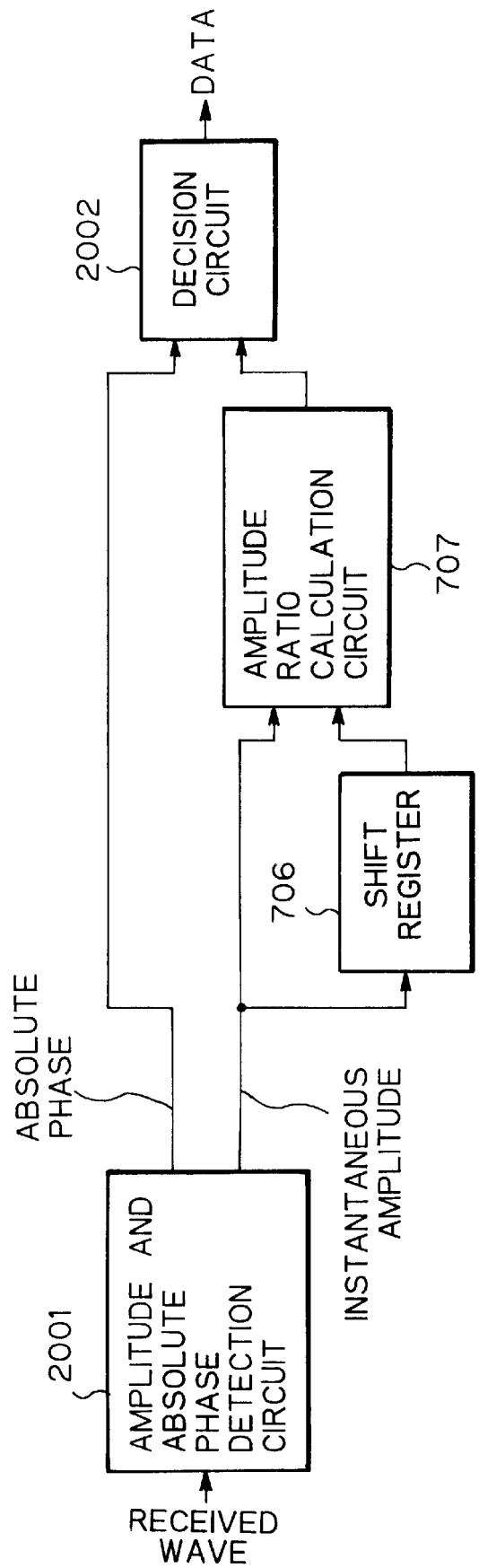
FIG. 20 shows a block diagram illustrating a first concrete constitution of a demodulator in the second embodiment according to the present invention.

FIG. 20 illustrates a first concrete constitution of a demodulator in the second embodiment according to the present invention. In this example, the demodulator substantially consists of an amplitude and absolute phase detection circuit 2001, the shift register 706 and the amplitude ratio calculation circuit 707 followed to the detection circuit 2001 and a decision circuit 2002. The similar components in this demodulator as these in the demodulator shown in FIG. 7 are illustrated by using the same reference numerals, respectively.

Received wave $A_t \cdot \cos(2\pi \cdot f_c \cdot t)$ is inputted into the amplitude and absolute phase detection circuit 2001, and thus an absolute phase $\theta_t$ and an instantaneous envelope level At in the signal space are detected. With respect to phase, an instantaneous phase $\theta_t$ is the absolute phase $\phi_i$ detected by recovering a carrier in the received wave. With respect to amplitude, as well as done in the demodulator of FIG. 7 in the first embodiment, a ratio $A_t/A_{t-n}$ of the instantaneous envelope level at the current time $A_t$ and the instantaneous envelope level at n symbols previously $A_{t-n}$ provided from the shift register 706 is calculated at the amplitude ratio calculation circuit 707 to provide $r_j$ or $R_j$ corresponding to the mapped code.

Demodulated data can be obtained from the decision circuit 2002 by deciding the mapped code in accordance with thus obtained absolute phase $\phi_i$ and amplitude ratio $r_j$ or $R_j$.

For example, if the absolute phase $\phi_i$, and the first amplitude ratio $r_j$ or the second amplitude ratio $R_j$ are predetermined at the transmitting side as:

$$\phi_i = 2\pi \cdot i/i_m \tag{13}$$

where $i_m$ is a multi-level value of an mapped code i corresponding to the absolute phase, and $$r_j = 1 - k_1 \cdot j/(j_m - 1),$$
$$R_j = 1 + k_2 \cdot j/(j_m - 1) \tag{14}$$

where $k_1$ and $k_2$ are positive constants, and $j_m$ is a multi-level value of an mapped code j corresponding to the amplitude ratio, the mapped code i for absolute phase can be decided from the following relationship (15) between the code i and the detected absolute phase $\phi_i$ provided from the detection circuit 2001, $$i = \phi_i \cdot i_m / 2\pi \tag{15}$$

and also the mapped code j for amplitude ratio can be decided from the following relationship (16) between the code j and the amplitude ratio $r_j$ or $R_j$ provided as a calculation result from the amplitude ratio calculation circuit 707.

$$j = (1 - r_j) \cdot (j_m - 1)/k_1, \text{ or}$$
$$j = (R_j - 1) \cdot (j_m - 1)/k_2 \tag{16}$$

The decision circuit 2002 can be easily constituted by ROM (Read Only Memory) and logic circuit.

Figure 21:
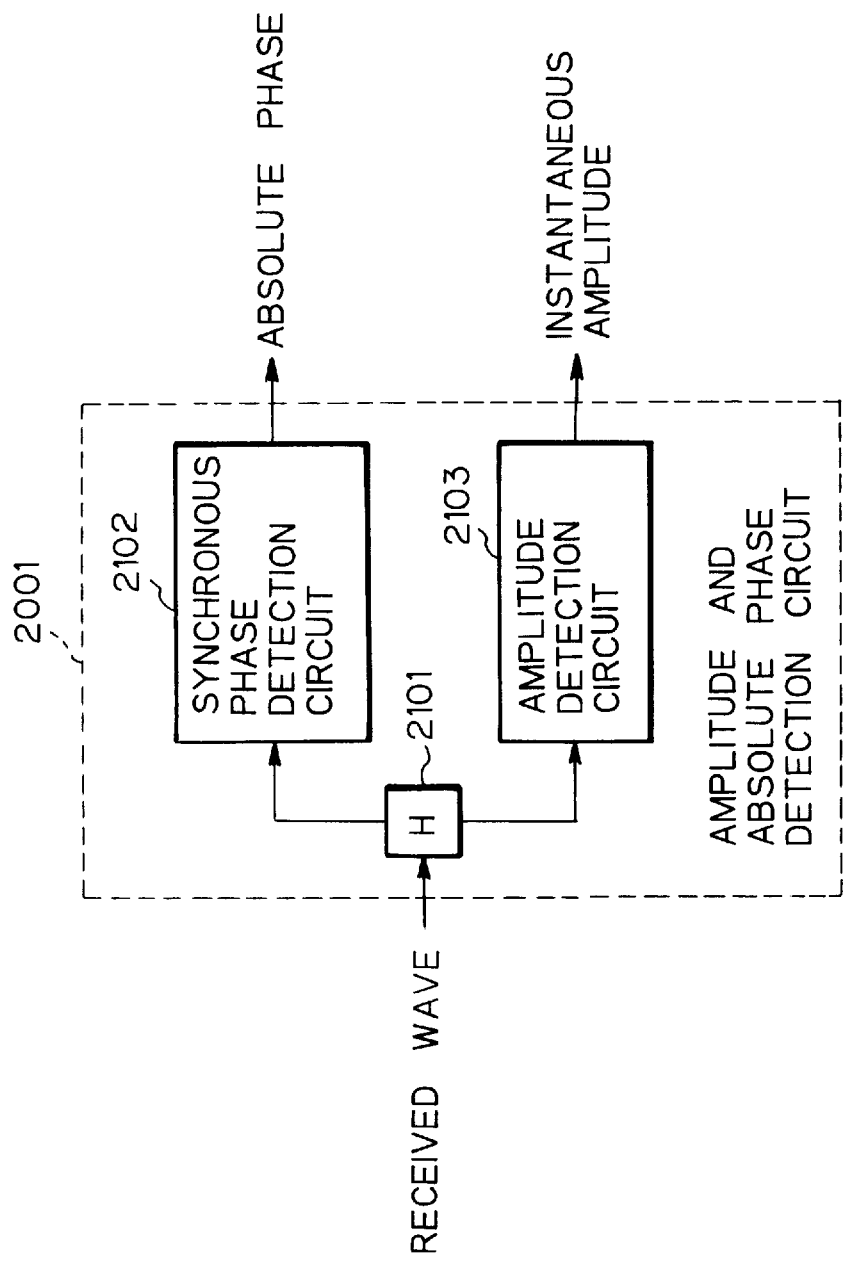
FIG. 21 shows a block diagram illustrating a first example of an amplitude and absolute phase detection circuit in the demodulator shown in FIG. 20.

FIG. 21 illustrates an example of the amplitude and absolute phase detection circuit 2001 in the demodulator shown in FIG. 20.

As will be apparent from the figure, this detection circuit 2001 consists of a hybrid 2101, a synchronous phase detection circuit 2102 and an amplitude detection circuit 2103.

The received wave is branched at the hybrid 2101 and applied to the synchronous phase detection circuit 2102 and to the amplitude detection circuit 2103. In the synchronous phase detection circuit 2102, an absolute phase in the signal space is detected, and in the amplitude detection circuit 2103, an instantaneous envelope level which is an instantaneous amplitude in the signal space is detected.

As for the synchronous phase detection circuit 2102, various absolute phase detectors such as a synchronous detector using carrier multiplying method or Costas circuit can be adapted. As for the amplitude detection circuit 2103, the amplitude detection circuit 701 shown in FIG. 7 can be adapted.

Figure 22:
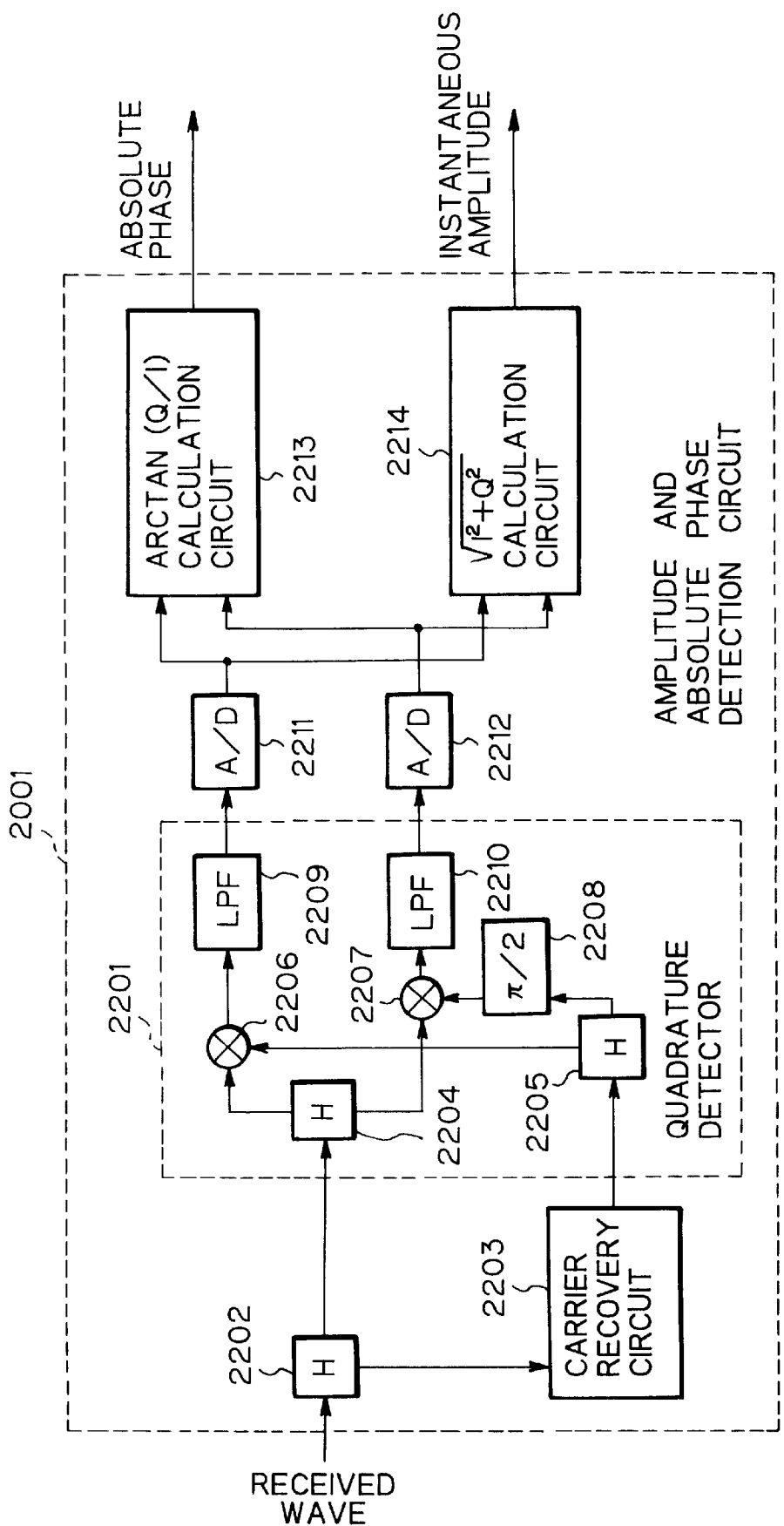
FIG. 22 shows a block diagram illustrating a second example of the amplitude and absolute phase detection circuit in the demodulator shown in FIG. 20.

FIG. 22 illustrates an another example of the amplitude and absolute phase detection circuit 2001 in the demodulator shown in FIG. 20.

As will be apparent from this figure, this detection circuit 2001 consists of a quadrature detector 2201, a hybrid 2202, a carrier recovery circuit 2203, two A/D converters 2211 and 2212 and calculation circuits 2213 and 2214. The quadrature detector 2201 is provided with two hybrids 2204 and 2205, two mixers 2206 and 2207, a π/2 phase shifter 2208 and two LPFs 2209 and 2210.

The received wave $A_r \cdot \cos(2\pi \cdot f_c \cdot t)$ is branched at the hybrid 2202 and applied to the quadrature detector 2201 and to the carrier recovery circuit 2203. In the carrier recovery circuit 2203, a carrier with a frequency $f_c$ is recovered from the received wave. In the quadrature detector 2201, the received wave is quadrature detected by this recovered carrier to provide baseband signals of the rectangular coordinate system consisting of I component $I=A_r \cdot \cos \theta_r$ and Q component $Q=A_r \cdot \sin \theta_r$. The baseband signals are converted into digital signals at the A/D converters 2211 and 2212, respectively. These digital signals are then applied to the calculation circuit 2213 to provide an instantaneous phase $\theta_t$ which is the absolute phase $\phi_i$ in the signal space. Also these digital signals are applied to the calculation circuit 2214 to provide an instantaneous envelope level $A_t$ which is an instantaneous amplitude in the signal space.

The amplitude and absolute phase detection circuit 2001 in the demodulator shown in FIG. 20 can be constituted by any one of various known detection circuits other than that shown in FIG. 22. Thus, the detection circuit 2001 is not limited to these shown in FIGS. 21 and 22.

Figure 23:
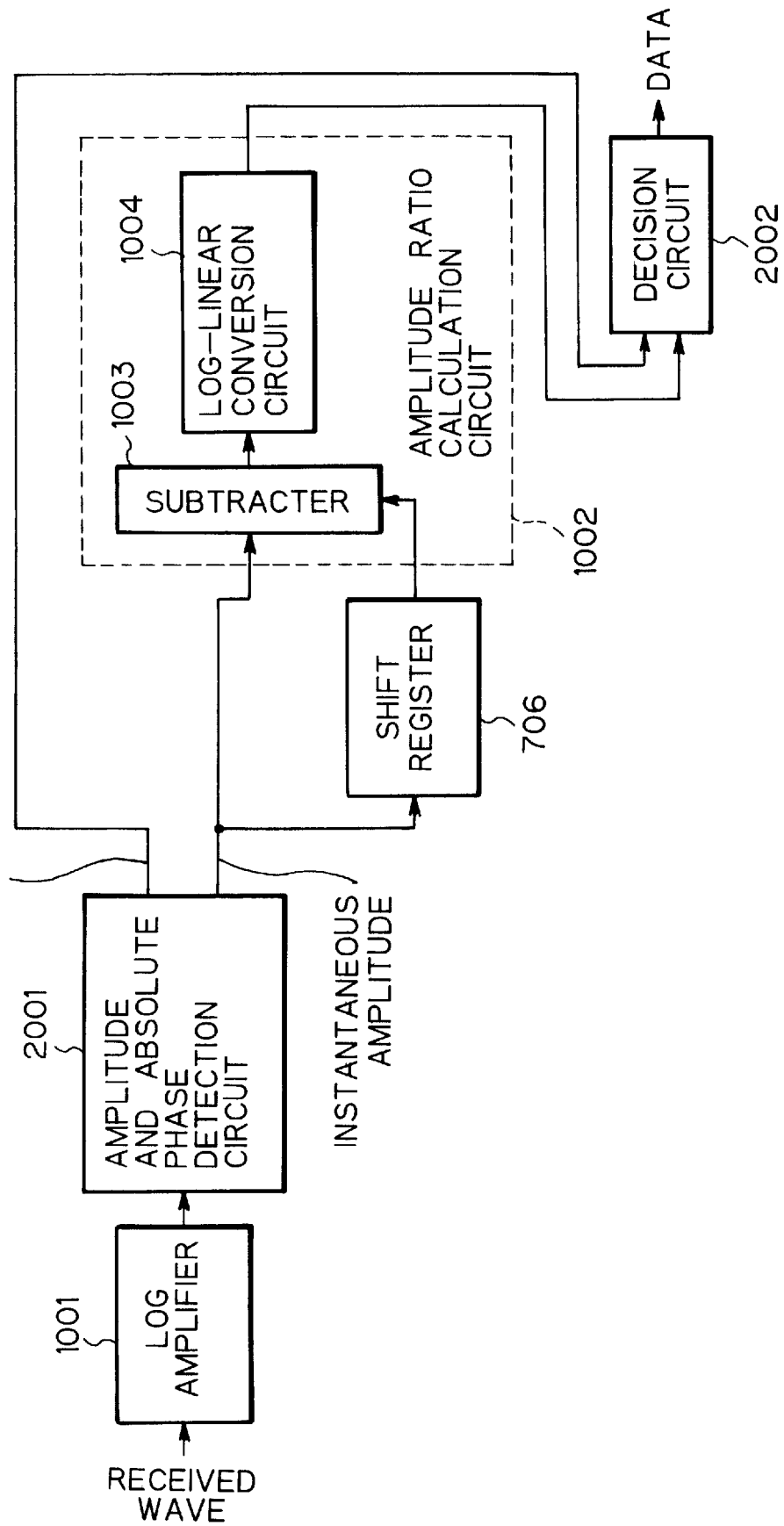
FIG. 23 shows a block diagram illustrating a second concrete constitution of the demodulator in the second embodiment according to the present invention.

FIG. 23 illustrates a second concrete constitution of a demodulator in the second embodiment according to the present invention. In this example, the demodulator substantially consists of the LOG (logarithmic) amplifier 1001, the amplitude and absolute phase detection circuit 2001, the shift register 706 and the amplitude ratio calculation circuit 1002 followed to the amplitude and absolute phase detection circuit 2001 an d the decision circuit 2002. The similar components in this demodulator as these in the demodulators shown in FIGS. 10 and 20 are illustrated by using the same reference numerals, respectively. The amplitude ratio calculation circuit 1002 is provided with the subtracter 1003 and the LOG-linear conversion circuit 1004.

Received wave $A_r \cdot \cos(2\pi \cdot f_c \cdot t)$ is inputted into the LOG amplifier 1001 to be logarithmically amplified as log $\{G \cdot A_{r \cdot cos}(2\pi \cdot f_c \cdot t)\}$, where G is a constant. Then, in the amplitude and absolute phase detection circuit 2001, an absolute phase $\theta_t$ and an instantaneous amplitude $A_t$ are detected. With respect to phase, an instantaneous phase $\theta_t$ is the absolute phase $\phi_i$ detected by recovering a carrier in the received wave as well as done in the demodulator of FIG. 20. With respect to amplitude, as well as done in the demodulator of FIG. 10 in the first embodiment, a ratio $A_t/A_{t-n}$ of the instantaneous amplitude at the current time $A_t$ and the instantaneous amplitude at n symbols previously $A_{t-n}$ provided from the shift register 706 is calculated at the amplitude ratio calculation circuit 1003 to provide $r_j$ or $R_j$ corresponding to the mapped code.

Demodulated data can be obtained from the decision circuit 2002 by deciding the mapped code in accordance with thus obtained absolute phase $\phi_i$ and amplitude ratio $r_j$ or $R_j$.

Although, the amplitude of the received wave is detected after the logarithmic amplification in this demodulator shown in FIG. 23, the amplitude can be detected before the logarithmic amplification.

According to the second embodiment as well as in the first embodiment, since it is not necessary to detect an absolute amplitude, good demodulation characteristics can be expected even under a bad transmission condition of abrupt level changes.

FIG. 24 illustrates a third concrete constitution of a demodulator for diversity combining in the second embodiment according to the present invention. In this example, the demodulator substantially consists of amplitude and absolute phase detection circuits $2401_1$–$2401_N$, a selection circuit 2402, the summing circuit 1302, the shift register 706 and the amplitude ratio calculation circuit 707 followed to the summing circuit 1302 and the decision circuit 2002. The similar components in this demodulator as these in the demodulators shown in FIGS. 7, 13 and 20 are illustrated by using the same reference numerals, respectively.

Received waves at the branches #1–#N are inputted into the amplitude and absolute phase detection circuits $2401_1$–$2401_N$. In the detection circuits $2401_1$–$2401_N$, absolute phases and instantaneous envelope levels which are instantaneous amplitudes, of the respective branches are obtained. The obtained absolute phases of the respective branches are inputted into the selection circuit 2402 and then one of the absolute phases is selected depending upon the instantaneous envelope levels of the respective branches (selection combining). On the other hand, the obtained instantaneous envelope levels of the respective branches are summed at the summing circuit 1302 to provide an instantaneous amplitude signal. After that, the same operations as that in the demodulator of FIG. 20 are performed to obtain a ratio $A_t/A_{t-n}$ of the instantaneous amplitude at the current time $A_t$ and the instantaneous amplitude at n symbols previously $A_{t-n}$. Then, the demodulated data can be obtained.

Figure 25B:
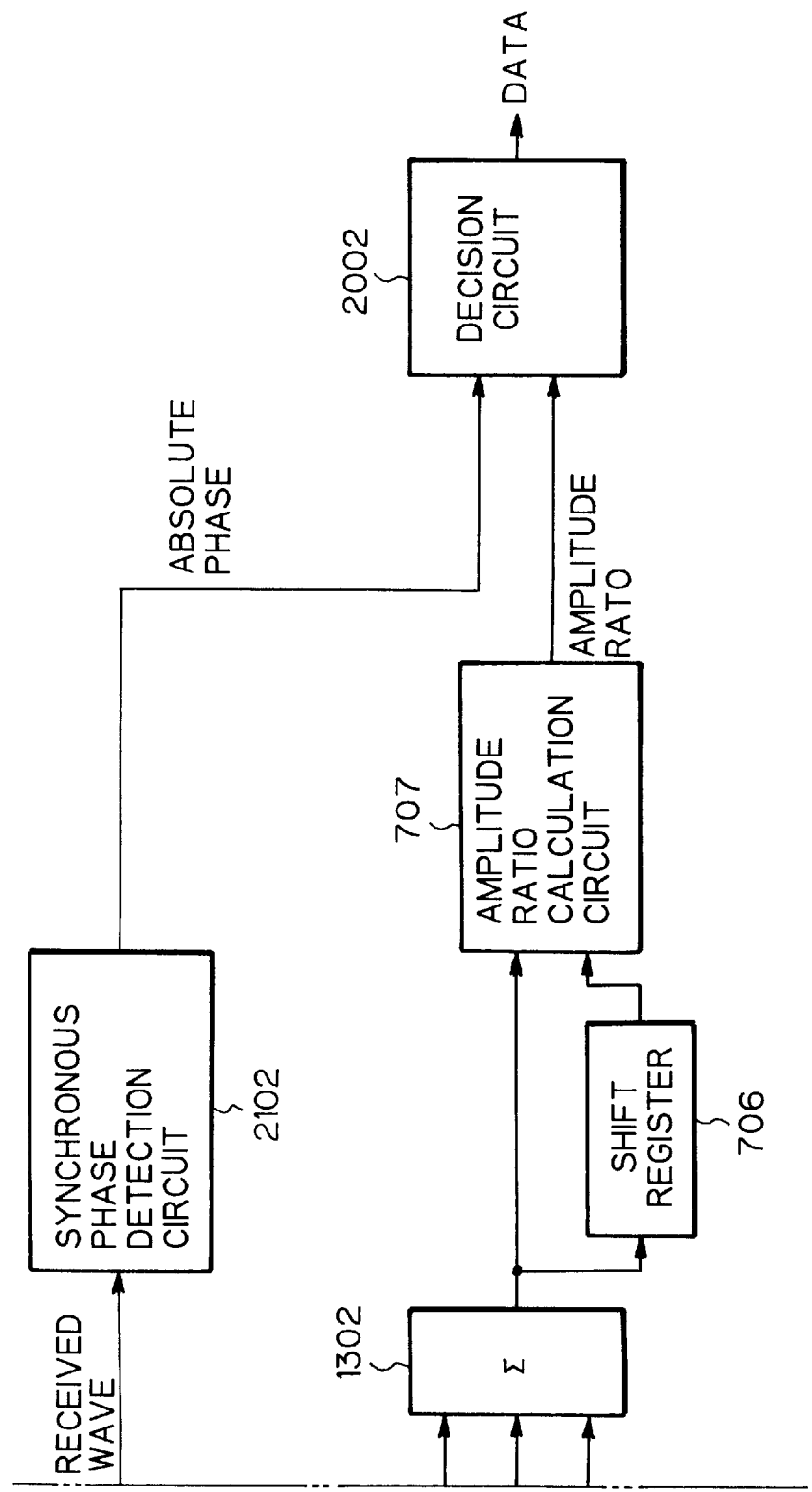

FIG. 25 illustrates a fourth concrete constitution of a demodulator for diversity combining in the second embodiment according to the present invention. In this example, the demodulator substantially consists of hybrids $2501_1$–$2501_N$, amplitude detection circuits $2502_1$–$2502_N$, a selection circuit 2503, the synchronous phase detection circuit 2102 followed to the selection circuit 2503, the summing circuit 1302, the shift register 706 and the amplitude ratio calculation circuit 707 followed to the summing circuit 1302 and the decision circuit 2002. The similar components in this demodulator as these in the demodulators shown in FIGS. 7, 13, 20 and 21 are illustrated by using the same reference numerals, respectively.

Received waves at the branches #1–#N are branched at the hybrids $2501_1$–$2501_N$, respectively and then inputted into the amplitude detection circuits $2502_1$–$2502_N$ and into the selection circuit 2503, respectively. In the detection circuits $2502_1$–$2502_N$, instantaneous envelope levels which are instantaneous amplitudes, of the respective branches are detected. In the selection circuit 2503, one of the received waves is selected depending upon the detected instantaneous envelope levels form the respective detection circuits $2502_1$–$2502_N$. The selected received wave is applied to the synchronous phase detection circuit 2102 and thus an absolute phase $\phi_i$ is obtained. On the other hand, the obtained instantaneous envelope levels of the respective branches are summed at the summing circuit 1302 to provide an instantaneous amplitude signal. After that, the same operations as that in the demodulator of FIG. 20 are performed to obtain a ratio $A_t/A_{t-n}$ of the instantaneous amplitude at the current time $A_t$ and the instantaneous amplitude at n symbols previously $A_{t-n}$. Then, the demodulated data can be obtained.

Since information exist in the amplitude ratio between the symbols not in the absolute amplitude according to the second embodiment as well as in the first embodiment of the present invention, diversity combining with the maximum gain is possible only by summing the detected amplitudes of the branches. With respect to phase combining, another combining methods such as an equal gain combining or maximal ratio combining can be utilized other than the aforementioned selection combining.

Figure 26:
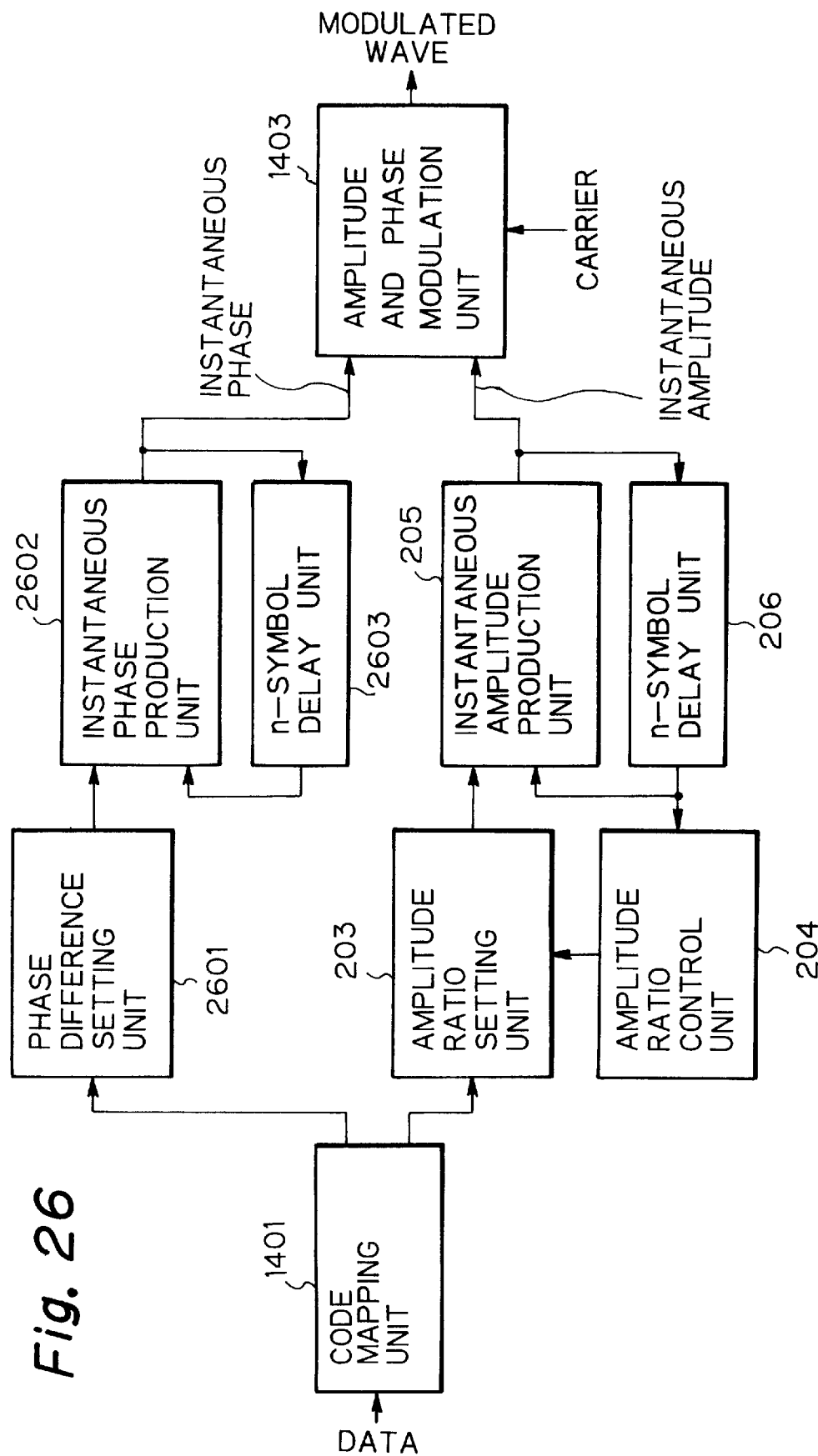
FIG. 26 shows a block diagram illustrating a substantial constitution of a modulating part in a transmitting side in a third embodiment according to the present invention.

As shown in FIG. 26, in a third embodiment according to the present invention, a modulating part in a transmitting side is substantially constituted by the code mapping unit 1401, an amplitude ratio processing part consisting of the amplitude ratio setting unit 203, the amplitude ratio control unit 204, the instantaneous amplitude production unit 205 and the n-symbol delay unit 206, a phase difference setting unit 2601, an instantaneous phase production unit 2602, a n-symbol delay unit 2603 and the amplitude and phase modulation unit 1403. The similar components in this modulating side as these in the modulating sides shown in FIGS. 2 and 14 are illustrated by using the same reference numerals, respectively.

Data to be transmitted are inputted into the code mapping unit 1401 wherein a plurality of the inputted data are mapped to a single code. A phase difference $\phi_i$ corresponding to this mapped code is set at the phase difference setting unit 2601. An instantaneous phase at n symbols previously in time (n is a natural number) $\theta_{t-n}$ outputted from the n-symbol delay unit 2603 is added to this phase difference $\phi_i$ to produce an instantaneous phase $\theta_t$ at the instantaneous phase production unit 2602. Also, an amplitude ratio corresponding to this mapped code is set at the amplitude ratio setting unit 203, and then the product of the set amplitude ratio value and an instantaneous amplitude at n symbols previously in time outputted from the n-symbol delay unit 206 is produced at the instantaneous amplitude production unit 205 as a current instantaneous amplitude $A_t$.

If only one amplitude ratio value is given for each of the mapped codes, the instantaneous amplitude from the production unit 205 may be gradually increased to diverge when codes corresponding to an amplitude ratio value greater than 1 are successively provided or the instantaneous amplitude from the production unit 205 may be gradually decreased to converge to 0 when codes corresponding to an amplitude ratio value smaller than 1 are successively provided. Thus, in this second embodiment also, two amplitude ratio values, a first amplitude ratio value equal to or smaller than 1 and a second amplitude ratio value equal to or greater than 1, are prepared for a single mapped code, and a threshold value of the amplitude ratio values is predetermined. In the amplitude ratio control unit 204, an instantaneous amplitude at n symbols previously is compared with the threshold value so that the first amplitude ratio equal to or smaller than 1 is outputted from the amplitude ratio setting unit 203 when the instantaneous amplitude at n symbols previously is greater than the threshold value and that the second amplitude ratio equal to or greater than 1 is outputted from the setting unit 203 when the Instantaneous amplitude at n symbols previously is equal to or smaller than the threshold value. Thus decided amplitude ratio is applied to the instantaneous amplitude production unit 205 and the product of the decided amplitude ratio and an instantaneous amplitude at n symbols previously is produced therein. As a result, the instantaneous amplitude can be prevented from diverging or from converging to 0. Operations in the amplitude ratio processing part consisting of the amplitude ratio setting unit 203, the amplitude ratio control unit 204, the instantaneous amplitude production unit 205 and the n-symbol delay unit 206 are the same as these in the modulating side in the first embodiment shown in FIG. 2.

The intermediate frequency carrier or radio frequency carrier is modulated by thus obtained instantaneous phase $\theta_t$ and instantaneous amplitude $A_t$ at the amplitude and phase modulation unit 1403 to output an amplitude and phase modulated intermediate frequency (IF) wave or radio frequency (RF) wave.

Figure 27:
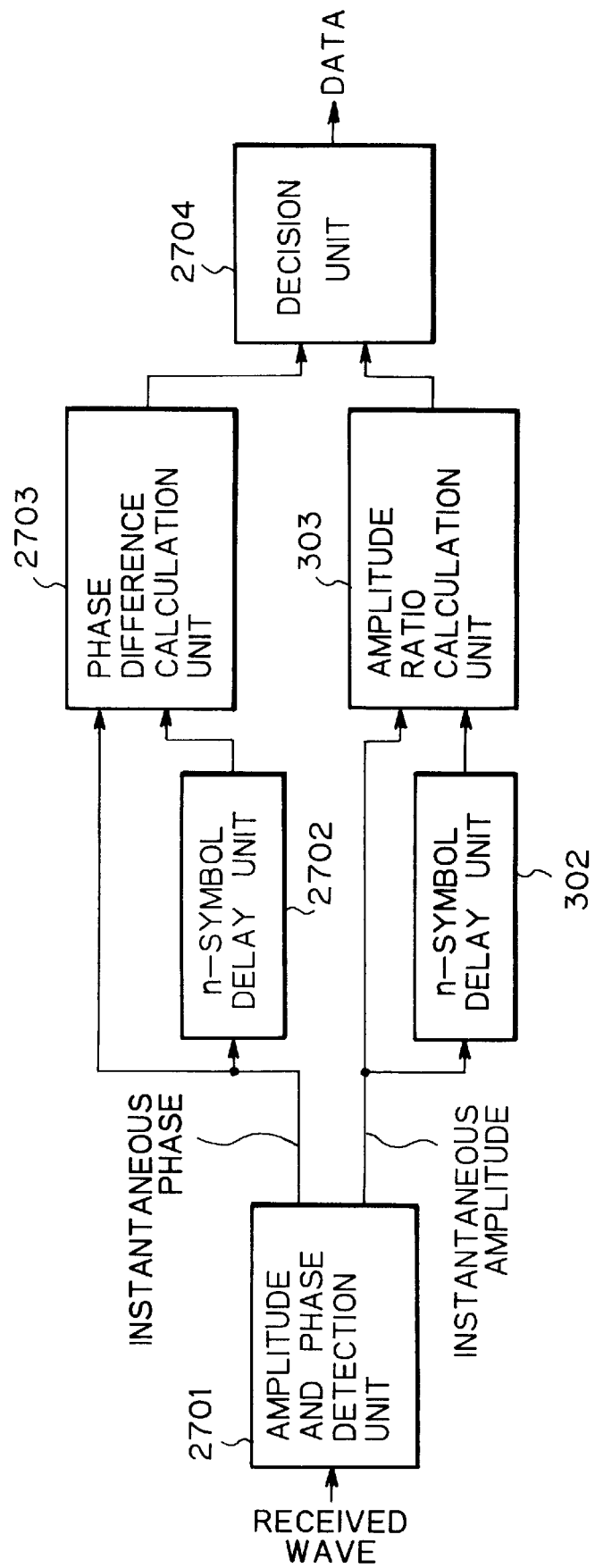
FIG. 27 shows a block diagram illustrating a substantial constitution of a demodulating part in a receiving side in the third embodiment according to the present invention.

As shown in FIG. 27, in the third embodiment according to the present invention, a demodulating part in a receiving side is substantially constituted by an amplitude and phase detection unit 2701, the n-symbol delay unit 302, the amplitude ratio calculation unit 303, a n-symbol delay unit 2702, a phase difference calculation unit 2703 and a decision unit 2704. The similar components in this demodulating side as these in the demodulating side shown in FIG. 3 are illustrated by using the same reference numerals, respectively.

Received wave is inputted into the amplitude and phase detection unit 2701, and thus an instantaneous phase and an instantaneous amplitude are obtained by detecting a phase component and an amplitude component of the received wave. With respect to phase, a phase difference between an instantaneous phase at the current time and an instantaneous phase at n symbols previously provided from the n-symbol delay unit 2702 is calculated at the phase difference calculation unit 2703. With respect to amplitude, as well as done in the first embodiment, a ratio of the instantaneous envelope level at the current time and the instantaneous envelope level at n symbols previously provided from the n-symbol delay unit 302 is calculated at the amplitude ratio calculation unit 303. Then, the demodulated data are provided from the decision unit 2704 by deciding the mapped code in accordance with the obtained phase difference and amplitude ratio.

Hereinafter, constitutions of modulators in the third embodiment according to the present invention are described.

Figure 28:
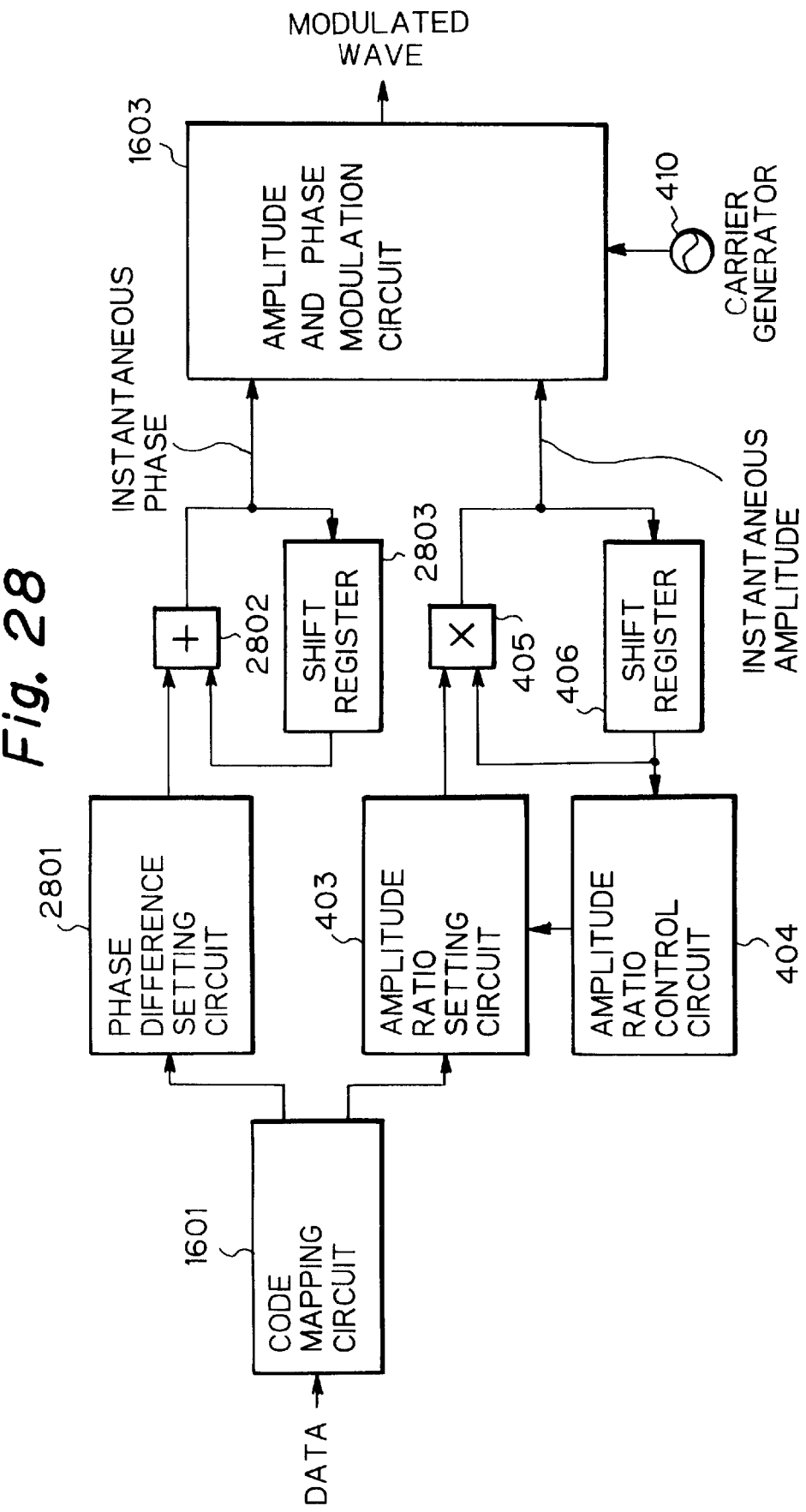
FIG. 28 shows a block diagram illustrating a first concrete constitution of a modulator in the third embodiment according to the present invention.

FIG. 28 illustrates a first concrete constitution of a modulator in the third embodiment according to the present invention. In this example, the modulator substantially consists of the code mapping circuit 1601, a phase difference processing part constituted by a phase difference setting circuit 2801, an adder 2802 and a shift register 2803, an amplitude ratio processing part constituted by the amplitude ratio setting circuit 403, the amplitude ratio control circuit 404, the multiplier 405 and the shift register 406, the amplitude and phase modulation circuit 1603 and the carrier generator 410. The similar components in this modulator as these in the modulators shown in FIGS. 4 and 16 are illustrated by using the same reference numerals, respectively.

Data to be transmitted are inputted into the code mapping circuit 1601. In the circuit 1601, a plurality of inputted data are mapped to a single code. A phase difference $\phi_i$ corresponding to this mapped code is set at the phase difference setting circuit 2801. An instantaneous phase $\theta_t = \phi_i + \theta_{t-n}$ is obtained by adding at the adder 2802 an instantaneous phase at n symbols previously in time (n is a natural number) $\theta_{t-n}$ outputted from the shift register 2803 to this phase difference $\phi_i$. Also, an amplitude ratio corresponding to this mapped code is set at the amplitude ratio setting circuit 403, and then the product of the set amplitude ratio value and an instantaneous amplitude at n symbols previously $A_{t-n}$ outputted from the shift register 406 is produced at the multiplier 405 as a current instantaneous amplitude $A_t$.

As is the similar manner in the modulator of the first embodiment shown in FIG. 4, in the amplitude ratio setting circuit 403, two amplitude ratio values, a first amplitude ratio value $r_j$ equal to or smaller than 1 and a second amplitude ratio value $R_j$ equal to or greater than 1, are prepared for a single mapped code. In the amplitude ratio control circuit 404, an instantaneous amplitude at n symbols previously is compared with a predetermined threshold value so that the first amplitude ratio $r_j$ equal to or smaller than 1 is outputted from the amplitude ratio setting circuit 403 when the instantaneous amplitude at n symbols previously is greater than (equal to or greater than ) the threshold value and that the second amplitude ratio $R_j$ equal to or greater than 1 is outputted from the setting circuit 403 when the instantaneous amplitude at n symbols previously is equal to or smaller than (smaller than) the threshold value. Accordingly, a finite instantaneous amplitude without diverging and converging to 0 can be obtained as is in the modulator of FIG. 4.

The intermediate frequency carrier or radio frequency carrier is modulated by thus obtained instantaneous phase $\theta_t$ and instantaneous amplitude $A_t$ at the amplitude and phase modulation circuit 1603 to output an amplitude and p has e modulated intermediate frequency (IF) wave or radio frequency (RF) wave. Another constitutions of this modulator is the same as that in the modulator in the second embodiment shown in FIG. 16.

Figure 29:
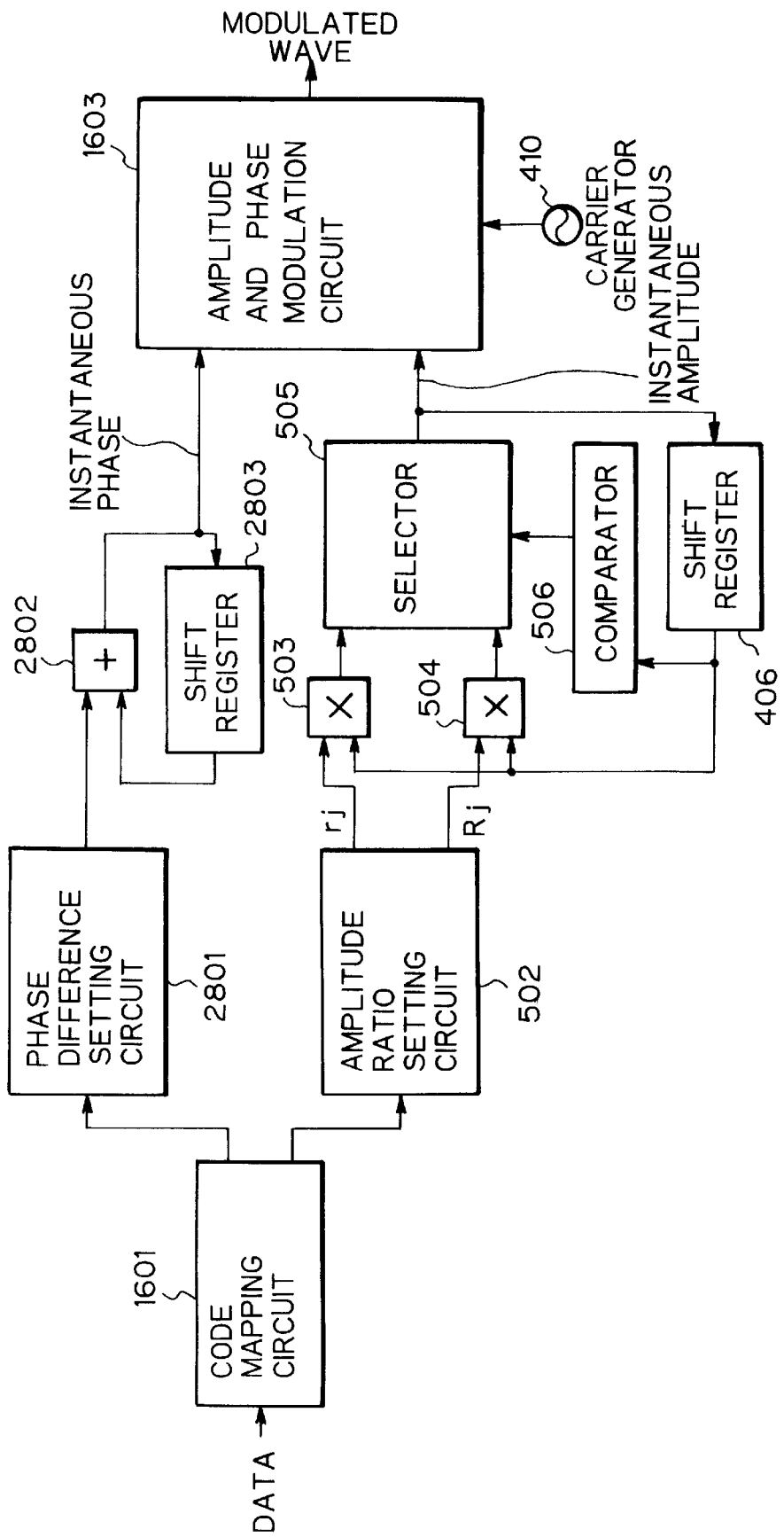
FIG. 29 shows a block diagram illustrating a second concrete constitution of the modulator in the third embodiment according to the present invention.

FIG. 29 illustrates a second concrete constitution of a modulator in the third embodiment according to the present invention. In this example, the modulator substantially consists of the code mapping circuit 1601, a phase processing part constituted by the phase difference setting circuit 2801, the adder 2802 and the shift register 2803, an amplitude ratio processing part constituted by the amplitude ratio setting circuit 502, the multipliers 503 and 504, the selector 505, the comparator 506 and the shift register 406, the amplitude and phase modulation circuit 1603 and the carrier generator 410. The similar components in this modulator a s these in the modulators shown in FIGS. 5, 18 and 28 are illustrated by using the same reference numerals, respectively.

Data to be transmitted are inputted into the code mapping circuit 1601. In the circuit 1601, a plurality of inputted data are mapped to a single code. A phase difference $\phi_i$ Corresponding to this mapped code is set at the phase difference setting circuit 2801. An instantaneous phase $\theta_t=\phi_i+\theta_{t-n}$ is obtained by adding at the adder 2802 an instantaneous phase at n symbols previously in time (n is a natural number) $\theta_{t-n}$ outputted from the shift register 2803 to this phase difference $\phi_i$. Also, two amplitude ratio values corresponding to this mapped code, a first amplitude ratio value $r_j$ equal to or smaller than 1 and a second amplitude ratio value $R_j$ equal to or greater than 1, are set at the amplitude ratio setting circuit 502 as is in the modulator of FIG. 5. The product $r_j \cdot A_{t-n}$ of the set first amplitude ratio $r_j$ and an instantaneous amplitude at n symbols previously $A_{t-n}$ outputted from the shift register 406 is produced at the multiplier 503. Also the product $R_j \cdot A_{t-n}$ of the set second amplitude ratio $R_j$ and the instantaneous amplitude at n symbols previously $A_{t-n}$ outputted from the shift register 406 is produced at the multiplier 504. These two products are inputted into the selector 505. The comparator 506 compares the instantaneous amplitude at n symbols previously $A_{t-n}$ with a threshold value to produce a selection signal. This selection signal is applied to the selector 505 so that the selector 505 outputs the product $r_j \cdot A_{t-n}$ when the instantaneous amplitude at n symbols previously is greater than (equal to or greater than) the threshold value and outputs the product $R_j \cdot A_{t-n}$ when the instantaneous amplitude at n symbols previously is equal to or smaller than (smaller than) the threshold value. Accordingly, a finite instantaneous amplitude without diverging and converging to 0 can be obtained as is in the modulator of FIG. 5.

The intermediate frequency carrier or radio frequency carrier is modulated by thus obtained instantaneous phase $\theta_t$ and instantaneous amplitude $A_t$ at the amplitude and phase modulation circuit 1603 to output an amplitude and phase modulated intermediate frequency (IF) wave or radio frequency (RF) wave.

The operation after that and another constitution of this modulator are the same as these in the modulator shown in FIG. 28.

Figure 30:
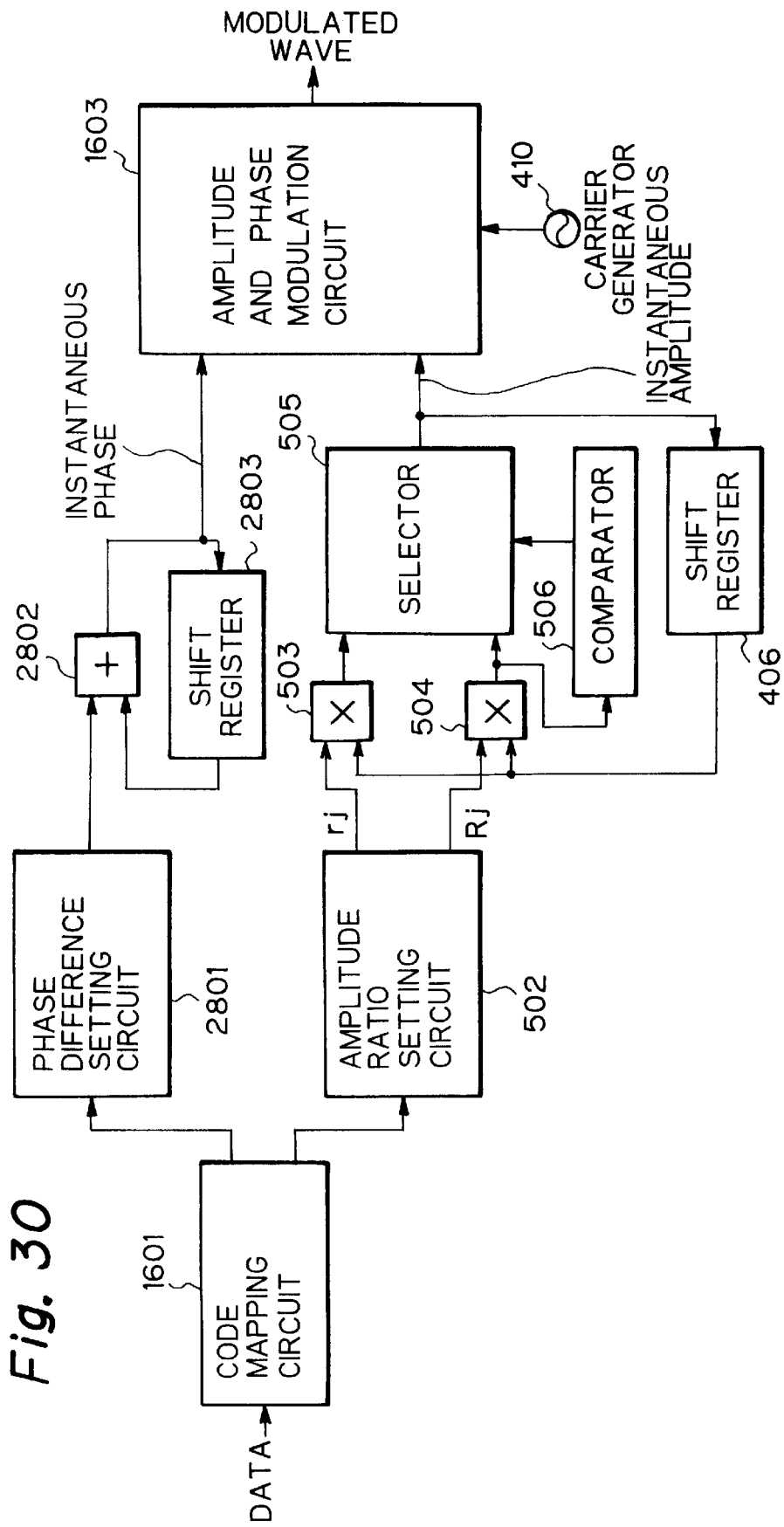
FIG. 30 shows a block diagram illustrating a third concrete constitution of the modulator in the third embodiment according to the present invention.

FIG. 30 illustrates a third concrete constitution of a modulator in the third embodiment according to the present invention. In this example, the modulator substantially consists of the code mapping circuit 1601, a phase processing part constituted by the phase difference setting circuit 2801, the adder 2802 and the shift register 2803, an amplitude ratio processing part constituted by the amplitude ratio setting circuit 502, the multipliers 503 and 504, the selector 505, the comparator 506 and the shift register 406, the amplitude and phase modulation circuit 1603 and the carrier generator 410. The similar components in this modulator as these in the modulators shown in FIGS. 6, 19 and 29 are illustrated by using the same reference numerals, respectively.

Data to be transmitted are inputted into the code mapping circuit 1601. In the circuit 1601, a plurality of inputted data are mapped to a single code. A phase difference $\phi_i$ corresponding to this mapped code is set at the phase difference setting circuit 2801. An instantaneous phase $\theta_t=\phi_i+\theta_{t-n}$ is obtained by adding at the adder 2802 an instantaneous phase at n symbols previously in time (n is a natural number) $\theta_{t-n}$ outputted from the shift register 2803 to this phase difference $\phi_i$. Also, two amplitude ratio values corresponding to this mapped code, a first amplitude ratio value $r_j$ equal to or smaller than 1 and a second amplitude ratio value $R_j$ equal to or greater than 1, are set at the amplitude ratio setting circuit 502 as is in the modulator of FIG. 5. The product $r_j \cdot A_{t-n}$ of the set first amplitude ratio $r_j$ and an instantaneous amplitude at n symbols previously $A_{t-n}$ outputted from the shift register 406 is produced at the multiplier 503. Also the product $R_j \cdot A_{t-n}$ of the set second amplitude ratio $R_j$ and the instantaneous amplitude at n symbols previously $A_{t-n}$ outputted from the shift register 406 is produced at the multiplier 504. These two products are inputted into the selector 505. The comparator 506 compares the product $R_j \cdot A_{t-n}$ with a threshold value to produce a selection signal. This selection signal is applied to the selector 505 so that the selector 505 outputs the product $r_j \cdot A_{t-n}$ when the product $R_j \cdot A_{t-n}$ is greater than (equal to or greater than) the threshold value and outputs the product $R_j \cdot A_{t-n}$ when the product $R_j \cdot A_{t-n}$ is equal to or smaller than (smaller than) the threshold value. Accordingly, a finite instantaneous amplitude without diverging and converging to 0 can be obtained as is in the modulator of FIG. 6.

The intermediate frequency carrier or radio frequency carrier is modulated by thus obtained instantaneous phase $\theta_t$ and instantaneous amplitude $A_t$ at the amplitude and phase modulation circuit 1603 to output an amplitude and phase modulated intermediate frequency (IF) wave or radio frequency (RF) wave.

The operation after that and another constitution of this modulator are the same as these in the modulator shown in Fig. 29.

Hereinafter, constitutions of demodulators in the third embodiment according to the present invention are described.

Figure 31:
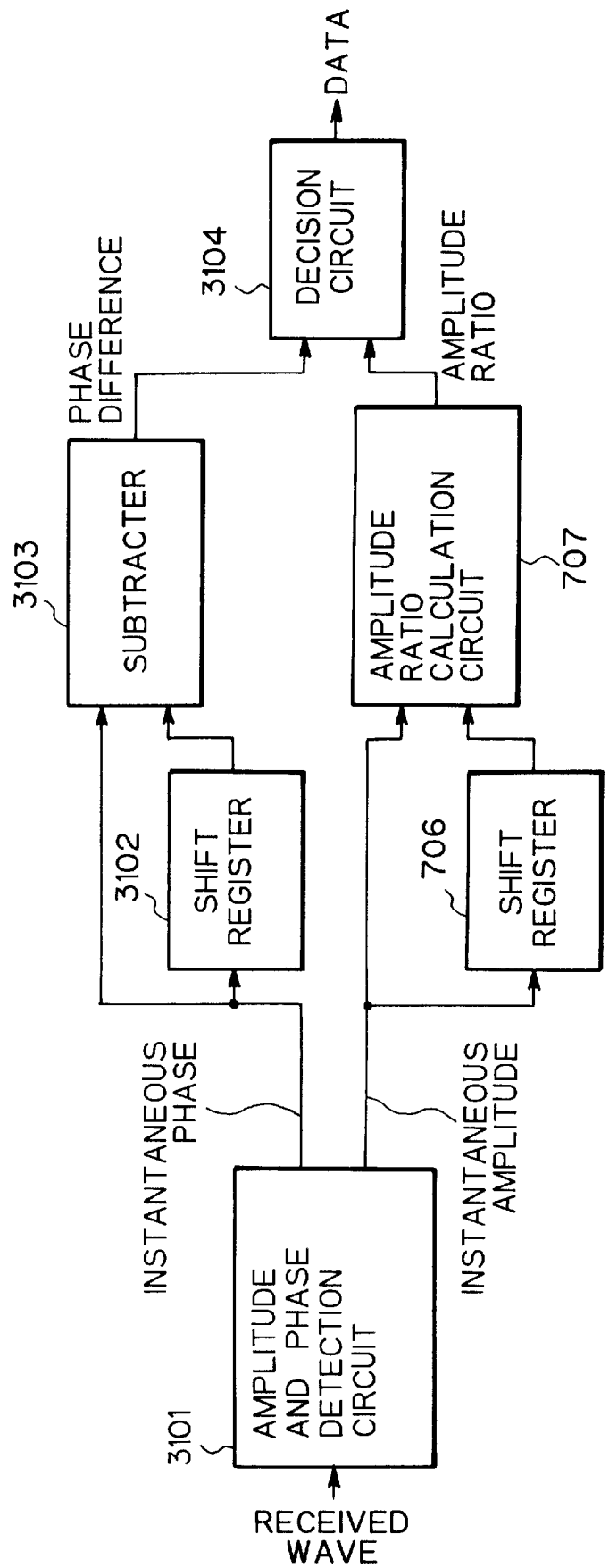
FIG. 31 shows a block diagram illustrating a first concrete constitution of a demodulator in the third embodiment according to the present invention.

FIG. 31 illustrates a first concrete constitution of a demodulator in the third embodiment according to the present invention. In this example, the demodulator substantially consists of an amplitude and phase detection circuit 3101, the shift register 706 and the amplitude ratio calculation circuit 707 followed to the detection circuit 3101, a shift register 3102 and a subtracter 3103 followed to the detection circuit 3101, and a decision circuit 3104. The similar components in this demodulator as these in the demodulator shown in FIG. 7 are illustrated by using the same reference numerals, respectively.

Received wave $A_t \cdot \cos(\theta_t + 2\pi \cdot f_c \cdot t)$ is inputted into the amplitude and phase detection circuit 3101, and thus an instantaneous phase $\theta_t + \theta_0$ and an instantaneous amplitude At are detected where $\theta_0$ is a constant. With respect to phase, a phase difference $\emptyset_i = \theta_t - \theta_{t-n}$ between the instantaneous phase $\theta_t + \theta_0$ and an instantaneous phase at n symbols previously $\theta_{t-n} + \theta_0$ outputted from the shift register 3102 is calculated at the subtracter 3103. With respect to amplitude, as well as done in the demodulator of FIG. 7 in the first embodiment, a ratio $A_t/A_{t-n}$ of the instantaneous envelope level at the current time $A_t$ and the instantaneous envelope level at n symbols previously $A_{t-n}$ provided from the shift register 706 is calculated at the amplitude ratio calculation circuit 707 to provide $r_j$ or $R_j$ corresponding to the mapped code.

Demodulated data can be obtained from the decision circuit 3104 by deciding the mapped code in accordance with thus obtained phase difference $\emptyset_i$ and amplitude ratio $r_j$ or $R_j$.

Figure 32:
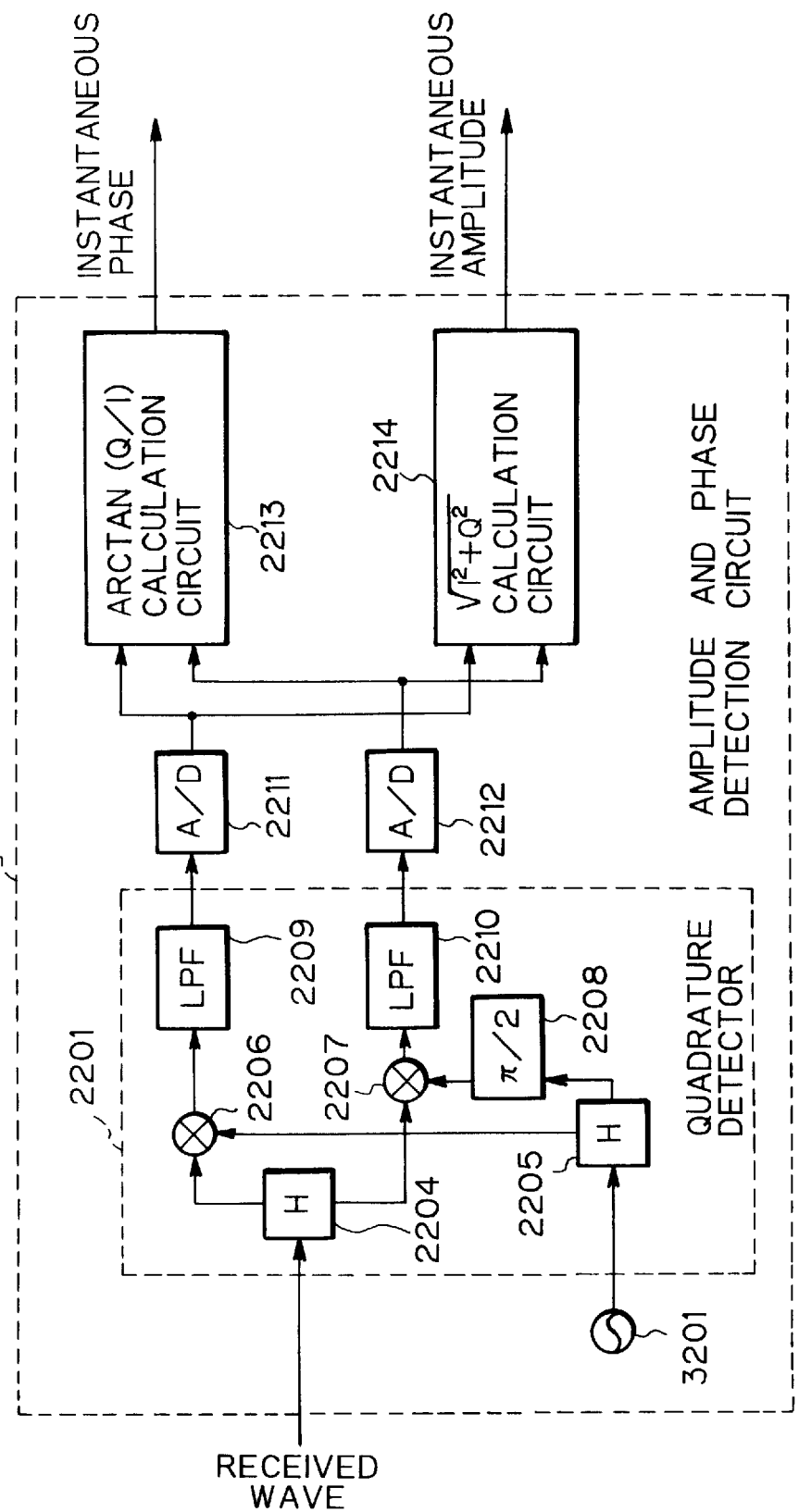
FIG. 32 shows a block diagram illustrating an example of an amplitude and phase detection circuit in the demodulator shown in FIG. 31.

FIG. 32 illustrates an example of the amplitude and phase detection circuit 3101 in the demodulator shown in FIG. 31.

As will be apparent from this figure, this detection circuit 3101 consists of a local signal generator 3201, the quadrature detector 2201, the two A/D converters 2211 and 2212 and the calculation circuits 2213 and 2214. The quadrature detector 2201 is provided with the two hybrids 2204 and 2205, the two mixers 2206 and 2207, the π/2 phase shifter 2208 and the two LPFs 2209 and 2210.

Received wave $A_t \cdot \cos(\theta_t + 2\pi \cdot f_c \cdot t)$ is inputted into the quadrature detector 2201. In the quadrature detector 2201, the received wave is semi-synchronous quadrature detected by a local signal with a frequency of fc from the local signal generator 3201 to provide baseband signals of the rectangular coordinate system consisting of I component $I = A_t \cdot \cos(\theta_t + \theta_0)$ and Q component $Q = A_t \cdot \sin(\theta_t + \theta_0)$, where $\theta_0$ is a constant. The baseband signals are converted into digital signals at the A/D converters 2211 and 2212, respectively. These digital signals are then applied to the calculation circuit 2213 to provide an instantaneous phase $\theta_t + \theta_0$. Also these digital signals are applied to the calculation circuit 2214 to provide an instantaneous amplitude $A_t$.

The amplitude and phase detection circuit 3101 in the demodulator shown in FIG. 31 can be constituted by any one of various known detection circuits other than that shown in FIG. 32. Thus, the detection circuit 3201 is not limited to that shown in FIG. 32.

Figure 33:
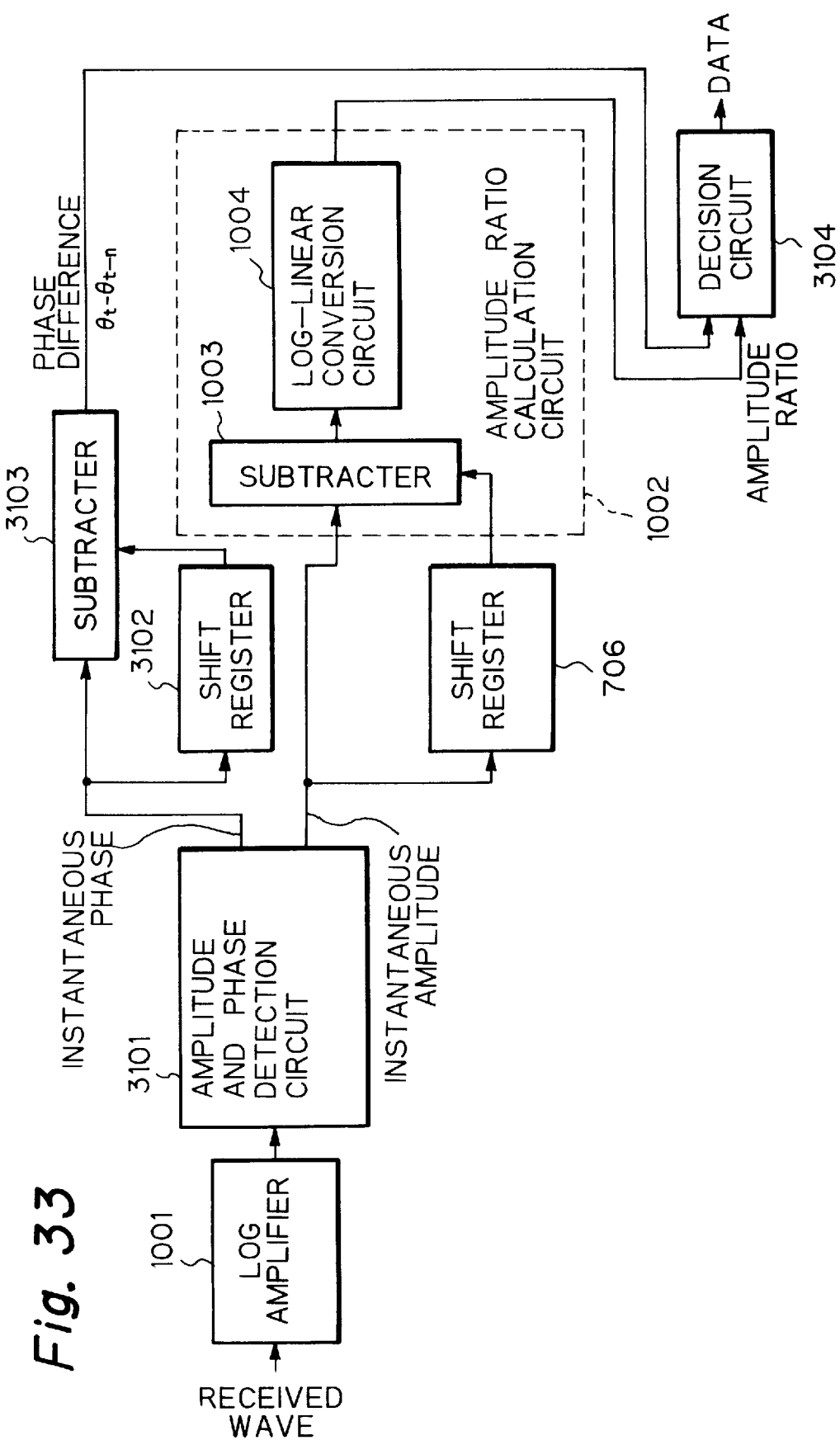
FIG. 33 shows a block diagram illustrating a second concrete constitution of the demodulator in the third embodiment according to the present invention.

FIG. 33 illustrates a second concrete constitution of a demodulator in the third embodiment according to the present invention. In this example, the demodulator substantially consists of the LOG (logarithmic) amplifier 1001, the amplitude and phase detection circuit 3101, the shift register 706 and the amplitude ratio calculation circuit 1002 followed to the detection circuit 3101, the shift register 3102 and the subtracter 3103 followed to the detection circuit 3101, and the decision circuit 3104. The similar components in this demodulator as these in the demodulators shown in FIGS. 23 and 31 are illustrated by using the same reference numerals, respectively. The amplitude ratio calculation circuit 1002 is provided with the subtracter 1003 and the LOG-linear conversion circuit 1004.

Received wave $A_t \cdot \cos(\theta_t + 2\pi \cdot f_c \cdot t)$ is inputted into the LOG amplifier 1001 to be logarithmically amplified as log $\{G \cdot A_t \cdot \cos(\theta_t + 2\pi \cdot f_c \cdot t)\}$, where G is a constant. Then, in the amplitude and phase detection circuit 3101, an instantaneous phase $\theta_t$ and an instantaneous amplitude $A_t$ are detected. With respect to phase, a phase difference $\emptyset_i (= \theta_t - \theta_{t-n})$ is obtained as well as done in the demodulator of FIG. 31. With respect to amplitude, as well as done in the demodulators of FIGS. 23 and 31, a ratio $A_t/A_{t-n}$ of the instantaneous amplitude at the current time $A_t$ and the instantaneous amplitude at n symbols previously $A_{t-n}$ provided from the shift register 706 is calculated at the amplitude ratio calculation circuit 1002 to provide $r_j$ or $R_j$ corresponding to the mapped code.

Demodulated data can be obtained from the decision circuit 3104 by deciding the mapped code in accordance with thus obtained phase difference $\emptyset_i$ and amplitude ratio $r_j$ or $R_j$.

Although, the amplitude of the received wave is detected after the logarithmic amplification in this demodulator shown in FIG. 33, the amplitude can be detected before the logarithmic amplification.

Figure 34:
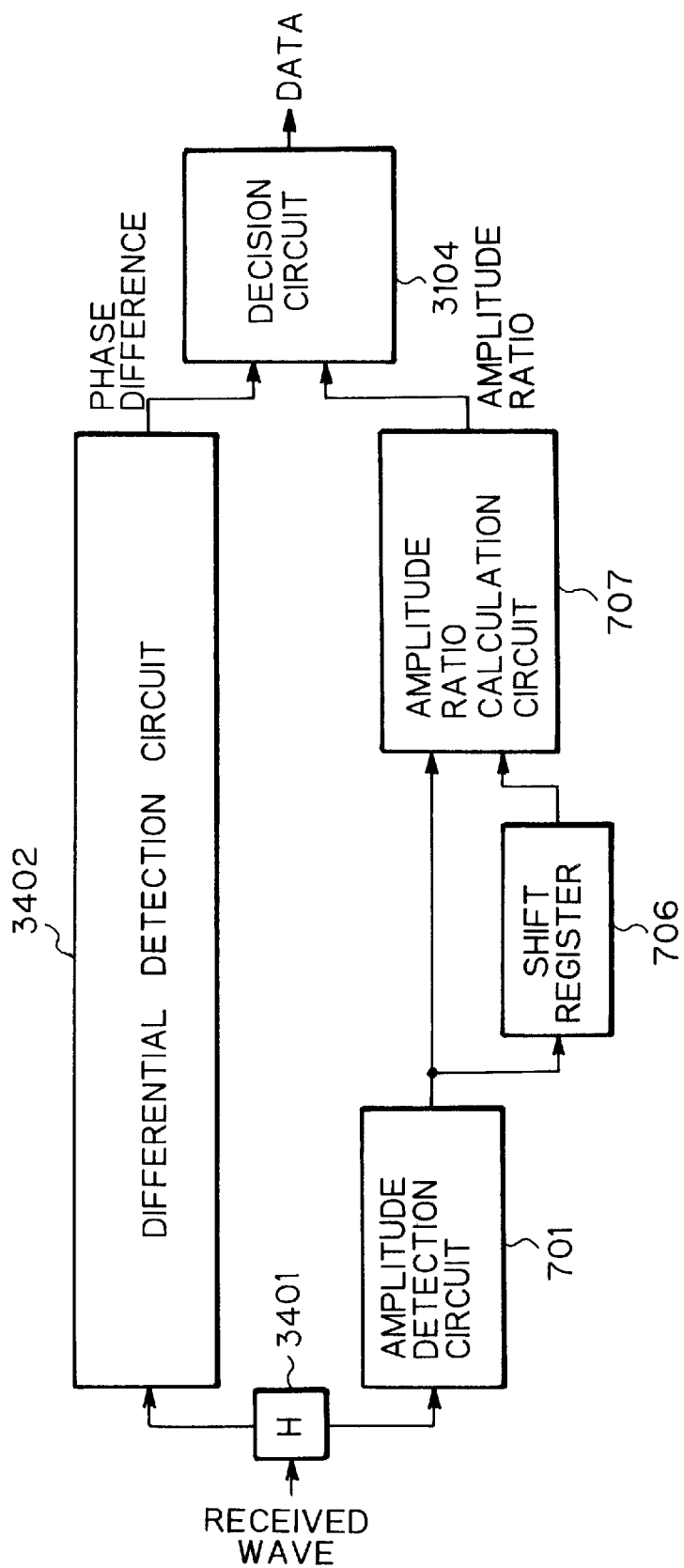
FIG. 34 shows a block diagram illustrating a third concrete constitution of the demodulator in the third embodiment according to the present invention.

FIG. 34 illustrates a third concrete constitution of a demodulator in the third embodiment according to the present invention. In this example, the demodulator substantially consists of a hybrid 3401, the amplitude detection circuit 701, the shift register 706 and the amplitude ratio calculation circuit 707 followed to the detection circuit 701, a differential detection circuit 3402 followed to the hybrid 3401 and the decision circuit 3104. The similar components in this demodulator as these in the demodulators shown in FIGS. 7 and 31 are illustrated by using the same reference numerals, respectively.

Received wave $A_t \cdot \cos(\theta_t + 2\pi f_c \cdot t)$ is branched at the hybrid 3401 and then inputted into the differential detection circuit 3402 and into the amplitude detection circuit 701. With respect to phase, a phase difference $\emptyset_i (= \theta_t \theta_{t-n})$ is obtained at the differential detection circuit 3402. With respect to amplitude, as well as done in the demodulator of FIG. 7, a ratio $A_t/A_{t-n}$ of the instantaneous envelope level at the current time $A_t$ and the instantaneous envelope level at n symbols previously $A_{t-n}$ is obtained to provide $r_j$ or $R_j$ corresponding to the mapped code.

Demodulated data can be obtained from the decision circuit 3104 by deciding the mapped code in accordance with thus obtained phase difference $\emptyset_i$ and amplitude ratio $r_j$ or $R_j$.

Figure 35:
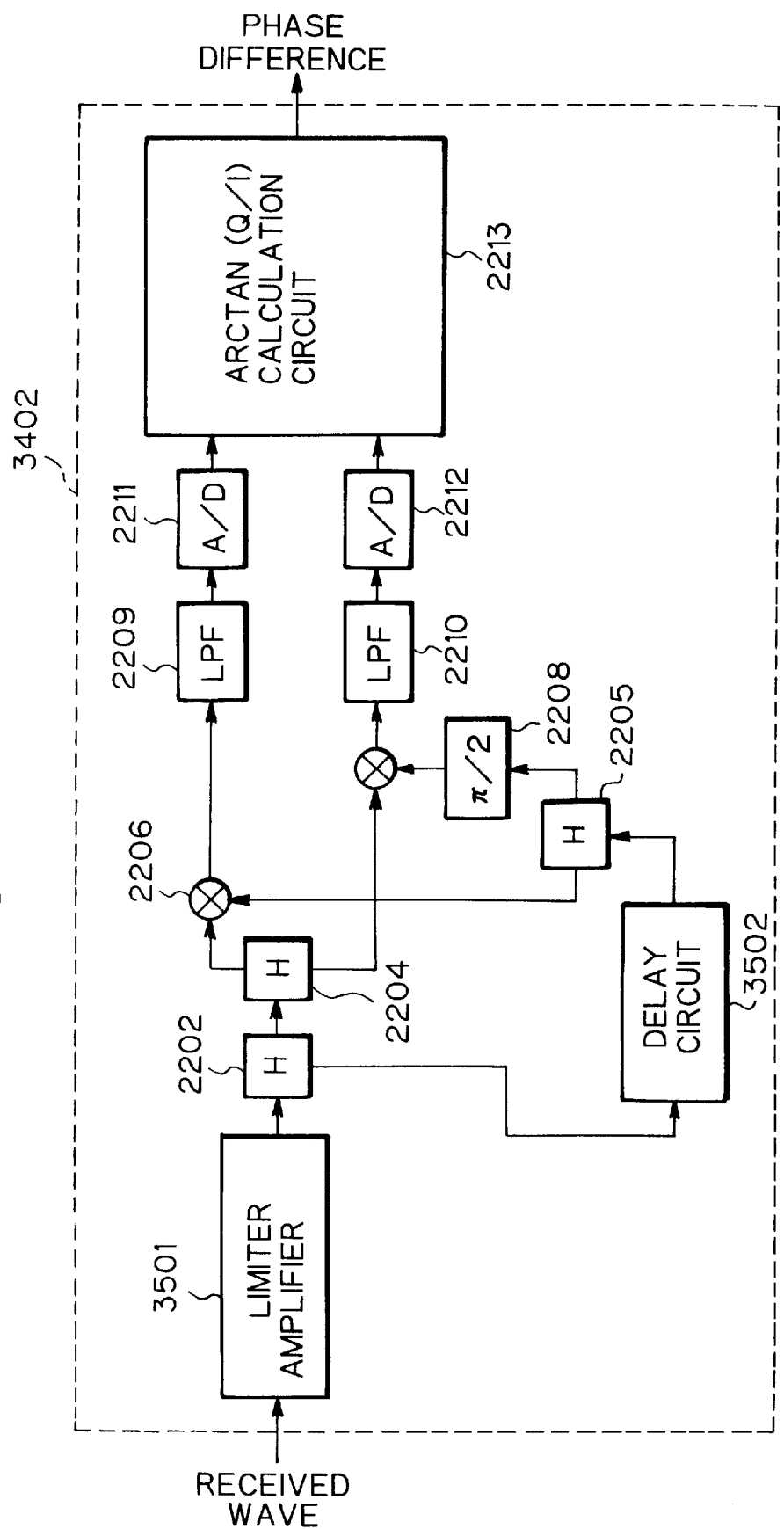
FIG. 35 shows a block diagram illustrating an example of a differential detection circuit in the demodulator shown in FIG. 34.

FIG. 35 illustrates an example of the differential detection circuit 3402 in the demodulator shown in FIG. 34.

As will be apparent from this figure, this detection circuit 3402 consists of a limiter amplifier 3501, the hybrid 2202, a delay circuit 3502, a quadrature detector constituted by the two hybrids 2204 and 2205, the two mixers 2206 and 2207, the π/2 phase shifter 2208 and the two LPFs 2209 and 2210, the two A/D converters 2211 and 2212 and the calculation circuit 2213.

Received wave $A_t \cdot \cos(\theta_t + 2\pi \cdot f_c \cdot t)$ is inputted to the limiter amplifier 1501, and converted into a constant amplitude signal $A \cdot \cos(\theta_t + 2\pi \cdot f_c \cdot t)$, where A is a constant. The converted signal is then branched at the hybrid 2202, and thus a branched signal $A \cdot \cos(\theta_t + 2\pi \cdot f_c \cdot t)$ and a signal delayed by n symbols at the delay circuit 3502 $A \cdot \cos\{\theta_t - n + 2\pi \cdot f_c \cdot (t - n \cdot T)\}$ are provided, where T is a time for one symbol. A quadrature component of the delayed signal $A \cdot \sin\{\theta_{t-n} + 2\pi \cdot f_c \cdot (t - n \cdot T)\}$ is provided by the π/2 phase shifter 2208. Therefore, from the mixers 2206 and 2207, $A^2 \cdot \cos(\theta_t + 2\pi \cdot f_c \cdot t) \cdot \cos\{\theta_{t-n} + 2\pi \cdot f_c \cdot (t - n \cdot T)\}$ and $A^2 \cdot \cos(\theta_t + 2\pi \cdot f_c \cdot t) \cdot \sin\{\theta_{t-n} + 2\pi \cdot f_c \cdot (t - n \cdot T)\}$ are provided. These signals are passed through the LPFs 2209 and 2210, and thus $A^2 \cdot \cos(\theta_t - \theta_{t-n} + 2\pi \cdot f_c \cdot n \cdot T)$ and $A^2 \cdot \sin(\theta_t - \theta_{t-n} + 2\pi \cdot f_c \cdot n \cdot T)$ are obtained.

These signals are converted into digital signals at the A/D converters 2211 and 2212, respectively, and applied to the calculation circuit 2213 to provide a phase difference of $\theta_t - \theta_{t-n}$.

The differential detection circuit 3402 in the demodulator shown in FIG. 34 can be constituted by any one of various known detection circuits other than that shown in FIG. 35. Thus, the detection circuit 3402 is not limited to that shown in FIG. 35.

Figure 36:
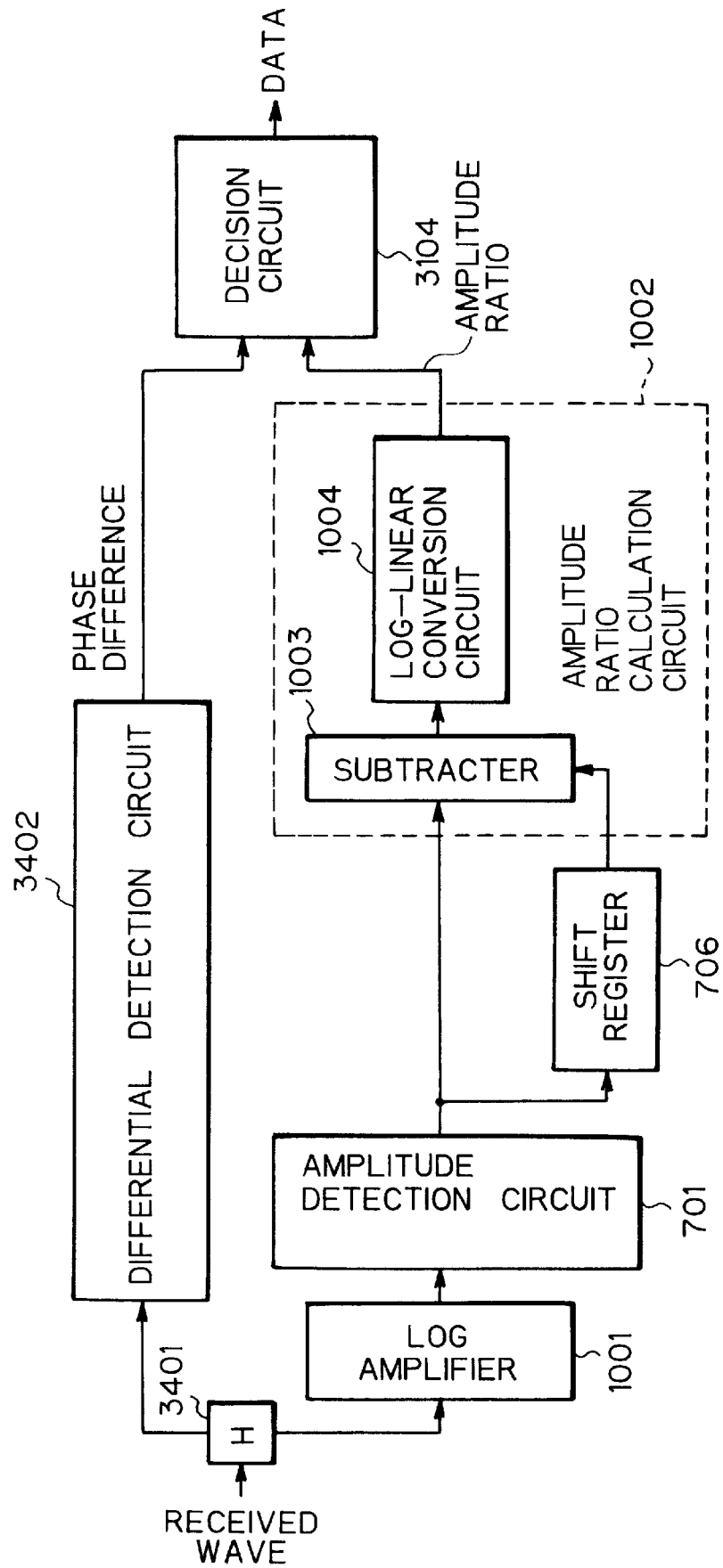
FIG. 36 shows a block diagram illustrating a fourth concrete constitution of the demodulator in the third embodiment according to the present invention.

FIG. 36 illustrates a fourth concrete constitution of a demodulator in the third embodiment according to the present invention. In this example, the demodulator substantially consists of the hybrid 3401, the LOG (logarithmic) amplifier 1001, the amplitude detection circuit 701, the shift register 706 and the amplitude ratio calculation circuit 1002 followed to the detection circuit 701, the differential detection circuit 3402 followed to the hybrid 3401 and the decision circuit 3104. The similar components in this demodulator as these in the demodulators shown in FIGS. 7, 33 and 34 are illustrated by using the same reference numerals, respectively. The amplitude ratio calculation circuit 1002 is provided with the subtracter 1003 and the LOG-linear conversion circuit 1004.

Received wave is branched at the hybrid 3401 and then inputted into the differential detection circuit 3402 and into the LOG amplifier 1001. With respect to phase, a phase difference $\varnothing_i$ is obtained at the differential detection circuit 3402. With respect to amplitude, as well as done in the demodulator of FIG. 33, $r_j$ or $R_j$ corresponding to the mapped code is obtained. Demodulated data can be obtained from the decision circuit 3104 by deciding the mapped code in accordance with thus obtained phase difference $\varnothing_i$ and amplitude ratio $r_j$ or $R_j$.

Although, the amplitude of the received wave is detected after the logarithmic amplification in this demodulator shown in FIG. 36, the amplitude can be detected before the logarithmic amplification.

Figure 37B:
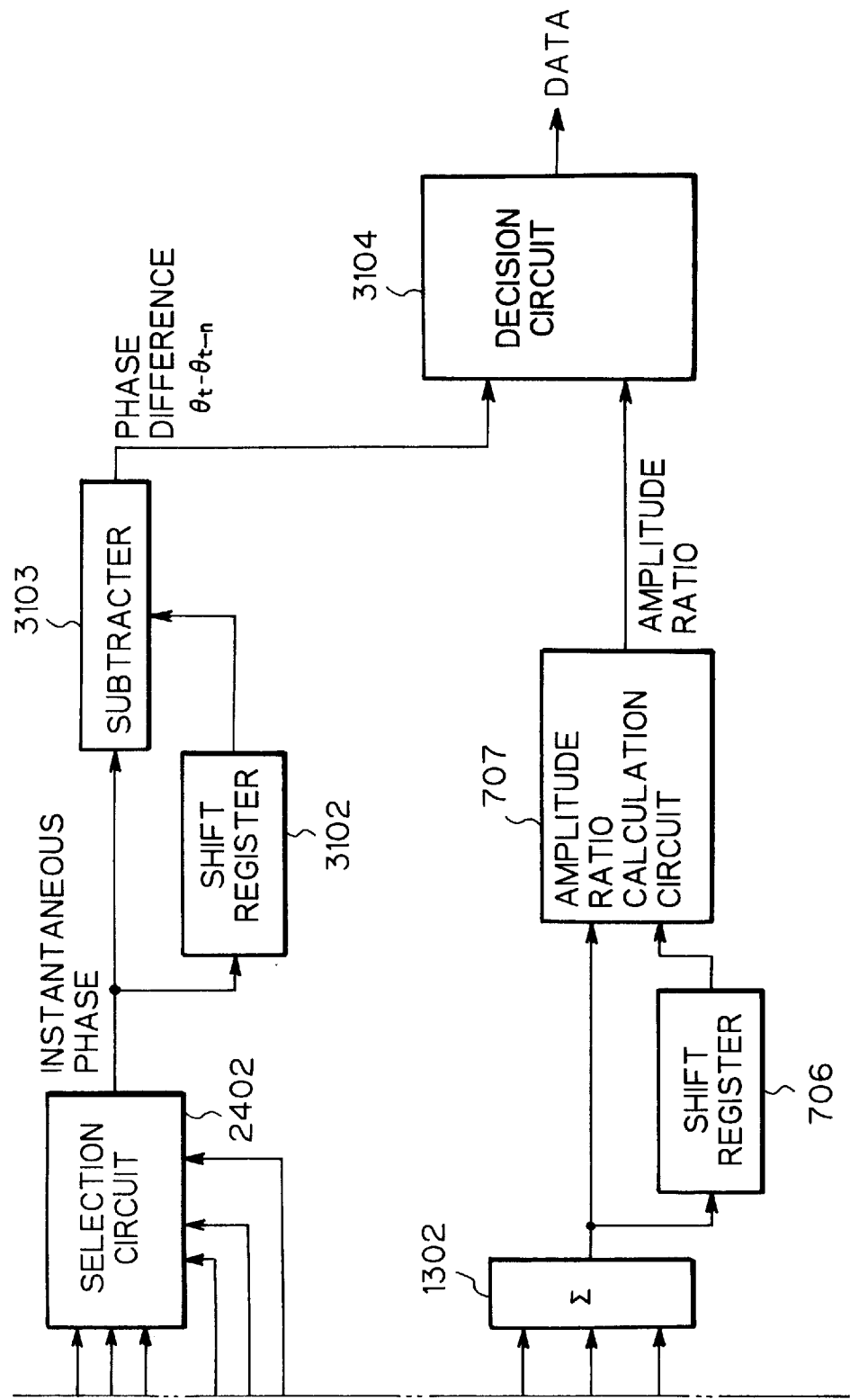

FIG. 37 illustrates a fifth concrete constitution of a demodulator for diversity combining in the third embodiment according to the present invention. In this example, the demodulator substantially consists of amplitude and phase detection circuits $3701_1$–$3701_N$, the selection circuit 2402, the summing circuit 1302, the shift register 706 and the amplitude ratio calculation circuit 707 followed to the summing circuit 1302, the shift register 3102 and the subtracter 3103 followed to the selection circuit 2402, and the decision circuit 3104. The similar components in this demodulator as these in the demodulators shown in FIGS. 7, 13, 20 and 31 are illustrated by using the same reference numerals, respectively.

Received waves at the branches #1–#N are inputted into the amplitude and phase detection circuits $3701_1$–$3701_N$. In the detection circuits $3701_1$–$3701_N$, instantaneous phases and instantaneous envelope levels which are instantaneous amplitudes, of the respective branches are obtained. The obtained instantaneous phases of the respective branches are inputted into the selection circuit 2402 and then one of the instantaneous phases is selected depending upon the instantaneous envelope levels of the respective branches (selection combining). A phase difference $\varnothing_i = \theta_t - \theta_{t-n}$ between the instantaneous phase $\theta_t + \theta_0$ and an instantaneous phase at n symbols previously $\theta_{t-n} + \theta_0$ outputted from the shift register 3102 is calculated at the subtracter 3103. On the other hand, the obtained instantaneous envelope levels of the respective branches are summed at the summing circuit 1302 to provide an instantaneous amplitude signal. After that, the same operations as that in the demodulator of FIG. 7 are per- formed to obtain a ratio $A_t/A_{t-n}$ of the instantaneous amplitude at the current time $A_t$ and the instantaneous amplitude at n symbols previously $A_{t-n}$. As a result, $r_j$ or $R_j$ corresponding to the mapped code is obtained. Demodulated data can be obtained from the decision circuit 3104 by deciding the mapped code in accordance with thus obtained phase difference $\varnothing_i$ and amplitude ratio $r_j$ or $R_j$.

Figure 38A:
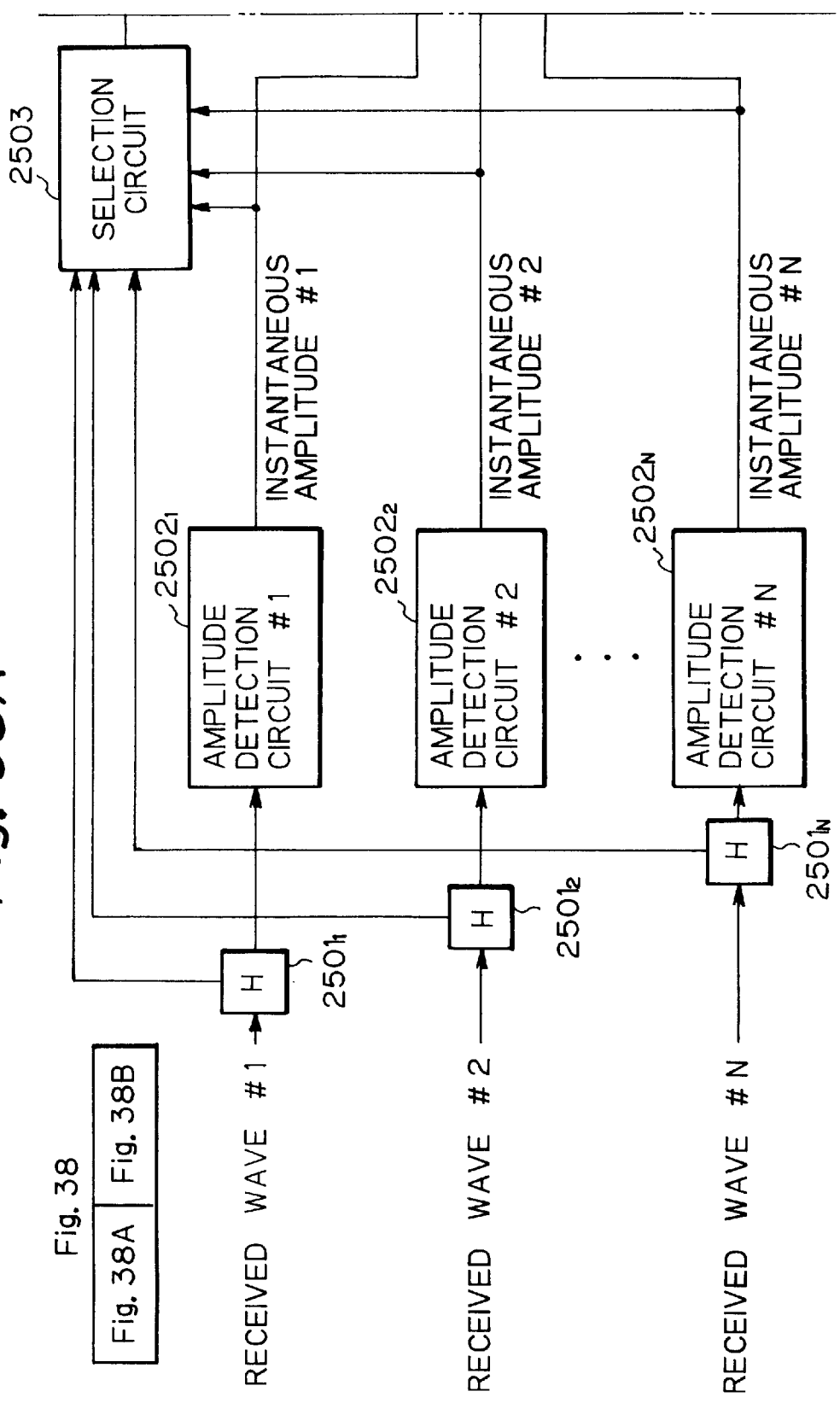
FIGS. 38A and 38B shows a block diagram illustrating a sixth concrete constitution of the demodulator in the third embodiment according to the present invention.
Figure 38B:
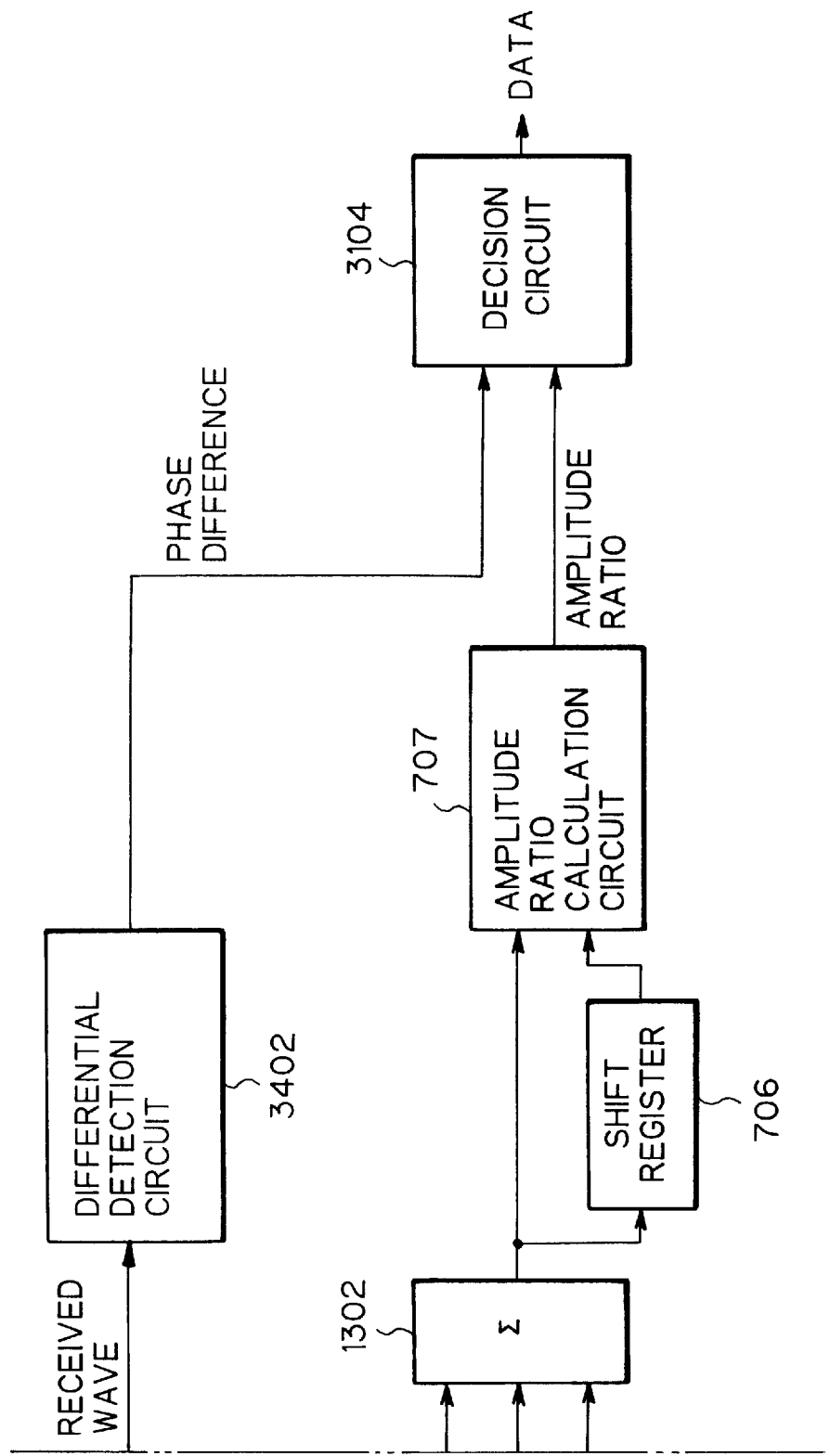

FIG. 38 illustrates a sixth concrete constitution of a demodulator for diversity combining in the third embodiment according to the present invention. In this example, the demodulator substantially consists of the hybrids $2501_1$–$2501_N$, the amplitude detection circuits $2502_1$–$2502_N$, the selection circuit 2503, the differential detection circuit 3402 followed to the selection circuit 2503, the summing circuit 1302, the shift register 706 and the amplitude ratio calculation circuit 707 followed to the summing circuit 1302 and the decision circuit 2002. The similar components in this demodulator as these in the demodulators shown in FIGS. 7, 13, 25, 31 and 34 are illustrated by using the same reference numerals, respectively.

Received waves at the branches #1–#N are branched at the hybrids $2501_1$–$2501_N$, respectively and then inputted into the amplitude detection circuits $2502_1$–$2502_N$ and into the selection circuit 2503, respectively. In the detection circuits $2502^1$–$2502_N$, instantaneous envelope levels which are instantaneous amplitudes, of the respective branches are detected. In the selection circuit 2503, one of the received waves is selected depending upon the detected instantaneous envelope levels form the respective detection circuits $2502_1$–$2502_N$, The selected received wave is applied to the differential detection circuit 3402 and thus a phase difference $\varnothing_i$ is obtained. On the other hand, the obtained instantaneous envelope levels of the respective branches are summed at the summing circuit 1302 to provide an instantaneous amplitude signal. After that, the same operations as that in the demodulator of FIG. 7 are performed to obtain a ratio $A_t/A_{t-n}$ of the instantaneous amplitude at the current time $A_t$ and the instantaneous amplitude at n symbols previously $A_{t-n}$. As a result, $r_j$ or $R_j$ corresponding to the mapped code is obtained. Demodulated data can be obtained from the decision circuit 3104 by deciding the mapped code in accordance with thus obtained phase difference $\varnothing_i$ and amplitude ratio $r_j$ or $R_j$.

Since information exist in the amplitude ratio between the symbols not in the absolute amplitude according to the third embodiment as well as in the first and second embodiments of the present invention, diversity combining with the maximum gain is possible only by summing the detected amplitudes of the branches. With respect to phase combining, another combining methods such as an equal gain combining or maximal ratio combining can be utilized other than the aforementioned selection combining.

According to the third embodiment, since it is not necessary to detect an absolute amplitude and also an absolute phase, good demodulation characteristics can be expected even under a bad transmission condition of abrupt level changes.

Figure 39B:
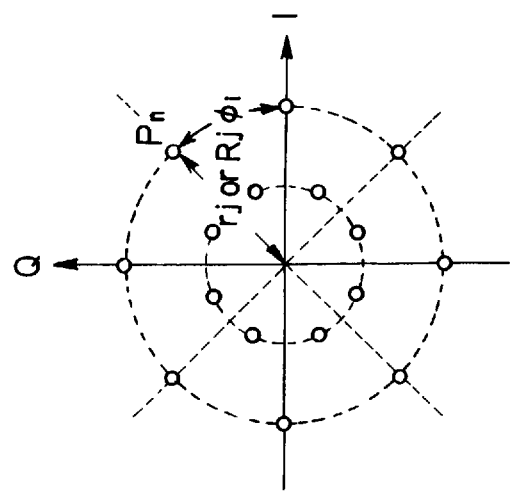
FIGS. 39a and 39b show a first example of a signal space diagram of the multi-level QAM according to the present invention.
Figure 39A:
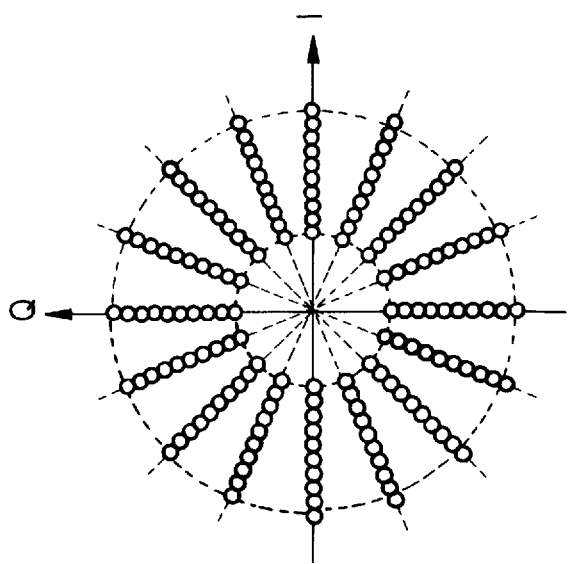
Figure 40B:
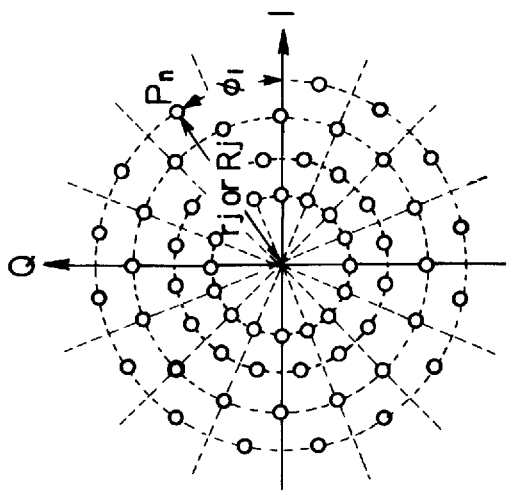
FIGS. 40a and 40b show a second example of a signal space diagram of the multi-level QAM according to the present invention.
Figure 40A:
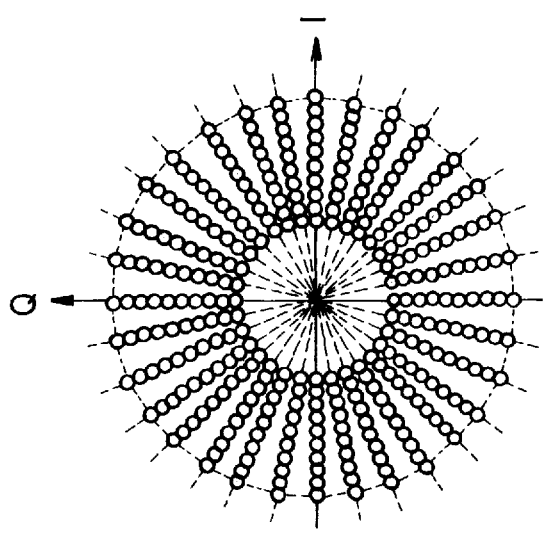

FIGS. 39a and 39b show a first example of signal space diagrams at the transmitting side and the receiving side after demodulation according to the present invention, respectively, and FIGS. 40a and 40b show a second example of signal space diagrams at the transmitting side and the receiving side after demodulation according to the present invention, respectively.

In the first example of FIGS. 39a and 39b, as shown in FIG. 39b, distance between the origin and each signal point corresponds to $r_j$ or $R_j$ and an angle between the I axis and a line from the origin to each signal point corresponds to an absolute phase $ø_i$ in the second embodiment or to a phase difference $ø_i$ in the third embodiment. In this first example, furthermore, the multi-level value for phase is 8 and the multi-level value for amplitude is 2 (which is equivalent to 16 QAM). In the second example of FIGS. 40a and 40b, as shown in FIG. 40b, distance between the origin and each signal point corresponds to $r_j$ or $R_j$ and an angle between the I axis and a line from the origin to each signal point corresponds to an absolute phase $ø_i$ in the second embodiment or to a phase difference $ø_i$ in the third embodiment. In this second example, furthermore, the multi-level value for phase is 16 and the multi-level value for amplitude is 4 (which is equivalent to 64 QAM). As will be understood from FIGS. 39a and 40a, according to the present invention, each of signal points in the signal space diagrams at the transmitting sides are arranged in optional location in radial and annular shape not an absolute location as that in the conventional methods.

Many widely different embodiments of the present invention may be constructed without departing from the spirit and scope of the present invention. It should be understood that the present invention is not limited to the specific embodiments described in the specification, except as defined in the appended claims.

What is claimed is:

1. A modulation and demodulation method for communication between a transmitting side and a receiving side, said method comprising the steps of:

at the transmitting side, producing a modulating signal, an amplitude ratio of a current instantaneous amplitude of said modulating signal and an instantaneous amplitude at n symbols previously in time (n is a natural number) of said modulating signal being set to correspond to a code to be transmitted;

at the transmitting side, modulating a carrier with a radio frequency or an intermediate frequency by said modulating signal to provide and transmit a modulated signal;

at the receiving side, receiving the transmitted modulated signal to provide a received signal; and at the receiving side, deciding the transmitted code from an amplitude ratio of an instantaneous amplitude of a signal point in a signal space and an instantaneous amplitude of the signal point in the signal space n symbols previously in time with respect to said received signal, a first amplitude ratio value equal to or smaller than 1 and a second amplitude ratio value equal to or greater than 1 being prepared, said amplitude ratio being selected one of said first and second amplitude values so as to prevent said modulating signal from converging to zero and from diverging.

2. A modulator comprising:

a code mapping means for mapping a plurality of data to be transmitted to a code corresponding to a signal point in a signal space;

an amplitude ratio setting means for providing an amplitude ratio corresponding to said mapped code;

a n-symbol delay means for providing an instantaneous amplitude at n symbols previously in time (n is a natural number);

an instantaneous amplitude production means for producing a current instantaneous amplitude based upon a product of the amplitude ratio and the instantaneous amplitude at n symbols previously;

an amplitude ratio control means for controlling the amplitude ratio to be one of a first amplitude ratio value equal to or smaller than 1 and a second amplitude ratio value equal to or greater than 1 so as to prevent said current instantaneous amplitude from converging to zero and from diverging; and an amplitude modulation means for modulating a carrier with a radio frequency or an intermediate frequency by said current instantaneous amplitude.

3. The modulator as claimed in claim 2, wherein said amplitude ratio setting means provides one of the first amplitude ratio value and the second amplitude ratio value, and wherein said amplitude ratio control means controls said amplitude ratio setting means so as to provide said first amplitude ratio value when said instantaneous amplitude at n symbols previously is greater than a threshold value and so as to provide said second amplitude ratio value when said instantaneous amplitude at n symbols previously is equal to or smaller than the threshold value.

4. The modulator as claimed in claim 2, wherein said amplitude ratio setting means provides both the first amplitude ratio value and the second amplitude ratio value, and wherein said amplitude ratio control means comprises a first multiplying means for providing a first product of said first amplitude ratio value and said instantaneous amplitude at n symbols previously, a second multiplying means for providing a second product of said second amplitude ratio value and said instantaneous amplitude at n symbols previously, a selection means for selecting, in accordance with a selection signal, one of said first product and said second product as the current instantaneous amplitude, and a comparing means for providing the selection signal to said selection means so that said selection means selects said first product when said instantaneous amplitude at n symbols previously is greater than a threshold value and that said selection means selects said second product when said instantaneous amplitude at n symbols previously is equal to or smaller than the threshold value.

5. The modulator as claimed in claim 2, wherein said amplitude ratio setting means provides both the first amplitude ratio value and the second amplitude ratio value, and wherein said amplitude ratio control means comprises a first multiplying means for providing a first product of said first amplitude ratio value and said instantaneous amplitude at n symbols previously, a second multiplying means for providing a second product of said second amplitude ratio value and said instantaneous amplitude at n symbols previously, a selection means for selecting, in accordance with a selection signal, one of said first product and said second product as the current instantaneous amplitude, and a comparing means for providing the selection signal to said selection means so that said selection means selects said first product when said second product is greater than a threshold value and that said selection means selects said second product when said second product is equal to or smaller than the threshold value.

6. A demodulator comprising:

an amplitude detection means for detecting an instantaneous envelope level of a received signal;

a n-symbol delay means for providing an instantaneous envelope level of said received signal at n symbols previously in time (n is a natural number);

an amplitude ratio calculation means for calculating an amplitude ratio of an instantaneous amplitude in a signal space and an instantaneous amplitude in the signal space n symbols previously in time from said instantaneous envelope level and said instantaneous envelope level at n symbols previously; and a decision means for deciding a code transmitted in accordance with said calculated amplitude ratio.

7. The demodulator as claimed in claim 6, wherein said amplitude detection means comprises a multiplying means for providing a product of the received signal and a carrier, and a low pass filtering means for eliminating higher harmonic component in said product to provide square of said instantaneous envelope level.

8. The demodulator as claimed in claim 6, wherein said amplitude detection means comprises means for branching the received signal, a multiplying means for providing a product of the branched signals, a low pass filtering means for eliminating higher harmonic component in said product to provide square of said instantaneous envelope level, and a square root calculation means for calculating a square root of the square of the instantaneous envelope level to provide the instantaneous amplitude in the signal space.

9. The demodulator as claimed in claim 6, wherein said amplitude detection means comprises a plurality of amplitude detection circuits for detecting a plurality of instantaneous envelope levels of a plurality of received signals, and wherein said demodulator further comprises a summing means for summing the plurality of the detected envelope levels to provide the instantaneous amplitude.

10. A demodulator comprising:

a logarithmic amplifying means for amplifying a received signal;

an amplitude detection means for detecting an instantaneous envelope level of the logarithmically amplified received signal;

a n-symbol delay means for providing an instantaneous envelope level of said logarithmically amplified received signal at n symbols previously in time (n is a natural number);

an amplitude ratio calculation means for calculating an amplitude ratio of an instantaneous amplitude in a signal space and an instantaneous amplitude in the signal space n symbols previously in time from said instantaneous envelope level and said instantaneous envelope level at n symbols previously; and a decision means for deciding a code transmitted in accordance with said calculated amplitude ratio.

11. A modulation and demodulation method for communication between a transmitting side and a receiving side, said method comprising the steps of:

at the transmitting side, producing a modulating signal, an absolute phase in a signal space of said modulating signal and also an amplitude ratio of a current instantaneous amplitude of said modulating signal and an instantaneous amplitude at n symbols previously in time (n is a natural number) of said modulating signal being set to correspond to a code to be transmitted;

at the transmitting side, modulating a carrier with a radio frequency or an intermediate frequency by said modulating signal to provide and transmit a modulated signal;

at the receiving side, receiving the transmitted modulated signal to provide a received signal; and at the receiving side, deciding the transmitted code from an absolute phase of said received signal in a signal space and from an amplitude ratio of an instantaneous amplitude of a signal point in the signal space and an instantaneous amplitude of the signal point in the signal space n symbols previously in time with respect to said received signal, a first amplitude ratio value equal to or smaller than 1 and a second amplitude ratio value equal to or greater than 1 being prepared, said amplitude ratio being selected one of said first and second amplitude values so as to prevent said modulating signal from converging to zero and from diverging.

12. A modulator comprising:

a code mapping means for mapping a plurality of data to be transmitted to a code corresponding to a signal point in a signal space;

a phase setting means for providing an absolute phase corresponding to said mapped code;

an amplitude ratio setting means for providing an amplitude ratio corresponding to said mapped code;

a n-symbol delay means for providing an instantaneous amplitude at n symbols previously in time (n is a natural number);

an instantaneous amplitude production means for producing a current instantaneous amplitude based upon a product of the amplitude ratio and the instantaneous amplitude at n symbols previously;

an amplitude ratio control means for controlling the amplitude ratio to be one of a first amplitude ratio value equal to or smaller than 1 and a second amplitude ratio value equal to or greater than 1 so as to prevent said current instantaneous amplitude from converging to zero and from diverging; and an amplitude and phase modulation means for modulating a carrier with a radio frequency or an intermediate frequency by said absolute phase and said current instantaneous amplitude.

13. The modulator as claimed in claim 12, wherein said amplitude ratio setting means provides one of the first amplitude ratio value and the second amplitude ratio value, and wherein said amplitude ratio control means controls said amplitude ratio setting means so as to provide said first amplitude ratio value when said instantaneous amplitude at n symbols previously is greater than a threshold value and so as to provide said second amplitude ratio value when said instantaneous amplitude at n symbols previously is equal to or smaller than the threshold value.

14. The modulator as claimed in claim 12, wherein said amplitude ratio setting means provides both the first amplitude ratio value and the second amplitude ratio value, and wherein said amplitude ratio control means comprises a first multiplying means for providing a first product of said first amplitude ratio value and said instantaneous amplitude at n symbols previously, a second multiplying means for providing a second product of said second amplitude ratio value and said instantaneous amplitude at n symbols previously, a selection means for selecting, in accordance with a selection signal, one of said first product and said second product as the current instantaneous amplitude, and a comparing means for providing the selection signal to said selection means so that said selection means selects said first product when said instantaneous amplitude at n symbols previously is greater than a threshold value and that said selection means selects said second product when said instantaneous amplitude at n symbols previously is equal to or smaller than the threshold value.

15. The modulator as claimed in claim 12, wherein said amplitude ratio setting means provides both the first amplitude ratio value and the second amplitude ratio value, and wherein said amplitude ratio control means comprises a first multiplying means for providing a first product of said first amplitude ratio value and said instantaneous amplitude at n symbols previously, a second multiplying means for providing a second product of said second amplitude ratio value and said instantaneous amplitude at n symbols previously, a selection means for selecting, in accordance with a selection signal, one of said first product and said second product as the current instantaneous amplitude, and a comparing means for providing the selection signal to said selection means so that said selection means selects said first product when said second product is greater than a threshold value and that said selection means selects said second product when said second product is equal to or smaller than the threshold value.

16. A demodulator comprising:
an amplitude and absolute phase detection means for detecting an instantaneous envelope level in a signal space and an absolute phase in the signal space of a received signal;
a n-symbol delay means for providing an instantaneous envelope level of said received signal at n symbols previously in time (n is a natural number);
an amplitude ratio calculation means for calculating an amplitude ratio of an instantaneous amplitude in a signal space and an instantaneous amplitude in the signal space n symbols previously in time from said instantaneous envelope level and said instantaneous envelope level at n symbols previously; and
a decision means for deciding a code transmitted in accordance with said absolute phase and said calculated amplitude ratio.

17. The demodulator as claimed in claim 16, wherein said amplitude and absolute phase detection means comprises a plurality of amplitude and absolute phase detection circuits for detecting a plurality of absolute phases and a plurality of instantaneous envelope levels of a plurality of received signals, and wherein said demodulator further comprises a summing means for summing the plurality of the detected envelope levels to provide the instantaneous amplitude, and a selection means for selecting one of the plurality of the detected absolute phases depending upon the plurality of the detected envelope levels so as to provide an improved absolute phase.

18. The demodulator as claimed in claim 16, wherein said amplitude and absolute phase detection means comprises a plurality of means for branching a plurality of received signals, a plurality of amplitude detection circuits for detecting a plurality of instantaneous envelope levels of the branched received signals and a synchronous phase detection means, and wherein said demodulator further comprises a summing means for summing the plurality of the detected envelope levels to provide the instantaneous amplitude, and a selection means for selecting one of the plurality of the branched received signals depending upon the plurality of the detected envelope levels so as to provide an improved received signal to said synchronous phase detection means.

19. A demodulator comprising:
a logarithmic amplifying means for amplifying a received signal;
an amplitude and absolute phase detection means for detecting an instantaneous envelope level and an absolute phase in a signal space of the logarithmically amplified received signal;
a n-symbol delay means for providing an instantaneous envelope level of said logarithmically amplified received signal at n symbols previously in time (n is a natural number);
an amplitude ratio calculation means for calculating an amplitude ratio of an instantaneous amplitude in a signal space and an instantaneous amplitude in the signal space n symbols previously in time from said instantaneous envelope level and said instantaneous envelope level at n symbols previously; and
a decision means for deciding a code transmitted in accordance with said absolute phase and said calculated amplitude ratio.

20. A modulation and demodulation method for communication between a transmitting side and a receiving side, said method comprising the steps of:
at the transmitting side, producing a modulating signal, a phase difference between a current instantaneous phase of said modulating signal in a signal space and an instantaneous phase at n symbols previously in time (n is a natural number) of said modulating signal in the signal space and also an amplitude ratio of a current instantaneous amplitude of said modulating signal and an instantaneous amplitude at n symbols previously in time of said modulating signal being set to correspond to a code to be transmitted;
at the transmitting side, modulating a carrier with a radio frequency or an intermediate frequency by said modulating signal to provide and transmit a modulated signal;
at the receiving side, receiving the transmitted modulated signal to provide a received signal; and
at the receiving side, deciding the transmitted code from a phase difference between a current instantaneous phase of a signal point in the signal space and an instantaneous phase of the signal point in the signal space n symbols previously with respect to the received signal and from an amplitude ratio of an instantaneous amplitude of the signal point in the signal space and an instantaneous amplitude of the signal point in the signal space n symbols previously in time with respect to said received signal,
a first amplitude ratio value equal to or smaller than 1 and a second amplitude ratio value equal to or greater than 1 being prepared, said amplitude ratio being selected one of said first and second amplitude values so as to prevent said modulating signal from converging to zero and from diverging.

21. A modulator comprising:
a code mapping means for mapping a plurality of data to be transmitted to a code corresponding to a signal point in a signal space;
a phase difference setting means for providing a phase difference corresponding to said mapped code;
a first n-symbol delay means for providing an instantaneous phase at n symbols previously in time (n is a natural number);
an instantaneous phase production means for producing a current instantaneous phase based upon a sum of the phase difference and the instantaneous phase at n symbols previously;
an amplitude ratio setting means for providing an amplitude ratio corresponding to said mapped code;
a second n-symbol delay means for providing an instantaneous amplitude at n symbols previously in time;
an instantaneous amplitude production means for producing a current instantaneous amplitude based upon a product of the amplitude ratio and the instantaneous amplitude at n symbols previously;
an amplitude ratio control means for controlling the amplitude ratio to be one of a first amplitude ratio value equal to or smaller than 1 and a second amplitude ratio value equal to or greater than 1 so as to prevent said current instantaneous amplitude from converging to zero and from diverging; and an amplitude and phase modulation means for modulating a carrier with a radio frequency or an intermediate frequency by said current instantaneous phase and said current instantaneous amplitude.

22. The modulator as claimed in claim 21, wherein said amplitude ratio setting means provides one of the first amplitude ratio value and the second amplitude ratio value, and wherein said amplitude ratio control means controls said amplitude ratio setting means so as to provide said first amplitude ratio value when said instantaneous amplitude at n symbols previously is greater than a threshold value and so as to provide said second amplitude ratio value when said instantaneous amplitude at n symbols previously is equal to or smaller than the threshold value.

23. The modulator as claimed in claim 21, wherein said amplitude ratio setting means provides both the first amplitude ratio value and the second amplitude ratio value, and wherein said amplitude ratio control means comprises a first multiplying means for providing a first product of said first amplitude ratio value and said instantaneous amplitude at n symbols previously, a second multiplying means for providing a second product of said second amplitude ratio value and said instantaneous amplitude at n symbols previously, a selection means for selecting, in accordance with a selection signal, one of said first product and said second product as the current instantaneous amplitude, and a comparing means for providing the selection signal to said selection means so that said selection means selects said first product when said instantaneous amplitude at n symbols previously is greater than a threshold value and that said selection means selects said second product when said instantaneous amplitude at n symbols previously is equal to or smaller than the threshold value.

24. The modulator as claimed in claim 21, wherein said amplitude ratio setting means provides both the first amplitude ratio value and the second amplitude ratio value, and wherein said amplitude ratio control means comprises a first multiplying means for providing a first product of said first amplitude ratio value and said instantaneous amplitude at n symbols previously, a second multiplying means for providing a second product of said second amplitude ratio value and said instantaneous amplitude at n symbols previously, a selection means for selecting, in accordance with a selection signal, one of said first product and said second product as the current instantaneous amplitude, and a comparing means for providing the selection signal to said selection means so that said selection means selects said first product when said second product is greater than a threshold value and that said selection means selects said second product when said second product is equal to or smaller than the threshold value.

25. A demodulator comprising:
an amplitude and phase detection means for detecting an instantaneous envelope level in a signal space and an instantaneous phase in the signal space of a received signal;
a first n-symbol delay means for providing an instantaneous phase at n symbols previously in time (n is a natural number);
a phase difference calculation means for calculating a phase difference between said detected instantaneous phase and said provided instantaneous phase n symbols previously;
a second n-symbol delay means for providing an instantaneous envelope level of said received signal at n symbols previously in time;

an amplitude ratio calculation means for calculating an amplitude ratio of an instantaneous amplitude in a signal space and an instantaneous amplitude in the signal space n symbols previously in time from said instantaneous envelope level and said instantaneous envelope level at n symbols previously; and a decision means for deciding a code transmitted in accordance with said calculated phase difference and said calculated amplitude ratio.

26. The demodulator as claimed in claim 25, wherein said amplitude and phase detection means comprises a plurality of amplitude and phase detection circuits for detecting a plurality of instantaneous phases and a plurality of instantaneous envelope levels of a plurality of received signals, and wherein said demodulator further comprises a summing means for summing the plurality of the detected envelope levels to provide the instantaneous amplitude, and a selection means for selecting one of the plurality of the detected instantaneous phases depending upon the plurality of the detected envelope levels so as to provide an improved instantaneous phase.

27. The demodulator as claimed in claim 25, wherein said amplitude and phase detection means comprises a plurality of means for branching a plurality of received signals, a plurality of amplitude detection circuits for detecting a plurality of instantaneous envelope levels of the branched received signals and a differential detection means, and wherein said demodulator further comprises a summing means for summing the plurality of the detected envelope levels to provide the instantaneous amplitude, and a selection means for selecting one of the plurality of the branched received signals depending upon the plurality of the detected envelope levels so as to provide an improved received signal to said differential detection means.

28. A demodulator comprising:
a logarithmic amplifying means for amplifying a received signal;
an amplitude and phase detection means for detecting an instantaneous envelope level and an instantaneous phase in a signal space of the logarithmically amplified received signal;
a first n-symbol delay means for providing an instantaneous phase of said logarithmically amplified received signal at n symbols previously in time (n is a natural number);
a phase difference calculation means for calculating a phase difference between said detected instantaneous phase and said provided instantaneous phase n symbols previously;
a second n-symbol delay means for providing an instantaneous envelope level of said logarithmically amplified received signal at n symbols previously in time;
an amplitude ratio calculation means for calculating an amplitude ratio of an instantaneous amplitude in a signal space and an instantaneous amplitude in the signal space n symbols previously in time from said instantaneous envelope level and said instantaneous envelope level at n symbols previously; and
a decision means for deciding a code transmitted in accordance with said calculated phase difference and said calculated amplitude ratio.

29. A demodulator comprising:
means for branching a received signal;
a differential detection means for detecting a phase difference between an instantaneous phase and an instantaneous phase n symbols previously (n is a natural number) in a signal space of the branched received signal;

an amplitude detection means for detecting an instantaneous envelope level in the signal space of the branched received signal;

a n-symbol delay means for providing an instantaneous envelope level of said branched received signal at n symbols previously in time;

an amplitude ratio calculation means for calculating an amplitude ratio of an instantaneous amplitude in the signal space and an instantaneous amplitude in the signal space n symbols previously in time from said instantaneous envelope level and said instantaneous envelope level at n symbols previously; and a decision means for deciding a code transmitted in accordance with said detected phase difference and said calculated amplitude ratio.

30. A demodulator comprising:

means for branching a received signal;

a differential detection means for detecting a phase difference between an instantaneous phase and an instantaneous phase n symbols previously (n is a natural number) in a signal space of the branched received signal;

a logarithmic amplifying means for amplifying the branched received signal;

an amplitude detection means for detecting an instantaneous envelope level and an instantaneous phase in the signal space of the logarithmically amplified received signal;

a n-symbol delay means for providing an instantaneous envelope level of said branched received signal at n symbols previously in time;

an amplitude ratio calculation means for calculating an amplitude ratio of an instantaneous amplitude in the signal space and an instantaneous amplitude in the signal space n symbols previously in time from said instantaneous envelope level and said instantaneous envelope level at n symbols previously; and a decision means for deciding a code transmitted in accordance with said detected phase difference and said calculated amplitude ratio.

* * * * *